United States Patent
Tasaka et al.

(10) Patent No.: US 10,590,299 B2
(45) Date of Patent: Mar. 17, 2020

(54) PAINT, ADHESIVE COMPOSITION, BONDING METHOD AND LAMINATE

(75) Inventors: Michihisa Tasaka, Tokyo (JP); Hiroyasu Kanno, Tokyo (JP)

(73) Assignees: RIKEN TECHNOS CORP., Chuo-ku, Tokyo (JP); BASF SE, Ludwigshafen (DE)

( * ) Notice: Subject to any disclaimer, the term of this patent is extended or adjusted under 35 U.S.C. 154(b) by 2235 days.

(21) Appl. No.: 13/701,304

(22) PCT Filed: May 31, 2011

(86) PCT No.: PCT/JP2011/062499
§ 371 (c)(1),
(2), (4) Date: Nov. 30, 2012

(87) PCT Pub. No.: WO2011/152404
PCT Pub. Date: Dec. 8, 2011

(65) Prior Publication Data
US 2013/0078460 A1    Mar. 28, 2013

(30) Foreign Application Priority Data

Jun. 1, 2010 (WO) .................. PCT/JP2010/059252
Jun. 1, 2010 (WO) .................. PCT/JP2010/059253

(51) Int. Cl.
| | | |
|---|---|---|
| C09D 133/04 | (2006.01) | |
| C09J 5/00 | (2006.01) | |
| C09D 5/16 | (2006.01) | |
| C09D 113/00 | (2006.01) | |
| C09J 4/06 | (2006.01) | |
| C09D 167/06 | (2006.01) | |
| C09J 167/06 | (2006.01) | |
| C09J 7/22 | (2018.01) | |
| C09D 147/00 | (2006.01) | |
| B82Y 30/00 | (2011.01) | |

(52) U.S. Cl.
CPC ......... *C09D 133/04* (2013.01); *C09D 5/1637* (2013.01); *C09D 5/1668* (2013.01); *C09D 113/00* (2013.01); *C09D 147/00* (2013.01); *C09D 167/06* (2013.01); *C09J 4/06* (2013.01); *C09J 5/00* (2013.01); *C09J 7/22* (2018.01); *C09J 167/06* (2013.01); *B82Y 30/00* (2013.01); *Y10T 428/269* (2015.01)

(58) Field of Classification Search
CPC .. C09D 147/00; C09D 167/06; C09D 133/04; C09J 167/06
See application file for complete search history.

(56) References Cited

U.S. PATENT DOCUMENTS

| | | |
|---|---|---|
| 5,578,657 A | 11/1996 | Inoue et al. |
| 5,998,497 A | 12/1999 | Ishikawa et al. |
| 2004/0149382 A1 | 8/2004 | Giza et al. |
| 2005/0158504 A1 | 7/2005 | Itoh et al. |
| 2009/0163626 A1 | 6/2009 | Ukei et al. |
| 2010/0296169 A1* | 11/2010 | Mizuno ............... C09D 4/00 359/599 |
| 2010/0297457 A1 | 11/2010 | Kramer et al. |

FOREIGN PATENT DOCUMENTS

| | | |
|---|---|---|
| CA | 1337223 | 10/1995 |
| JP | 58-049702 | 3/1983 |
| JP | 61-278845 | 12/1986 |
| JP | 62-062871 | 3/1987 |
| JP | 02-296879 | 12/1990 |
| JP | 04-033968 | 2/1992 |
| JP | 08-201746 | 8/1996 |
| JP | 08-331631 | 12/1996 |
| JP | 09-111223 | 4/1997 |
| JP | 2000-144032 | 5/2000 |
| JP | 2000-256612 | 9/2000 |
| JP | 2002-194290 | 7/2002 |
| JP | 2002-363485 | 12/2002 |
| JP | 2003-015531 | 1/2003 |
| JP | 2004-161935 | 6/2004 |
| JP | 2004-182914 | 7/2004 |
| JP | 2005-089712 | 4/2005 |
| JP | 2006-152085 | 6/2006 |
| JP | 2007-002034 | 1/2007 |
| JP | 2007-023107 | 2/2007 |
| JP | 2007-186573 | 7/2007 |
| JP | 2008-024818 | 2/2008 |
| JP | 2008-056789 | 3/2008 |
| JP | 2008-255224 | 10/2008 |
| JP | 2009-197109 | 9/2009 |
| JP | 2009-227860 | 10/2009 |

(Continued)

OTHER PUBLICATIONS

Machine translation of TW200927849A. (Year: 1997).*
International Search Report for International Application No. PCT/JP2011/062499 dated Aug. 9, 2011.
Written Opinion for International Application No. PCT/JP2011/062499 dated Jul. 27, 2011.
Office Action for Korean Patent Application No. 10-2012-7033493 dated Apr. 24, 2014, 6 pgs.
Extended European Search Report for European Patent Application No. 11789807.2-1301 / 2578650 dated Jan. 28, 2015, 7 pages.
Japanese Office Action for Japanese Application No. 2012-518402 dated Mar. 18, 2014 corresponding to U.S. Appl. No. 13/701,304, filed Nov. 30, 2012.

*Primary Examiner* — Wenwen Cai
(74) *Attorney, Agent, or Firm* — Amin, Turocy & Watson, LLP

(57) ABSTRACT

A paint and an adhesive composition of the present invention containing (a) a vinyl ester resin or unsaturated polyester resin by 20 to 40 mass %, (b) a modifying agent by 0.1 to 50 mass %, (c) a vinyl monomer and/or (meth)acrylate monomer by 30 to 70 mass % (provided that the total of the components (a), (b) and (c) is 100 mass %) and (d) an initiator by 0.1 to 15 parts by mass to a total of 100 parts by mass of the components (a), (b) and (c).

18 Claims, No Drawings

(56) References Cited

FOREIGN PATENT DOCUMENTS

KR  1996-0015811  11/1996
TW  200927849 A * 10/1997

* cited by examiner

PAINT, ADHESIVE COMPOSITION, BONDING METHOD AND LAMINATE

TECHNICAL FIELD

The present invention relates to an adhesive composition, a bonding method and a laminate. More particularly, the present invention relates to a paint and an adhesive composition that show an excellent adhesion property relative to a layer of soft or hard vinyl chloride resin; polystyrene; polycarbonate; glass; aluminum; steel plate; concrete; wood panel; stone; artificial marble; polyolefin resin or copolymer of polyolefin resin modified by a polar group-containing compound or olefin and a polar group-containing compound; magnesium; acrylonitrile-butadiene-styrene copolymer; polyester-based resin; polyurethane-based resin; epoxy-based resin or acryl-based resin.

Furthermore, the present invention relates to a paint and an adhesive composition that is highly transparent and capable of forming a coating film having an antifouling property of hardly allowing foreign objects such as fingerprints and airborne dusts to adhere to it.

The present invention also relates to a bonding method for such an adhesive composition and a layer of any of the above-described materials.

The present invention also relates to a laminate of such an adhesive composition and a layer of any of the above-described materials.

The present invention also relates to a paint for flooring materials, an adhesive composition and a flooring material, and more particularly, it relates to a paint for flooring materials and an adhesive composition that have an excellent adhesion property relative to concrete floors, resin-coated concrete floors, wooden floors and resin-coated flooring base materials that are made of wood and is capable of providing excellent water resistance, abrasive resistance, transparency, surface smoothness, flexibility, shock resistance (and if necessary antistatic properties) but does not degrade the working environment and also to a flooring material having such properties.

BACKGROUND ART

Adhesive agents, paints and adhesive compositions made of vinyl ester-based resin (urethane (meth)acrylate), epoxy (meth)acrylate, polyester (meth)acrylate), a reactive diluent and a curing agent have been and are widely utilized in various fields including packaging materials, display materials such as label materials, electronic parts, precision equipments and building materials. In recent years, thermosetting type compositions under consideration have been employed with an aim of increasing the manufacturing speed and productivity improvement of manufacturing processes. More recently, however, they have been replaced to a large extent by liquid curable adhesive agents, paints and adhesive compositions of active energy-line curable types such as UV rays and electron beam curable types. Thus, the field of utilization expands and the demand for higher performance products is intensified. In other words, the demand for higher performance liquid curable adhesive agents, paints and adhesive compositions of active energy-line curable types have been and being intensified.

Patent Document 1 listed below discloses an adhesive agent comprising a specific epoxy compound, urethane (meth)acrylate, a reactive diluent, a specific long-chain alkyl (meth)acrylate and a photopolymerization initiator but it is not satisfactory in terms of adhesion property relative to a layer of soft or hard vinyl chloride resin; polystyrene; polycarbonate; glass; aluminum; steel plate; polyolefin resin modified by a polar group-containing compound or copolymer of olefin and a polar group-containing compound; magnesium; acrylonitrile-butadiene-styrene copolymer; polyester-based resin; or acryl-based resin and also in terms of well-balanced properties of transparency, surface smoothness, flexibility and shock resistance.

Patent Document 2 listed below discloses a UV curable type functional paint and an adhesive composition that are realized by using hydroxy methacrylate as monomer for epoxy acrylate-based oligomer and excellent in terms of thick film forming when compounded with silica. However such a paint and an adhesive composition do not provide a satisfactory adhesion relative to a layer of glass, polycarbonate, acryl-based resin, polyester-based resin, hard vinyl chloride resin, soft vinyl chloride resin or styrene-based resin. When such a paint and an adhesive composition is compounded with one or more functional materials such as an IR absorbing material, a UV absorbing material, an antistatic material and/or an electromagnetic shielding material, the cured paint and the cured adhesive composition are far from satisfactory in terms of showing the expected functionality. Additionally, they also are not satisfactory in terms of well-balanced properties of water resistance, abrasive resistance, transparency, surface smoothness, flexibility and shock resistance.

Dirt such as sweat or fingerprints of the user and airborne foreign objects can easily adhere to the surface of the image display unit such as a mobile phone. Particularly, dirt such as fingerprints gives rise to not only a filthy feeling but also a problem of reducing the contrast of the image being displayed on the display screen of the unit.

Techniques of bonding a film to the display screen of an image display apparatus by means of an adhesive agent are known (see, for example, Patent Document 3 listed below). With such a technique, if the film on the display screen of the image display unit of a mobile phone becomes dirty, the mobile phone may remain usable simply by replacing the film with a new one, although the use of such a film is practically unfeasible because the used film becomes a waste and the film in use can be separated from the display screen along the periphery and reduce the contrast of the image being displayed on the display screen of the unit. Techniques of arranging a cover on a mobile phone main body to protect the display screen are also known (see, for example, Patent Document 4). With this techniques, while the image display section of the mobile phone does not become dirty so long as the mobile phone is not used, dirt such as fingerprints of the user can adhere to it once the mobile phone is operated and additionally, there is a problem that the mobile phone is subjected to restrictions in terms of design and appearance.

Techniques of arranging an antifouling layer on the image display screen are also known. Vacuum deposition that is a sort of physical vacuum deposition (PVD) is employed to form such an antifouling layer. With a vacuum deposition process, the solid or granular target filled in the target container arranged in vacuum of not higher than about $10^{-4}$ Pa in a vacuum deposition apparatus is heated to evaporate and the generated vapor is made to deposit on the surface of a substrate arranged opposite to the target and held to a predetermined temperature level to form a thin film on it. With a vacuum deposition process, a highly-pure thin film can be formed at a high film forming rate in a high degree of vacuum without changing the structure of the polymer that becomes a thin film at the time of deposition. Heating techniques are being popularly employed to evaporate the target and the heating techniques that can be used for vacuum deposition include resistance heating, electron beam method and laser method (laser ablation). A technique of forming a coat film of a fluorine compound on an inorganic or organic substrate to be used for a display screen such as a liquid crystal display screen by means of a vapor deposition process (see Patent Document 5 listed below) and a technique of treating a liquid crystal display screen with a fluorinated silazane compound by means of a vapor deposition process or the like (see Patent Document 6) have been disclosed.

However, because known fluorine-containing thin films do not have a satisfactory antifouling property and the formed film has a disadvantage that dirt can easily adhere to it and that it has a poor light permeability, there can arise a problem that the image being displayed on the relatively small display screen of a mobile phone is not clear as well as a problem that the fluorine-containing thin film formed by means of a vacuum deposition process is poorly durable and liable to be peeled off with time.

To date, paints and adhesive compositions including those that are epoxy-based, urethane-based, polyester-based and acryl-based have been popularly employed as paints and adhesive compositions for floor base materials of concrete, wood panel, stone and so on. They can provide floor base materials with design, solvent resistance, chemical resistance and a good appearance. For example, Patent Document 7 listed below discloses a floor finishing technique of directly applying a paint and an adhesive composition containing acryllic silicon resin, a curing agent or a curing catalyst, a pigment and a solvent and having a specific steam permeability on concrete. Patent Document 8 listed below discloses a floor paint and an adhesive composition curing composition comprising a copolymer component having a main chain that is substantially formed by a vinyl-based polymer and containing a hydrolyzable silicon group and an amino group in a molecule, and a curing catalyst component.

However, currently known floor paints and adhesive compositions including the known paints and the adhesive compositions described in Patent Documents 7 and 8 are poorly adhesive relative to floor base members including floors made of concrete, resin-coated concrete floors, wooden floors and resin-coated wooden floors and not fully satisfactory in terms of well-balanced properties of water resistance, abrasion resistance, transparency, surface smoothness, flexibility and shock resistance. Additionally, known floor paints and adhesive compositions require the use of a xylene- or toluene-based solvent and are accompanied by a problem of degrading the working environment.

PRIOR ART DOCUMENTS

Patent Documents

[Patent Document 1] Japanese Patent Application Laid-Open Publication No. 02-296879
[Patent Document 2] Japanese Patent Application Laid-Open Publication No. 58-49702
[Patent Document 3] Japanese Patent Application Laid-Open Publication No. 2003-15531
[Patent Document 4] Japanese Patent Application Laid-Open Publication No. 08-331631
[Patent Document 5] Japanese Patent Application Laid-Open Publication No. 09-111223
[Patent Document 6] Japanese Patent Application Laid-Open Publication No. 08-201746
[Patent Document 7] Japanese Patent Application Laid-Open Publication No. 2000-256612
[Patent Document 8] Japanese Patent Application Laid-Open Publication No. 2002-363485

DISCLOSURE OF THE INVENTION

Problem to be Solved by the Invention

Thus, in view of the above-identified problems, an object of the present invention is to provide a paint, an adhesive composition, a bonding method and a laminate that can furnish soft or hard vinyl chloride resins; polystyrene; polycarbonate; glass; aluminum; steel plate; concrete; wood panel; stone; artificial marble; a polyolefin resin or copolymers of polyolefin resin modified by a polar group-containing compound or olefin and a polar group-containing compound; magnesium; acrylonitrile-butadiene-styrene copolymers; polyester-based resins; polyurethane-based resins; epoxy-based resins; and acryl-based resins with adhesiveness, hardness, water resistance, abrasion resistance, transparency, surface smoothness, flexibility, shock resistance and an antifouling property in a well-balanced manner, and exhibit a desired functionality to an unexpected extent when the paint and the adhesive composition are compounded with one or more functional materials selected from antifouling-property imparting materials, scratch resistance enhancing materials, shock resistance enhancing materials, IR absorbing materials, UV absorbing materials, electromagnetic shielding materials, electroconductive revealing materials, antistatic materials and flame retardancy imparting materials.

Means for Solving the Problem

As a result of intensive research efforts, the inventor of the present invention came to find that a paint and an adhesive composition containing the below-listed components (a), (b), (c) and (d) with a specific quantitative relationship can solve the above-identified problems and thus completed the present invention.

Thus, the present invention is defined as follows:

1.

A paint and an adhesive composition characterized by containing:
(a) a vinyl ester resin or unsaturated polyester resin by 20 to 40 mass %;
(b) a modifying agent by 0.1 to 50 mass %;
(c) a vinyl monomer and/or (meth)acrylate monomer by 30 to 70 mass % (provided that the total of the components (a), (b) and (c) is 100 mass %); and
(d) an initiator by 0.1 to 15 parts by parts by mass to a total of 100 parts by mass of the components (a), (b) and (c).

2.

The paint and an adhesive composition as defined in 1 above, characterized in that the component (a) is at least one item selected from a group of urethane (meth)acrylate, polyester (meth)acrylate and epoxy (meth)acrylate.

3.

The paint and an adhesive composition as defined in 1 or 2 above, characterized in that the component (b) is at least one item selected from a group of (b-1) polyols having an hydroxyl value of 40 to 330 mgKOH/g; (b-2) polyols having an hydroxyl value of 40 to 330 mgKOH/g and an acid value of 2 to 20 mgKOH/g; (b-3) modified rubber; (b-4) compounds having an epoxy equivalent of 150 to 700 g/mol; and (b-5) fluorine-based resin having a hydroxyl value of 40 to 330 mgKOH/g.

4.

The paint and an adhesive composition as defined in 3 above, characterized in that the component (b-1) is at least one item selected from a group of (b-1-1) castor oil-based polyols having a hydroxyl value of 40 to 330 mgKOH/g; (b-1-2) polybutadiene-based polyols having a hydroxyl value of 40 to 330 mgKOH/g; and (b-1-3) polyisoprene-based polyols having a hydroxyl value of 40 to 330 mgKOH/g.

5.

The paint and an adhesive composition as defined in 4 above, characterized in that the component (b-1) is an aromatic castor oil-based polyol (b-1-1-1) having a hydroxyl value of 40 to 330 mgKOH/g.

6.

The paint and an adhesive composition as defined in 3 above, characterized in that the component (b-2) is a castor oil-based polyol (b-2-1) having a hydroxyl value of 40 to 330 mgKOH/g and an acid value of 2 to 20 mgKOH/g.

7.

The paint and an adhesive composition as defined in 3 above, characterized in that the component (b-3) is an acid-modified polybutadiene or an acid-modified polyisoprene.

8.

The paint and an adhesive composition as defined in 3 above, characterized in that the component (b-4) is a polyepoxy compound (b-4-1) having an epoxy equivalent of 150 to 250 g/mol.

9.

The paint and an adhesive composition as defined in 3 above, characterized in that the component (b-4) is a polymer (b-4-2) having an epoxy equivalent of 500 to 700 g/mol and a saturated skeleton.

10.

The paint and an adhesive composition as defined in 3 above, characterized in that the component (b-5) is a fluorine-based resin (b-5-1) having a hydroxyl value of 40 to 330 mgKOH/g.

11.

The paint and an adhesive composition as defined in 1 or 2 above, characterized in that the component (c) is a monomer having an N-vinyl group.

12.

The paint and an adhesive composition as defined in any of 1 through 11 above, characterized in that the component (c) is at least a monomer selected from (c-1) compounds having a ring structure and an ethylenically unsaturated group and (c-2) compounds having no ring structure and an ethylenically unsaturated group.

13.

The paint and an adhesive composition as defined in any of 1 through 12 above, characterized in that the adherend of the adhesive composition is soft or hard vinyl chloride resin; polystyrene; polycarbonate; glass; aluminum; steel plate; concrete; wood panel; stone; artificial marble; polyolefin resin or copolymer of polyolefin resin modified by a polar group-containing compound or olefin and a polar group-containing compound; magnesium; acrylonitrile-butadiene-styrene copolymer; polyester-based resin; polyurethane-based resin; epoxy-based resin; or acryl-based resin.

14.

The paint and an adhesive composition as defined in any of 1 through 13 above, characterized by further comprising a functional material.

15.

The paint and an adhesive composition as defined in 14 above, characterized in that the functional material is at least one item selected from a group of antifouling-property imparting materials, scratch resistance enhancing materials, shock resistance enhancing materials, IR absorbing materials, UV absorbing materials, electromagnetic shielding materials, electroconductive revealing materials, antistatic materials and flame retardancy imparting materials.

16.

The paint and an adhesive composition as defined in 15 above, characterized in that the antifouling-property imparting materials are silicone compounds.

17.

The paint and an adhesive composition as defined in 16 above, characterized in that they are used for antifouling-property protective walls (glass substitutes, protective walls for highways, sports arenas, bridges and so on) and display coatings of television sets, mobile phones and game machines.

18.

The paint and an adhesive composition as defined in 15 above, characterized in that the scratch resistance enhancing materials are organosilica compounds.

19.

The paint and an adhesive composition as defined in 15 above, characterized in that the scratch resistance enhancing materials are alumina ceramic compounds.

20.

The paint and an adhesive composition as defined in 18 or 19 above, characterized in that they are used for glass substitutes, protective walls for highways, sports arenas and bridges and display hard coatings of television sets, mobile phones and game machines.

21.

The paint and an adhesive composition as defined in 15 above, characterized in that the shock resistance enhancing materials are core-shell polymer particles.

22.

The paint and an adhesive composition as defined in 21 above, characterized in that they are used for car interior and exterior decorating members, floors, walls, protective walls for highways, sports arenas and bridges and display coatings of television sets, mobile phones and game machines.

23.

The paint and an adhesive composition as defined in 15 above, characterized in that the IR absorbing materials are metal oxides such as ATO (antimony tin complex oxide and antimony doped tin oxide), ITO (indium tin complex oxide).

24.

The paint and an adhesive composition as defined in 21 above, characterized in that they are used for car interior and exterior decorating members, floors, walls, protective walls for highways, sports arenas and bridges and heat shield coatings of television sets, mobile phones and game machine housing.

25.

The paint and an adhesive composition as defined in 15 above, characterized in that the UV absorbing materials are at least one item selected from a group of salicylate-based, benzophenone-based, benzotriazole-based, substituted acrylonitrile-based, and triazine-based organic compounds and inorganic compounds such as hybrid inorganic particles obtained by way of a complexing process of treating any of carbon nanotubes, zinc oxide, aluminum doped zinc oxide, gallium doped zinc oxide, titanium dioxide, cerium oxide and titanium dioxide microparticles with iron oxide, and hybrid inorganic particles obtained by coating the surfaces of cerium oxide microparticles with amorphous silica.

26.

The paint and an adhesive composition as defined in 25 above, characterized in that they are used for anti-yellowing coatings and UV degradation preventive coatings of car interior and exterior decorating members, floors, walls, boats and canoes.

27.

The paint and an adhesive composition as defined in 15 above, characterized in that the IR absorbing materials are organic pigment components that are at least one item selected from a group of basic lead carbonate, basic lead sulfate, basic lead silicate, zinc oxide (specific gravity: 5.47 to 5.61), zinc sulfide (specific gravity: 4.1) lithopone, antimony trioxide (specific gravity: 4.2), titanium dioxide (specific gravity: 4.2) and graphite (specific gravity: 3.3).

28.

The paint and an adhesive composition as defined in 25 above, characterized in that the IR absorbing materials are for solar cell backsheets, walls and roof coatings.

29.

The paint and an adhesive composition as defined in 15 above, characterized in that the electromagnetic shielding materials are electroconductive particles of at least one item selected from a group of (1) carbon particles and/or powder, (2) particles and/or powder of any of metals of nickel, indium, chromium, gold, vanadium, tin, cadmium, silver, platinum, aluminum, copper, titanium, cobalt, lead and so on, alloys of any of them and their electroconductive oxides and (3) particles of plastic materials such as polyethylene having a coating layer of any of electroconductive materials of (1) or (2) above formed on the surfaces thereof.

30.

The paint and an adhesive composition as defined in 25 above, characterized in that they are used for car interior and exterior decorating members, floors, walls and roof coatings.

31.

The paint and an adhesive composition as defined in 15 above, characterized in that the electroconductive revealing materials are electroconductive particles of at least one item selected from a group of electroconductive carbon black and carbon nanotubes.

32.

The paint and an adhesive composition as defined in 31 above, characterized in that they are used for car interior and exterior decorating members, floors and electrode coatings.

33.

The paint and an adhesive composition as defined in 15 above, characterized in that the antistatic materials are at least one item selected from a group of metal oxides, metal salts, surface active agents and ionic liquids.

34.

The paint and an adhesive composition as defined in 33 above, characterized in that the metal oxides and the metal salts are at least one item selected from a group of zinc oxide, aluminum doped zinc oxide, gallium doped zinc oxide, ATO, ITO, tin oxide, antimony pentoxide, zirconium oxide, titanium oxide and aluminum oxide.

35.

The paint and an adhesive composition as defined in 33 above, characterized in that the surface active agents are at least one item selected from a group of anionic, nonionic, cationic and amphoteric surface-active agents.

36.

The paint and an adhesive composition as defined in 33 above, characterized in that the ionic liquids contain cations of at least one item selected from a group of imidazolium, pyridinium, pyrrolidinium, phosphonium, ammonium and sulfonium.

37.

The paint and an adhesive composition as defined in 33 above, characterized in that the ionic liquids contain anions of at least one item selected from a group of halogen, carboxylates, sulfates, sulfonates, thiocyanates, aluminates, borates, phosphates, phosphinates, amides, antimonates, imides and methides.

38.

The paint and an adhesive composition as defined in any of 33 through 35 above, characterized in that they are used for floors, walls, electric appliance housings and display coatings of TV mobile phones and game machines.

39.

The paint and an adhesive composition as defined in 15 above, characterized in that the flame retardancy imparting materials contain a flame retardant agent of at least one item selected from a group of phosphor-based flame retardant agents, bromide-based flame retardant agents, chlorine-based flame retardant agents, aluminum hydroxide and zinc borate.

40.

The paint and an adhesive composition as defined in 39 above, characterized in that they are used for walls, floors, electric appliance housings, connectors and electric wire coatings.

41.

A bonding method characterized by executing:

Step I:

mixing (a) a vinyl ester resin or unsaturated polyester resin by 20 to 40 mass %;

(b) a modifying agent by 0.1 to 50 mass %;

(c) a vinyl monomer and/or (meth)acrylate monomer by 30 to 70 mass % (provided that the total of the components (a), (b) and (c) is 100 mass %); and (d) an initiator by 0.1 to 15 parts by mass to a total of 100 parts by mass of the components (a), (b) and (c)

in an arbitrary order to prepare an adhesive composition;

Step II:

forming a layer (A) of the adhesive composition by laminating the adhesive composition obtained in the step I on the surface of a layer (B1) of a soft or hard vinyl chloride resin; polystyrene; polycarbonate; glass; aluminum; steel plate; concrete; wood panel; stone; artificial marble; polyolefin resin or a copolymer of polyolefin resin modified by a polar group-containing compound or olefin and a polar group-containing compound; magnesium; an acrylonitrile-butadiene-styrene copolymer; a polyester-based resin; a polyurethane-based resin; an epoxy-based resin; or an acryl-based resin;

Step III:

additionally laminating a layer (B2) of a soft or hard vinyl chloride resin; polystyrene; polycarbonate; glass; aluminum; steel plate; concrete; wood panel; stone; artificial marble; polyolefin resin or a copolymer of polyolefin resin modified by a polar group-containing compound or olefin and a polar group-containing compound; magnesium; an acrylonitrile-butadiene-styrene copolymer; a polyester-based resin; a polyurethane-based resin; an epoxy-based resin; or an acryl-based resin on the layer (A) of the adhesive composition of the laminate obtained in the step II in the order of Step I, Step II and Step III.

42.

A laminate characterized by being formed by laying a layer (A) of an adhesive composition containing:
(a) a vinyl ester resin or unsaturated polyester resin by 20 to 40 mass %;
(b) a modifying agent by 0.1 to 50 mass %;
(c) a vinyl monomer and/or (meth)acrylate monomer by 30 to 70 mass % (provided that the total of the components (a), (b) and (c) is 100 mass %); and
(d) an initiator by 0.1 to 15 parts by mass to a total of 100 parts by mass of the components (a), (b) and (c) (provided that the total of the components (a), (b), (c) and (d) is 100 mass %); and
a layer (B1) of a soft or hard vinyl chloride resin; polystyrene; polycarbonate; glass; aluminum; steel plate; concrete; wood panel; stone; artificial marble; polyolefin resin or a copolymer of polyolefin resin modified by a polar group-containing compound or olefin and a polar group-containing compound; magnesium; an acrylonitrile-butadiene-styrene copolymer; a polyester-based resin; a polyurethane-based resin; an epoxy-based resin; or an acryl-based resin so as to make the layer (A) and the layer (B1) contact each other.

43.

The laminate as defined in 42 above, characterized in that the thickness of the layer (A) of the paint and the adhesive composition is between 1 and 200 μm.

44.

The paint and an adhesive composition as defined in 1 above, characterized in that they are used for electroacoustic transducers.

45.

The paint and an adhesive composition as defined in 1 above, characterized in that they are used for coating of steel structures.

Advantages of the Invention

Because a paint according to the present invention contains specific components (a) through (d) at a specific compounding ratio, it shows a satisfactory adhesion property relative to a layer of a soft or hard vinyl chloride resin; polystyrene; polycarbonate; glass; aluminum; steel plate; concrete; wood panel; stone; artificial marble; polyolefin resin or copolymer of polyolefin resin modified by a polar group-containing compound or olefin and a polar group-containing compound; magnesium; acrylonitrile-butadiene-styrene copolymer; polyester-based resin (e.g., polyethylene terephthalate: PET); polyurethane-based resin; epoxy-based resin; or acryl-based resin (e.g., polymethyl methacrylate: PMMA) and can provide a paint layer that exhibits a desired functionality when compounded with one or more functional materials such as an IR absorbing material, a UV absorbing material, an antistatic material and/or an electromagnetic shielding material and in which hardness, water resistance, abrasion resistance, transparency, surface smoothness, flexibility and shock resistance are highly well-balanced. Additionally, because a paint according to the present invention has a viscosity appropriate for application, it does not need to be diluted with an organic solvent and hence can provide an excellent working environment.

Because a laminate according to the present invention is formed by laminating a layer (A) of an adhesive composition according to the present invention as defined above and a layer (B) of soft or hard vinyl chloride resin; polystyrene; polycarbonate; glass; aluminum; steel plate; concrete; wood panel; stone; artificial marble; polyolefin resin or copolymer of polyolefin resin modified by a polar group-containing compound or olefin and a polar group-containing compound; magnesium; acrylonitrile-butadiene-styrene copolymer; polyester-based resin (e.g., polyethylene terephthalate PET); polyurethane-based resin; epoxy-based resin; or acryl-based resin (e.g., polymethyl methacrylate PMMA) so as to make the layer (A) and the layer (B) contact each other, the two layers show an excellent adhesion property (and can be used for direct coating without requiring the layer (B) to be treated with a primer) and the laminate shows water resistance, abrasion resistance, transparency, surface smoothness, flexibility and shock resistance in a highly well-balanced manner.

A paint according to the present invention shows a viscosity that is advantageous for painting operations without being diluted with an organic solvent. For example, a paint according to the present invention typically has a viscosity at 25° C. of between 5 and 5,000 mPa·s, preferably between 10 and 2,000 mPa·s (as observed by means of a B-type viscometer). Note, however, a paint according to the present invention may be diluted with an organic solvent if necessary.

Because an adhesive composition according to the present invention contains the components (a), (b), (c) and (d) with a specific quantitative relationship, it has an excellent adhesion property to a layer of polar resin, ceramic, metal or the like, more specifically to a layer of soft or hard vinyl chloride resins; polystyrene; polycarbonate; glass; aluminum; steel plate; concrete; wood panel; stone; artificial marble; polyolefin resin or copolymer of polyolefin resin modified by a polar group-containing compound or olefin and a polar group-containing compound; magnesium; acrylonitrile-butadiene-styrene copolymer; polyester-based resin; polyurethane-based resin; epoxy-based resin; or acryl-based resin and also properties of transparency, surface smoothness, flexibility and shock resistance in a highly well-balanced manner.

Because a bonding method according to the present invention is a method of laminating a layer (A) of an adhesive composition containing the components (a) through (d) with a specific quantitative relationship and layers (B1) and (B2) of soft or hard vinyl chloride resin; polystyrene; polycarbonate; glass; aluminum; steel plate; concrete; wood panel; stone; artificial marble; polyolefin resin or copolymer of polyolefin resin modified by a polar group-containing compound or olefin and a polar group-containing compound; magnesium; acrylonitrile-butadiene-styrene copolymer; polyester-based resin; polyurethane-based resin; epoxy-based resin; or acryl-based resin by way of steps that are to be executed in a specific order, the three layers are firmly bonded together.

A laminate according to one aspect of the present invention is a laminate (A) of an adhesive composition containing the components (a) through (d) with a specific quantitative relationship and a layer (B1) of soft or hard vinyl chloride resin; polystyrene; polycarbonate; glass; aluminum; steel plate; concrete; wood panel; stone; artificial marble; polyolefin resin or copolymer of polyolefin resin modified by a polar group-containing compound or olefin and a polar group-containing compound; magnesium; acrylonitrile-butadiene-styrene copolymer; polyester-based resin; polyurethane-based resin; epoxy-based resin; or acryl-based resin. Because the layer (A) of an adhesive composition has properties of transparency, surface smoothness, flexibility and shock resistance in a highly well-balanced manner, it operates advantageously as primer layer for the layer (B1).

Because a laminate according to another aspect of the present invention is a laminate (A) of an adhesive composition containing the components (a) through (d) with a specific quantitative relationship and layers (B1) and (B2) of soft or hard vinyl chloride resin; polystyrene; polycarbonate; glass; aluminum; steel plate; concrete; wood panel; stone; artificial marble; polyolefin resin or copolymer of polyolefin resin modified by a polar group-containing compound or olefin and a polar group-containing compound; magnesium; acrylonitrile-butadiene-styrene copolymer; polyester-based resin; polyurethane-based resin; epoxy-based resin; or acryl-based resin, it shows an excellent adhesive effect of firmly bonding the layers (A), (B1) and (B2) together. Additionally, it has properties of transparency, surface smoothness, flexibility and shock resistance in a highly well-balanced manner.

BEST MODE FOR CARRYING OUT THE INVENTION

Now, the present invention will be described in greater detail below.

(a) Vinyl Ester Resin or Unsaturated Polyester Resin

The component (a) of an adhesive composition according to the present invention is either vinyl ester resin or unsaturated polyester resin. More specifically, the vinyl ester resin is selected from urethane (meth)acrylate) resin, epoxy (meth)acrylate resin, polyester (meth)acrylate resin, of which urethane (meth)acrylate resin is preferable because it is particularly advantageous in terms of flexibility, shock resistance and adhesiveness relative to different materials. Note that the expression of (meth)acrylate as used herein refers to acrylate or methacrylate.

Preferably, such urethane (meth)acrylate resins are those that can be obtained by way of a reaction of polyol, polyisocyanate and (meth)acrylate having one or more hydroxyl groups in a molecule and has two or more (meth) acryloyl groups in a molecule.

Preferably, polyols that can be used for a urethane (meth) acrylate resin have a number-average molecular weight preferably between 200 and 3,000, more preferably between 400 and 2,000. Examples of such polyols typically include polyether polyols, polyester polyols, polycarbonate polyols and polybutadiene polyols. A polyol selected from the above listed ones may be used. Alternatively, two or more of such polyols can be used in combinations.

For the purpose of the present invention, polyether polyols may include polyols obtained by adding alkylene oxide to bisphenol A and bisphenol F besides polyalkylene oxides such as polyethylene glycol, polypropylene glycol and polytetramethylene glycol.

The expression of polyester polyols as used herein refers to condensate polymers of dibasic acids and polyhydric alcohols or ring-opened polymers of cyclic ester compounds such as polycaprolactone. Examples of the dibasic acids that can be used for the present invention include phthalic acid, phthalic anhydride, halogenated phthalic anhydride, isophthalic acid, terephthalic acid, tetrahydrophthalic acid, tetrahydrophthalic anhydride, hexahydrophthalic acid, hexahydrophthalic anhydride, hexahydroterephthalic acid, hexahydroisophthalic acid, succinic acid, malonic acid, glutaric acid, adipic acid, sebacic acid, 1,12-dodecanedicarboxylic acid, 2,6-naphthalenedicarboxylic acid, 2,7-naphthalenecarboxylic acid, 2,3-naphthalenedicarboxylic acid, 2,3-naphthalenedicarboxylic acid anhydride, 4,4'-bisphenyldicarboxylic acid and dialkyl esters thereof. Examples of polyhydric alcohols that can be used for the present invention include ethylene glycol, diethylene glycol, triethylene glycol, polyethylene glycol, propylene glycol, dipropylene glycol, tripropylene glycol, polypropylene glycol, 2-methyl-1,3-propane diol, 1,3-butane diol, neopentyl glycol, hydrogenated bisphenol A, 1,4-butane diol, 1,6-hexane diol, bisphenol A-propylene oxide or ethylene oxide adduct, 1,2,3,4-tetrahydroxybutane, glycerin, trimethylolpropane, 1,3-propane diol, 1,2-cyclohexane glycol, 1,3-cyclohexane glycol, 1,4-cyclohexane glycol, 1,4-cyclohexane dimethanol, para-xylene glycol, bicyclohexyl-4,4'-diol, 2,6-decalin glycol and 2,7-decalin glycol.

Examples of polyisocyanates that can be used for the urethane (meth)acrylate resins include 2,4-TDI, isomers thereof and mixtures of isomers thereof, MDI, HDI, IPDI, XDI, hydrogenated XDI, dicyclohexylmethane diisocyanate, toridine diisocyanate, naphthalene diisocyanate and triphenylmethane triisocyanate. Any one of these polyisocyantes can be used alone and also any two or more of them can be used in combination.

Examples of (meth)acrylates (hydroxyl group-containing (meth)acrylate) having one or more hydroxyl groups in a molecule to be used for the urethane (meth)acrylate resins include mono(meth)acrylates such as 2-hydroxyethyl (meth) acrylate, 2-hydroxypropyl (meth)acrylate, 3-hydroxybutyl (meth)acrylate, polyethylene glycol mono(meth)acrylate and polypropylene glycol mono(meth)acrylate and polyhydric (meth)acrylates such as tris(hydroxyethyl) isocyanurate di(meth)acrylate and pentaerythritol tri(meth)acrylate.

Exemplar methods of manufacturing the urethane (meth) acrylate resins include (1) a method of firstly causing a polyisocyanate and a polyol to react with each other preferably at a ratio of NCO/OH=1.3 to 2 to produce a terminal isocyanate compound and then causing the compound to react with a hydroxyl group-containing (meth)acrylate so that the isocyanate group and the hydroxyl group are substantially equal to quantity and (2) a method of causing a polyisocyanate compound and a hydroxyl group-containing (meth)acrylate to react at a ratio of NCO/OH=not less than 2 to produce a one-terminal isocyanate compound and then adding a polyol for reaction.

Epoxy (meth)acrylate resins that can be used as vinyl ester resins refer to ones preferably containing two or more (meth) acryloyl groups in a molecule that can be obtained by way of a reaction of such a resin and an unsaturated monobasic acid in the presence of an esterification catalyst.

Examples of the epoxy resin as used herein include a bisphenol type or novolac-type epoxy resin used alone and mixtures of bisphenol type and novolac type epoxy resins whose average epoxy equivalent is preferably within the range between 150 and 450.

Typical examples of the bisphenol-type epoxy resin include glycidyl ether type epoxy resins substantially having two or more epoxy groups in a molecule that can be obtained by way of a reaction of epichlorohydrin and bisphenol A or bisphenol F, methylglycidyl ether type epoxy resins that can be obtained by way of a reaction of methylepichlorohydrin and bisphenol A or bisphenol F, and epoxy resins that can be obtained from alkylene oxide adduct of bisphenol A and epichlorohydrin or methyl epichlorohydrin. Typical examples of the novolac-type epoxy resins include those that can be obtained by way of a reaction of phenol novolac or cresol novolac and epichlorohydrin or methyl epichlorohydrin.

Typical examples of the unsaturated monobasic acid to be used for the epoxy (meth)acrylate resin include acrylic acid, methacrylic acid, cinnamic acid, crotonic acid, monomethyl maleate, monopropyl maleate, mono (2-ethylhexyl) maleate and sorbic acid. Any of these unsaturated monobasic acids can be used alone or as a mixture of two or more of any of them. The reaction of an epoxy resin and an unsaturated monobasic acid is conducted at temperature preferably betweens 60 and 140° C., more preferably between 80 and 120° C., in the presence of an esterification catalyst.

Examples of the esterification catalysts may be known catalysts and include tertiary amines such as triethyl amine, N,N-dimethylbenzylamine, N,N-dimethylaniline and diazabicyclooctane, triphenylphosphine and diethylamine hydrochloride.

Polyester (meth)acrylate resins to be used as vinyl ester resins are saturated or unsaturated polyesters having two or more (meth)acryloyl groups in a molecule, whose terminals are caused to react with a (meth) acryl compound. The number-average molecular weight of such resins is preferably between 500 and 5,000.

Saturated polyesters that can be used for the present invention are those obtained by way of a condensation reaction of a saturated dibasic acid and a polyhydric alcohol. Unsaturated polyesters that can be used for the present invention are those obtained by way of a condensation reaction of a dibasic acid selected from a group of dibasic acids including α,β-unsaturated dibasic acids and a polyhydric alcohol. Note that, for the present invention, resins obtained by causing a terminal of an unsaturated polyester to react with a (meth)acryl compound are included in vinyl ester resins and should be discriminated from the unsaturated polyester resins that are described below.

Saturated dibasic acids as used herein include the compounds listed in the paragraph describing polyester polyols. Examples of α,β-unsaturated dibasic acids include maleic acid, maleic acid anhydride, fumaric acid, itaconic acid and itaconic acid anhydride. Polyhydric alcohols that can be used for the invention include the applicable compounds listed in the paragraph describing polyester polyols.

(Meth) acrylate compounds for polyester (meth)acrylate resins that can be used as vinyl ester resins include unsaturated glycidyl compounds, unsaturated monobasic acids such as acrylic acid and methacrylic acid and glycidyl esters thereof. The use of glycidyl (meth)acrylates is preferable.

Unsaturated polyester resins are obtained by way of condensation polymerization of an acid component and an alcohol component, using a known method. Any unsaturated polyester resins can be used without limitations so long as such resins are known as thermosetting resins. Examples of candidate acid components include unsaturated dibasic acids such as maleic anhydride, maleic acid, fumaric acid and itaconic acid. If necessary, saturated dibasic acids such as phthalic acid, phthalic anhydride, isophthalic acid, terephthalic acid, succinic acid, adipic acid and sebacic acid and acids other than dibasic acids such as benzoic acid and trimellitic acid can be used. Examples of alcohol components include the polyhydric alcohols listed in the paragraph describing polyester polyols.

(b) Modifying Agent

The component (d) to be used for the present invention is a modifying agent.

The (d) modifying agent may be at least one item selected from a group of polyols (b-1) having a hydroxyl value of 40 to 330 mgKOH/g, polyols (b-2) having a hydroxyl value of 40 to 330 mgKOH/g and an acid value of 2 to 20 mgKOH/g, modified rubbers (b-3), compounds (b-4) having an epoxy equivalent of 150 to 700 g/mol and fluorine-based resins (b-5) having a hydroxyl value of 40 to 330 mgKOH/g.

(i) Polyols (b-1) having a hydroxyl value of 40 to 330 mgKOH/g will be described below.

The hydroxyl value of the component (b) contributes to improvement of selective adhesiveness relative to the adherend (soft or hard vinyl chloride resin; polystyrene; polycarbonate; glass; aluminum; steel plate (e.g., SPCC); copolymer of polyolefin resin modified by a polar group-containing compound or olefin and a polar group-containing compound; magnesium; acrylonitrile-butadiene-styrene copolymer; polyester-based resin; or acryl-based resin) that characterizes the present invention.

Examples of (i) polyols (b-1) having a hydroxyl value of 40 to 330 mgKOH/g include aromatic-based, aliphatic-based, polybutadiene-based, castor oil-based and polyisoprene-based polyols. Polyols of any of the above types provide an excellent selective adhesive force relative to the adherend (soft or hard vinyl chloride resin; polystyrene; polycarbonate; glass; aluminum; steel plate; concrete; wood panel; stone; artificial marble; polyolefin resin or copolymer of polyolefin resin modified by a polar group-containing compound or olefin and a polar group-containing compound; magnesium; acrylonitrile-butadiene-styrene copolymer; polyester-based resin; polyurethane-based resin; epoxy-based resin; or acryl-based resin).

(i) Thus, the hydroxyl value is preferably 40 to 330 mgKOH/g, more preferably 150 to 300 mgKOH/g, from the viewpoint of adhesiveness.

(i) Polyols (b-1) that can more preferably be used for the present invention in terms selective adhesive force relative to the adherend (soft or hard vinyl chloride resin; polystyrene; polycarbonate; glass; aluminum; steel plate; concrete; wood panel; stone; artificial marble; polyolefin resin or copolymer of polyolefin resin modified by a polar group-containing compound or olefin and a polar group-containing compound; magnesium; acrylonitrile-butadiene-styrene copolymer; polyester-based resin; polyurethane-based resin; epoxy-based resin; or acryl-based resin) include:

(i) castor oil-based polyols (b-1-1) having a hydroxyl value of 40 to 330 mgKOH/g, (i) polybutadiene-based polyols (b-1-2) having a hydroxyl value of 40 to 330 mgKOH/g, (i) polyisoprene based polyols and hydrogenated additives thereof (b-1-3) having a hydroxyl value of 40 to 330 mgKOH/g or (i) epoxy polyol resins (b-1-4) having a hydroxyl value of 40 to 330 mgKOH/g.

If necessary, two or more of polyols of component (b) can be used as mixture for the present invention.

(i) castor oil-based polyols (b-1-1) having a hydroxyl value of 40 to 330 mgKOH/g will be described below.

The "castor oil" is a kind of oil that contains triester compounds of ricinoleic acid and glycerin. Ordinarily, it is natural oil or processed natural oil but synthesized oil may be used for the present invention provided that it contains such compounds. The ricinoleic acid employed to form the triester compounds contained in castor oil is preferably not less than 90 mol % of the fatty acids contained to produce the entire triester compounds. The castor oil to be used for the present invention may be a processed product such as a hydrogenated additive (obtained by hydrogenation relative to the carbon-carbon unsaturated bonds in the ricinoleic acid skeleton). Normally, castor oil contains the triester compounds (hydrogenated additive of trimester compounds if appropriate) equivalent to not less than 90 mol % (and up to 100 mol %) of the entire oil.

The "castor oil-based polyols" are ester compounds of ricinoleic acid and/or hydrogenated ricinoleic acid and polyhydric alcohol. For the purpose of the present invention, both polyols obtained by using castor oil as starting material and polyols obtained by using a starting material other than castor oil may be used so long as they have such a composition. The polyhydric alcohols that can be used for the present invention are not subjected to any particular limitations.

Examples of castor oil-based polyols include polyols derived from castor oil and polyols obtained by modifying castor oil.

Polyols derived from castor oil are fatty acid ester based polyols originating from castor oil and include polyols obtained by substituting part of the ricinoleic acid of the glycerin ester by oleic acid, those obtained by esterification of ricinoleic acid that is obtained by saponifying castor oil with a short molecule polyol such as trimethylol propane or the like and mixtures of any of such polyol(s) and castor oil.

Examples of polyols obtained by modifying castor oil include vegetable oil-modified polyols, modified polyols having an aromatic skeleton (e.g., bisphenol A, etc.). Vegetable oil-modified polyols can be obtained by substituting part of ricinoleic acid of a glycerin ester with a higher fatty acid obtained from other plants such as linoleic acid, linolenic acid, oleic acid or the like obtained from soy beans oil, rapeseed oil, olive oil or the like.

Out of castor oil-based polyols as described above, (i) castor oil-based polyols (b-1-1) having a hydroxyl value of 40 to 330 mgKOH/g are preferable from the viewpoint of the advantages of the present invention. Furthermore, from the viewpoint improving of toughness (shock resistance), flexibility and adhesives to different materials of a bonding layer, (i) aromatic castor oil-based polyols (b-1-1-1) preferably having a hydroxyl value of 40 to 330 mgKOH/g, more preferably having a hydroxyl value of 150 to 240 mgKOH/g.

The component (b-1-1-1) is any of modified polyols derived from castor oil having an aromatic skeleton (e.g., bisphenol A, etc.). The component (b-1-1-1) is commercially available. Examples of commercially available component (b-1-1-1) include "URIC AC Series" (Itoh Oil Chemicals Co., Ltd.) and the like. Of such polyols, adducts obtained by adding polyalkylene glycol and bisphenol A to ricinoleic acid are preferable in terms of adhesiveness to soft or hard vinyl chloride resins; polystyrenes; polycarbonates; glass; aluminum; steel plate; copolymers of polyolefin resin modified by a polar group-containing compound or olefin and a polar group-containing compound; magnesium; acrylonitrile-butadiene-styrene copolymers; polyester-based resins; or acryl-based resins and can be expressed by formula (4) shown below.

(hydroxyl value: 168 to 187 mgKOH/mg, viscosity: 3,000 to 5,000 mPa·s/25° C.), AC-008 (hydroxyl value: 180 mgKOH/mg, viscosity: 1,600 mPa·s/25° C.) and AC-009 (hydroxyl value: 225 mgKOH/mg, viscosity: 1,500 mPa·s/25° C.).

(i) polybutadiene-based polyols (b-1-2) having a hydroxyl value of 40 to 330 mgKOH/g will be described below.

Examples of polybutadiene-based polyols that can be used for the present invention include homopolymers such as 1,2-polybutadiene polyols and 1,4-polybutadiene polyols; copolymers such as poly(pentadiene.butadiene) polyols, poly(butadiene.styrene) polyols and poly(butadiene.acrylonitrile) polyols; and hydrogenated polybutadiene-based polyols obtained by adding hydrogen atoms to any of them. Polybutadiene based polyols are commercially available and include "Poly bd R-15HT (hydroxyl value: 102.7 mgKOH/mg, Mw: 1,200)" and "Poly bd R-45HT (hydroxyl value: 46.6 mgKOH/mg, Mw: 2,800)" manufactured by Idemitsu Co., Ltd.

From the viewpoint of the advantages of the present invention, the hydroxyl value of (b-1-2) polybutadiene-based polyols is preferably 40 to 330 mgKOH/g, more preferably 40 to 110 mgKOH/g.

The weight average molecular weight (GPC method) of (b-1-2) polybutadiene-based polyols is preferably between 50 and 3,000, more preferably between 800 and 1,500.

(i) polyisoprene-based polyols and hydrogenated additives thereof (b-1-3) having a hydroxyl value of 40 to 330 mgKOH/g will be described below.

Examples of component (b-1-3) include "Poly ip (trade name)" (liquid polyisoprene having hydroxyl groups at its terminals) available from Idemitsu Co., Ltd. Poly ip (trade name) (hydroxyl value: 46.6 mgKOH/mg, Mn: 2,500) is a polyisoprene type liquid polymer having highly reactive hydroxyl groups at molecular terminals. Hydrogenated additives of such polyols include "Epol (trade name)" ((liquid polyolefin having hydroxyl groups at its terminals). "Epol (trade name)" (hydroxyl value: 50.5 mgKOH/mg, Mn: 2,500) is a liquid polyolefin obtained by hydrogenating "Poly ip (trade name)." It scarcely has double bonds remaining in the molecule.

(i) epoxy polyol resins (b-1-4) having a hydroxyl value of 40 to 330 mgKOH/g (i) epoxy polyol resins (b-1-4) having a hydroxyl value of 40 to 330 mgKOH/g that can be used for the present invention are obtained by causing active hydrogen compounds to react with epoxy resins.

Examples of epoxy resins that can be used for the present invention include polyglycidyl ether compounds of mono-

[chemical formula 1]

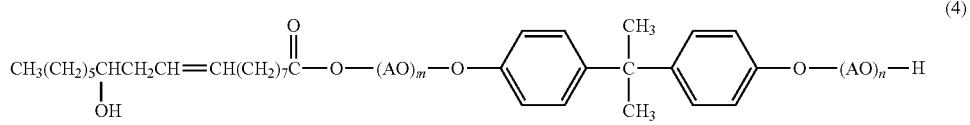

(4)

in formula (4),
where m represents an average number between 2 and 5 and n represents an average number between 2 and 5.

Examples of modified polyols derived from castor oil expressed by the above formula (4) include those commercially available from Itoh Oil Chemicals Co., Ltd. under the trade names of URIC AC-005 (hydroxyl value: 194~214 mgKOH/mg, viscosity: 700 to 1,500 mPa·s/25° C.), AC-006 nuclear polyhydric phenol compounds such as hydroquinone, resorcin, pyrocatechol and phloroglucinol; polyglycidyl ether compounds of polynuclear polyhydric phenol compounds such as dihydroxynaphthalene, biphenol, methylene bisphenol (bisphenol F), methylene bis(orthocresol), ethylidene bisphenol, isopropylidene bisphenol (bisphenol A), isopropylidene bis(orthocresol), tetrabromobisphenol A, 1,3-bis(4-hdyroxycumylbenzene), 1,4-bis(4-hydroxycumylbenzene), 1,1,3-tris(4-hydroxyphenyl)butane, 1,1,2,2,-tetra(4-hydroxyphenyl)ethane, thiobisphenol, sulfobisphenol, oxybisphenol, phenol novolac, orthocresol novolac, ethylphenol novolac, butylphenol novolac, octylphenol novolac, resorcin novolac, bisphenol A novolac, bisphenol F novolac and terpene diphenol; polyglycidyl ether compounds of ethylene oxides and/or propylene oxides adducts of mononuclear polyhydric phenol compounds or polynuclear polyhydric phenol compounds as described above; polyglycidyl ether compounds of hydrogenated additives of mononuclear polyhydric phenol compounds as described above; polyglycidyl ethers of polyhydric alcohols such as ethylene glycol, propylene glycol, butylene glycol, hexane diol, polyglycol, thiodiglycol, glycerin, trimethylol propane, pentaerythritol, sorbitol and bisphenol A-ethylene oxide adduct; monopolymers and copolymers of glycidyl esters of fatty, aromatic and aliphatic polybasic acids and glycidyl methacrylate such as maleic acid, fumaric acid, itaconic acid, succinic acid, glutaric acid, suberic acid, adipic acid, azelaic acid, sebacic acid, dimer acid, trimer acid, phthalic acid, isophthalic acid, terephthalic acid, trimellitic acid, trimesic acid, pyromellitic acid, tetrahydrophthalic acid, hexahydrophthalic acid and endomethylene tetrahydrophthalic acid; epoxy compounds having glycidyl amino groups such as N,N-diglycidyl aniline and bis(4-(N-methyl-N-glycidylamino)phenyl) methane; epoxy compounds of cyclic olefin compounds such as vinylcyclohexene diepoxide, dicyclopentadiene epoxide, 3,4-epoxycyclohexylmethyl-3,4-epoxycyclohexane carboxylate, 3,4-epoxy-6-methylcyclohexylmethyl-6-methylcyclohexane carboxylate and bis(3,4-epoxy-6-methylcyclohexylmethyl) adipate; epoxydized conjugated diene polymers such as epoxydized polybutadiene and epoxydized styrene-butadiene copolymers and heterocyclic compounds such as triglycidyl isocyanurate. Epoxy resins as listed above may be internally cross-linked by terminal isocyanate prepolymers.

Of the above-listed epoxy resins, the use of bisphenol-type epoxy resins such as polyglycidyl ether compounds including bisphenol, methylene bisphenol (bisphenol F), methylene bis(orthocresol), ethylidene bisphenol (bisphenol AD), isopropylidene bisphenol (bisphenol A), isopropylidene bis(orthocresol), tetrabromobisphenol A, 1,3-bis(4-hydroxycumylbenzen) and 1,4-bis(4-hydroxycumylbenzen) is preferable to obtain paint film that is excellent in terms of adhesiveness and decorativeness.

(i) Epoxy polyol resins (b-1-4) having a hydroxyl value of 40 to 330 mgKOH/g can be obtained by way of a reaction of the epoxy groups of any of the above-listed epoxy resins and an active hydrogen compound such as a carboxylic acid compound, a polyol or an amino compound.

Examples of the carboxylic acid compounds include fatty, aromatic and alicyclic ring monocarboxylic acids such as acetic acid, propionic acid, 2,2-dimethylol propionic acid, 1,2-hydroxy stearic acid, lactic acid, butyric acid, octylic acid, ricinoleic acid, lauric acid, benzoic acid, toluic acid, cinnamic acid, phenylacetic acid as well as cyclohexane carboxylic acid; maleic acid, fumaric acid, itaconic acid, succinic acid, glutaric acid, adipic acid, dimer acid, phthalic acid, isophthalic acid, terephthalic acid, hexahydric acid and hydroxypolycarboxylic acid.

Examples of polyols as described above include low-molecular polyols such as ethylene glycol, diethylene glycol, 1,2-propylene glycol, 1,3-popylene glycol, 2-methyl-1,3-propylene glycol, 2,2-dimethyl-1,3-propylene glycol, 1,2-butanediol, 1,3-butanediol, 1,4-butanediol, 1,5-pentanediol, 2,2,4-trimethyl-1,5-pentanediol, 1,6-hexanediol, 2-ethyl-1,6-hexanediol, 1,2-octanediol, 1,8-octanediol, 2-methyl-1,8-octanediol, 1,9-nonanediol, 1,10-decanediol, 1,12-octadecanediol, glycerin, trimethylolpropane and pentaerythritol.

Examples of amino compounds as described above include dialkyl amine compounds such as dibutyl amine and dioctyl amine; alkanol amine compounds such as methylethanol amine, butylethanol amine, diethanol amine, diisopropanol amine and dimethylaminopropylethanol amine; and heterocyclic amine compounds such as morpholine, piperidine and 4-methylpiperidine.

Among the above-listed active hydrogen compounds, alkanol amine compounds such as dimethanol amine are preferable.

Additionally, epoxy resin chains can be extended by means of a compound having two or more active hydrogen groups such as monoethanol amine and monoisopropanol amine.

When causing epoxy resin to react with an active hydrogen compound, known ordinary methods of adding an active hydrogen compound to the epoxy resin can be adopted. For example, a method of causing them to react with each other by heating to 60 to 200° C. for 3 to 10 hours in the presence of a known catalyst such as a tertiary amine compound or a phosphonium salt can be employed.

(i) Epoxy polyol resins (b-1-4) having a hydroxyl value of 40 to 330 mgKOH/g, preferably have a hydroxyl value between 100 and 140 mgKOH/g from the viewpoint of the advantages of the present invention.

Examples of (i) epoxy polyol resins (b-1-4) having a hydroxyl value of 40 to 330 mgKOH/g include EPICLON U-125-60BT (hydroxyl value: 100 to 140 mgKOH/g) available from DIC Co., Ltd.

Polyols (b-2) having (i) a hydroxyl value of 40 to 330 mgKOH/g and (ii) an acid value of 2 to 20 mgKOH/g will be described below.

As polyols (b-2) having (i) a hydroxyl value of 40 to 330 mgKOH/g and (ii) an acid value of 2 to 20 mgKOH/g, aromatic based, aliphatic based and castor oil-based polyols show an improved selective adhesive force (an improved adhesive force between different materials in particular) relative to the adherend (soft or hard vinyl chloride resin; polystyrene; polycarbonate; glass; aluminum; steel plate; copolymer of polyolefin resin modified by a polar group-containing compound or olefin and a polar group-containing compound; magnesium; acrylonitrile-butadiene-styrene copolymer; polyester-based resin; or acryl-based resin) is characterized of the present invention, if they satisfy both the hydroxyl value requirement of (i) and the acid value requirement of (ii). The hydroxyl value of (i) is more preferably 230 to 300 mgKOH/g. The acid value of (ii) is more preferably 4 to 15 mgKOH/g.

If both the requirement of (i) and that of (ii) are satisfied, examples of polyols (b-2) having (i) a hydroxyl value of 40 to 330 mgKOH/g and (ii) an acid value of 2 to 20 mgKOH/g include:

castor oil based polyols (b-2-1) having (i) a hydroxyl value of 40 to 330 mgKOH/g and (ii) an acid value of 2 to 20 mgKOH/g.

Castor oil-based polyols (b-2-1) having (i) a hydroxyl value of 40 to 330 mgKOH/g and (ii) an acid value of 2 to 20 mgKOH/g are polyols derived from castor oil. For example, a polyol composition containing a castor oil-based polyol derived from ricinoleic acid, an acid phosphate ester compound having a total number of carbon atoms of not less than 12 and, if necessary, a terpene phenol as disclosed in Japanese Patent Application Laid-Open Publication No.

2005-89712 can be used. Such compositions are available from Itoh Oil Chemicals Co., Ltd. under the trade names of URIC H-1262, H2151U.

The above-cited URIC H-1262 that is available from Itoh Oil Chemicals Co., Ltd. is a polyol (viscosity: 3,500 to 8,500 mPa·s/25° C., hydroxyl value: 240 to 290 (unit mgKOH/g), acid value: 4 to 15 (unit mgKOH/g)) containing a castor oil-based polyol and an acid phosphate ester compound having a total number of carbon atoms of not less than 12. It shows an excellent adhesiveness relative to the layer of soft or hard vinyl chloride resin; polystyrene; polycarbonate; glass; aluminum; steel plate; copolymer of polyolefin resin modified by a polar group-containing compound or olefin and a polar group-containing compound; magnesium; acrylonitrile-butadiene-styrene copolymer; polyester-based resin; or acryl-based resin; particularly in terms of adhesiveness to metals and hydrolysis resistance. The above-cited URIC H-2151U that is also available from Itoh Oil Chemicals Co., Ltd. is a polyol (viscosity: 3,500 to 8,500 mPa·s/25° C., hydroxyl value: 240 to 290 (unit mgKOH/g), acid value: 4 to 15 (unit mgKOH/g)) containing a castor oil-based polyol, an acid phosphate ester compound having a total number of carbon atoms of not less than 12 and a terpene phenol. It shows an excellent adhesiveness relative to the layer of soft or hard vinyl chloride resin; polystyrene; polycarbonate; glass; aluminum; steel plate; copolymer of polyolefin resin modified by a polar group-containing compound or olefin and a polar group-containing compound; magnesium; acrylonitrile-butadiene-styrene copolymer; polyester-based resin; or acryl-based resin, particularly in terms of adhesiveness to metals and hydrolysis resistance.

Now, modified rubbers (b-3) will be described below.

Examples of modified rubbers (b-3) that can be used for the present invention include (b-3-1) liquid carboxylated polyisoprene and (b-3-2) carboxylated polybutadiene.

(b-3-1) Carboxylated Polyisoprene

Carboxylated polyisoprene (b-3-1) that can be used for the present invention has a functional feature of boosting the wettability of the surface of the substrate and improving the adhesiveness when an adhesive composition according to the present invention is bonded to a metal substrate or a glass substrate.

Examples of component (b-3-1) include as maleated polyisoprene available from Kuraray under the trade name of LIR-420.

(b-3-2) Carboxylated Polybutadiene

Carboxylated polybutadiene (b) that can be used for the present invention has a functional feature of boosting the wettability of the surface of the substrate and improving the adhesiveness when an adhesive composition according to the present invention is bonded to a metal substrate or a glass substrate.

Component (b-3-2) is a polymer that is transparent liquid at room temperature and has a micro structure consisting of vinyl 1,2-bond type, trans 1,4-bond type and cis 1,4-bond type in the main chain of polybutadiene. The vinyl 1,2-bond is preferably not more than 30 wt %. The achieved storage stability of the adhesive component is degraded and hence not preferable when the vinyl 1,2-bond exceeds 30 wt %. The cis 1,4-bonds are preferably not less than 40 wt %. The achieved adhesiveness falls and is not preferable when the cis 1,4-bonds are less than 40 wt %.

Component (b-3-2) of carboxylated polybutadiene can be obtained by causing liquid polybutadiene to react with a carboxyl group-introduced compound and the ratio of 1,3-butadiene from which the liquid polybutadiene is formed and that of the carboxyl group-introduced compound is preferably such that 1,3-butadiene takes and the carboxyl group-introduced compound respectively take 80 to 98 wt % and 2 to 20 wt %.

Liquid polybutadiene to be used for the reaction has a number-average molecular weight of preferably 500 to 10,000, more preferably 1,000 to 7,000 and desirably shows a broad molecular weight distribution. Preferably, such liquid polybutadiene has an iodine value of iodine 30 to 500 g/substance 100 g as observed by a method conforming to DIN 53241. In addition, such liquid polybutadiene preferably has a molecular structure where cis-double bonds take 70 to 90%, trans-double bonds take 10 to 30% and vinyl double bonds take 0 to 3%.

Examples of carboxyl group-introduced compounds that can be used for the present invention include ethylene-based unsaturated carboxyl compounds such as ethylene-based unsaturated dicarboxylic acid and anhydrides and monoesters thereof. Specific examples include maleic acid, fumaric acid, itaconic acid, 3,6-tetrahydrophthalic acid, itaconic anhydride, 1,2-dimethyl maleic anhydride, maleic monomethyl ester and maleic monoethyl ester, of which maleic anhydride is preferable from the viewpoint of safety, economy and reactivity. (Maleated polybutadiene is preferable).

Polybutadiene/maleic anhydride-adducts formed from polybutadiene and maleic anhydride can be manufactured by means of any known method.

The acid value of maleated liquid polybutadiene is preferably between 50 and 120 (mgKOH/g), more preferably between 70 and 90 (mgKOH/g) as observed by a method conforming to DIN ISO 3682. The adhesiveness of the adhesive compound falls when the acid value is less than 50 (mgKOH/g), whereas the viscosity thereof rises to damage the working property thereof when the acid value exceeds 120 (mgKOH/g).

In view of the trade off between the percentage of maleation and the viscosity of maleated liquid polybutadiene, the percentage is preferably between 6 and 20%, more preferably between 6 and 15%, most preferably between 7 and 10%.

The viscosity (20° C.) of maleated liquid polybutadiene is preferably between 3 and 16 Pa·s, more preferably between 5 and 13 Pa·s, most preferably between 6 and 9 Pa·s, as observed by a method conforming to DIN 53214.

Maleated liquid polybutadiene of which the vinyl-double bonds are not more than 30% and the cis double bonds are within the above cited range shows a higher flexibility and a high percentage of maleation (acid value) as described above if compared with liquid polybutadiene whose cis-double bonds fall below the above-described lower limit. Thus, adhesive compound obtained from such maleated liquid polybutadiene show a high adhesiveness and well polar is provided. The adhesive composition according to the present invention, that is excellent in terms of flexible, flexibility and decorativeness.

The viscosity of liquid polybutadiene whose cis-double bonds fall below the above-described lower limit suddenly rises as the percentage of maleation rises, whereas the viscosity of liquid polybutadiene whose cis-double bonds are found within the above range does not show such a sudden rise. Because the viscosity of such liquid polybutadiene is found within the above range and hence low, it can provide a high reactivity and an improved working property. Additionally, adhesive composition obtained from such liquid polybutadiene are excellent in terms of decorativeness.

Examples of commercially available maleated liquid polybutadiene include POLYVEST OC 800S and 1200S (trade names) available from Evonik Degussa Corporation.

Now, compounds (b-4) having an epoxy equivalent of 150 to 700 g/mol will be described below.

Compounds (b-4) having an epoxy equivalent of 150 to 700 g/mol that can be used for the present invention include polyepoxy compounds (b-4-1) having an epoxy equivalent of 150 to 250 g/mol.

With the composition according to the present invention, examples of polyepoxy compounds (d-4-1) having an epoxy equivalent of 150 to 250 g/mol include polyglycidyl ether compounds of mononuclear polyhydric phenol compounds such as hydroquinone, resorcin, pyrocatechol and phloroglucinol; polyglycidyl ether compounds of polynuclear polyhydric phenol compounds such as dihydroxy naphthalene, biphenol, methylene bisphenol (bisphenol F), methylene bis(orthocresol), ethylidene bisphenol, isopropylidene bisphenol (bisphenol A), isopropylidene bis(orthocresol), tetrabromo bisphenol A, 1,3-bis(4-hdyroxycumylbenzene), 1,4-bis(4-hydroxycumylbenzene), 1,1,3-tris(4-hydroxyphenyl)butane, 1,1,2,2,-tetra(4-hydroxyphenyl)ethane, thiobisphenol, sulfobisphenol, oxybisphenol, phenol novolac, orthocresol novolac, ethylphenol novolac, butylphenol novolac, octylphenol novolac, resorcin novolac and terpene phenol; polyglycidyl ethers of polyhydric alcohols such as ethylene glycol, propylene glycol, butylene glycol, hexane diol, polyglycol, thiodiglycol, glycerin, trimethylol propane, pentaerythritol, sorbitol and bisphenol A-ethylene oxide adduct; monopolymers and copolymers of glycidyl esters of fatty, aromatic and aliphatic polybasic acids and glycidyl methacrylate such as maleic acid, fumaric acid, itaconic acid, succinic acid, glutaric acid, suberic acid, adipic acid, azelaic acid, sebacic acid, dimer acid, trimer acid, phthalic acid, isophthalic acid, terephthalic acid, trimellitic acid, trimesic acid, pyromellitic acid, tetrahydrophthalic acid, hexahydrophthalic acid and endomethylene tetrahydrophthalic acid; epoxy compounds having glycidyl amino groups such as N,N-diglycidyl aniline and bis(4-(N-methyl-N-glycidylamino)phenyl) methane and diglycidyl orthotoluidine; epoxy compounds of cyclic olefin compounds such as vinylcyclohexene diepoxide, dicyclopentadiene diepoxide, 3,4-epoxycyclohexylmethyl-3,4-epoxycyclohexane carboxylate, 3,4-epoxy-6-methylcyclohexylmethyl-6-methylcyclohexane carboxylate and bis(3,4-epoxy-6-methylcyclohexylmethyl) adipate; epoxydized conjugated diene polymers such as epoxydized polybutadiene and epoxydized styrene-butadiene copolymers; and heterocyclic compounds such as triglycidyl isocyanurate.

Examples of epoxy compounds having an epoxy equivalent of 150 to 250 g/mol (b-4-1) to be used for the present invention, the use bisphenol-type epoxy resins such as polyglycidyl ethers of bisphenol compounds include biphenol, methylene bisphenol (bisphenol F), methylene bis(orthocresol), ethylidene bisphenol, isopropylidene bisphenol (bisphenol A), isopropylidene bis(orthocresol), tetrabromo bisphenol A, 1,3-bis(4-hydroxycumylbenzen), 1,4-bis(4-hydroxycumylbenzen), 1,1,3-tris(4-hydroxyphenyl)butane, 1,1,2,2,-tetra(4-hydroxyphenyl)ethane, thiobisphenol, sulfobisphenol, oxybisphenol and terpene diphenol is preferable to obtain paint film that is more preferable in terms of metal adhesiveness.

Examples of commercially available products of polyglycidyl ethers of bisphenol compounds having an epoxy equivalent of 150 to 250 g/mol include Adeka Resin EP-4100E (available from ASAHI DENKA KOGYO KK, bisphenol A diglycidyl ether, epoxy equivalent: 190).

Compounds (b-4) having an epoxy equivalent of 150 to 700 g/mol that can be used for the present invention also include polyolefin-based polymers (b-4-2) having an epoxy equivalent of 500 to 700 g/mol. Of such polyolefin-based polymers, those that have a hydroxyl group at one terminal and into which epoxy groups are introduced are preferable. Of such preferable polymers those that are liquid are more preferable.

Examples of commercially available polymers (b-4) having an epoxy equivalent of 150 to 700 g/mol that can be used for the present invention include L-207 (KRATON LIQUID (trade name) also named as L-207 POLYMER) available from Kuraray. L-207 is a polymer having an epoxy equivalent of 590 g/mol, a hydroxyl equivalent of 7,000 g/mol and a glass transition temperature of −53° C. with a completely saturated skeleton (epoxidized ethylene.propylene-ethylene-butylene-OH structure). The use of this polymer is preferable in terms of adhesiveness to metal.

Now, fluorine-based resins (b-5) will be described below.

Fluorine-based resins (b-5) that can be used for the present invention are above all fluorine-based resins having an hydroxyl value between 40 and 330 mgKOH/g.

Such a fluorine-based resin can appropriately be selected from polyvinyl fluoride (PVF), polyvinylidene fluoride (PVDF), polychloro trifluoroethylene (PCTFE), polyethylene tetrafluoroethylene (ETFE), polytetrafluoroethylene (PTFE), tetrafluoroethylene perfluoroalkyl vinylether copolymer (PFA), tetrafluoroethylene hexafluoropropylene copolymer (FEP), chlorotrifluoroethylene ethylene copolymer (ECTFE), fluoroolefin.vinyl ether copolymer or acrylic modified products of any of them.

In particular, examples of solvent-soluble type fluorine resins include copolymers of fluoroolefins and hydrocarbon-based monomers such as vinyl ethers and vinyl esters. Thus, fluorine-containing polymers having a reactive group such as a hydroxyl group, a carboxylic group, a hydrolytic silyl group or an epoxy group can be employed. Examples of fluorine-containing polymers include copolymers of chlorotrifluoroethylene, cyclohexyl vinyl ether, alkyl vinyl ether and hydroxyalkyl vinyl ether; copolymers of chlorotrifluoroethylene, alkylvinyl ether and aryl alcohol and copolymers of chlorotrifluoroethylene, aliphatic carboxylic acid vinyl ester, hydroxylalkyl vinyl ester. Such copolymers are commercially available typically under the trade names of Lumiflon (Asahi Glass Co., Ltd.) and Cefral Coat (Central Glass Co., Ltd.). Examples of such products include Lumiflon LF-550, LF-552, LF-554, LF-600, LF-601, LF-602, LF-100, LF-200, LF-302, LF-400, LF-700, LF-916 and LF-936.

Of the above-listed copolymers, polyvinylidene fluoride (PVDF), polyvinyl fluoride (PVF), chlorotrifluoroethylene-.ethylene copolymer (ECTFE), polychlorotrifluoroethylene (PCTFE) and fluoroolefin.vinyl ether copolymer are preferable and polyvinylidene fluoride (PVDF) and fluoroolefin-.vinyl ether copolymer are more preferable from the viewpoint of solvent solubility and adhesiveness relative to various substrates including substrates of glass, polycarbonate based resins, polyester based resins, cellulose based resins, liquid crystal polymers and ethylene-vinyl acetate copolymers (to be also referred to specific substrates hereinafter) and particularly EVA adhesiveness.

(b-5) fluorine-based resins can provide compositions with various properties such as heat resistance, cold resistance, chemical resistance, flame retardancy, electric characteristics, low friction, non-viscosity, weather resistance, UV protection and low refractivity.

Component (c) a vinyl monomer and/or a (meth)acrylate monomer

The component (c) of a paint and an adhesive composition according to the present invention is a vinyl monomer and/or a (meth)acrylate monomer. Specific examples of such monomers include trimethylolpropane tri(meth)acrylate, pentaerythritol tri(meth)acrylate, ethyleneglycol di(meth)acrylate, tetraethylene glycol di(meth)acrylate, polyethylene glycol di(meth)acrylate, 1,4-butanediol di(meth)acrylate, 1,6-hexanediol di(meth)acrylate, neopentylglycol di(meth)acrylate, trimethylolpropane trioxyethyl (meth)acrylate, tris (2-hydroxyethyl) isocyanulate tri(meth)acrylate, tris(2-hydroxyethyl) isocyanulate di(meth)acrylate and tricyclodecane dimethanol di(meth)acrylate.

Other examples include hydroxyethyl (meth)acrylate, 2-hydroxypropyl (meth)acrylate, 2-hydroxybutyl (meth)acrylate, methyl (meth)acrylate, ethyl (meth)acrylate, propyl (meth)acrylate, isopropyl (meth)acrylate, butyl (meth)acrylate, amyl (meth)acrylate, isobutyl (meth)acrylate, t-butyl (meth)acrylate, pentyl (meth)acrylate, isoamyl (meth)acrylate, hexyl (meth)acrylate, heptyl (meth)acrylate, octyl (meth)acrylate, isooctyl (meth)acrylate, 2-ethylhexyl (meth)acrylate, nolyl (meth)acrylate, decyl (meth)acrylate, isodecyl (meth)acrylate, undecyl (meth)acrylate, dodecyl (meth)acrylate, lauryl (meth)acrylate, tetrahydrofurfuryl (meth)acrylate, butoxyethyl (meth)acrylate, ethoxydiethylene glycol (meth)acrylate, benzyl (meth)acrylate, cyclohexyl (meth)acrylate, phenoxyethyl (meth)acrylate, polyethylene glycol mono(meth)acrylate, polypropylene glycol mono (meth)acrylate, methoxyethylene glycol (meth)acrylate, ethoxyethoxy ethyl (meth)acrylate, methoxy polyethylene glycol (meth)acrylate, methoxy polypropylene glycol (meth)acrylate, dicyclopentadiene (meth)acrylate, dicyclopentanyl (meth)acrylate, dicyclopentenyl (meth)acrylate, tricyclodecanyl (meth)acrylate, isobornyl (meth)acrylate, bornyl (meth)acrylate, diacetone (meth)acrylate, isobutoxymethyl (meth)acrylamide, N-vinyl pyrrolidone, N-vinyl caprolactam, N,N-dimethyl (meth)acrylamide, t-octyl (meth)acrylamide, dimethylamino ethyl (meth)acrylate, diethylamino ethyl (meth)acrylate, 7-amino-3,7-dimethyl-octyl (meth)acrylate, N,N-diethyl (meth) acrylamide, N,N-dimethylaminopropyl (meth) acrylamide, (meth)acryloyl morphorine and vinyl ethers such as hydroxylbutyl vinyl ether, laurylvinyl ether, cetylvinyl ether and 2-ethyl hexyl-vinyl ether.

The component (c) vinyl that is a vinyl monomer and/or a (meth)acrylate monomer of a paint and an adhesive composition according to the present invention is preferably at least one item selected from compounds (c-1) having a ring structure and an ethylenically unsaturated group and compounds (c-2) having no ring structure and having an ethylenically unsaturated group, more preferably the compound (c-1) and the compound (c-2) in combination from the viewpoint of high hardness revealing property, quick dryability, adhesiveness, non-yellowing property and low-viscosity revealing property.

(c-1) The component (c-1) having a ring structure and an ethylenically unsaturated group that is to be used for the present invention is a compound having a ring structure and an ethyelenically unsaturated group. Examples of component compounds (c-1) include alicyclic structure-containing (meth)acrylates such as isobornyl (meth)acrylate, bornyl (meth)acrylate, tricyclodecanyl (meth)acrylate and dicyclopentanyl (meth)acrylate; benzyl (meth)acrylate, 4-butyl cyclohexyl (meth)acrylate, acryloyl morpholine, vinyl imidazole and vinyl pyridine. Furthermore they include compounds expressed by any of formulas (1) through (3) shown below.

[chemical formula 2]

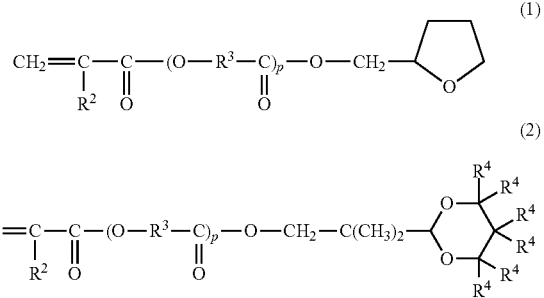

(where $R^2$ represents a hydrogen atom or a methyl group and $R^3$ represents an alkylene group with a carbon number between 2 and 8, preferably between 2 and 5, while $R^4$ represents a hydrogen atom or a methyl group and p preferably represents a number between 1 and 4.)

[chemical formula 3]

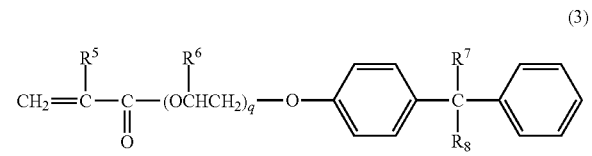

(where $R^5$, $R^6$, $R^7$ and $R^8$ are independent from each other and H or $CH_3$ and q is an integer between 1 and 5.)

When (c-1) and (c-2) are used in combination, the compounding ratio thereof is 80 to 20 parts by mass, preferably 75 to 25 parts by mass, for (c-1) and 20 to 80 parts by mass, preferably 25 to 75 parts by mass, for (c-2), provided that (c-1)+(c-2)=100 parts by mass. When the component (c-1) and (c-2) are used in combination with the above parts, a pant and an adhesive composition according to the present invention excellently show scratch resistance, flexibility and pencil hardness and hence can also be used for surface of hard coat layers. They are excellent in terms of pencil hardness, flexibility and abrasion resistance and hence can be used for hard coats depending on applications when urethane (meth)acrylate is used as component (a) in combination with components (c-1) and (c-2) with the above ratios.

When a cycloalkene or an alicyclic vinyl compound is used as component (c) in a paint and an adhesive composition according to the present invention, the layer (A) of the paint or the adhesive composition becomes a hard coat. Therefore, the paint or the adhesive composition preferably contains such a compound, if it is for an application where it desirably becomes a hard coat, whereas it preferably does not contain such a compound if it is for an application where it desirably does not become a hard coat. Examples of cycloalkenes that can be used for the present invention include cyclobutene, cyclopentene, cycloheptene, cyclohexene, cycloheptene, 1,3-cyclohexadiene, 1,4-cyclohexadiene, 1,5-cyclooctadiene and cyclooctene. The carbon number of such cycloalkenes is typically between 4 and 20. Cyclopentadiene-based monomers can also be used for component (c). Cyclopentadiene-based monomers include cyclopentadiene and substitution derivatives thereof. Such substitution derivatives include alkyl substituted derivatives, alkylidenesubstituted derivatives and derivatives obtained by aromatic substitution. Such substitution derivatives may contain a polar group such as a halogen, a hydroxyl group, an ester group, an alkoxy group, a cyano group, an amide group, an imide group or a silyl group. The carbon number of cyclopentadiene monomers that can be used for the present invention is typically between 4 and 20. Specific examples of such cyclopentadiene include dicyclopentadiene, 2-methyl dicyclopentadiene, 2-ethyl dicyclopentadiene, 5-methyl dicyclopentadiene, 5,5-dimethyl dicyclopentadiene and 2,3-dihydro dicyclopentadiene. Examples of alicyclic vinyl compounds include cycloalkene vinyl compounds and cycloalkane vinyl compounds. Cycloalkene vinyl compounds that can be used for the present invention typically have an aliphatic ring having a double bond with a carbon member between 5 and 8 and also include a polymerizable vinyl group. The aliphatic ring may have an alkyl group with a carbon number between 1 and 4 or a halogen atom as substituent group. Examples of cycloalkene vinyl compounds include cyclopentene vinyl compounds such as 2-vinyl cyclopentene, 2-methyl-4-vinylpentene, 3-vinylcyclopentene, 3-t-butyl-4-vinyl pentene; cyclohexene vinyl compounds such as 4-vinyl cyclohexene, 4-isopropenylvinyl cyclohexene, 1-methyl-4-vinyl cyclohexene, 1-methyl-4-isopropenylvinyl cyclohexene, 2-methyl-4-vinyl cyclohexene, 2-methyl-4-isopropenyl vinyl cyclohexene; and cycloheptene vinyl compounds such as 2-vinyl cycloheptene, 3-vinyl cycloheptene, 4-vinyl cycloheptene, 3-methyl-6-vinyl cycloheptene, 4-ethyl-6-vinyl cycloheptene and 3-t-butyl-5-vinyl cycloheptene; and cyclooctene vinyl compounds such as 2-vinyl cyclooctene, 3-vinyl cyclooctene, 4-vinyl cyclooctene, 2-methyl-5-vinyl cyclooctene, 4-ethyl-6-vinyl cyclooctene and 3-t-butyl-7-vinyl cyclooctene. The cycloalkene vinyl compounds having a (meth)acryloyl group for a vinyl bond can be used for the present invention. Cycloalkane vinyl compounds having a saturated aliphatic ring with a carbon number between 5 and 8 and a polymerizable vinyl group can be used for the present invention. Such aliphatic rings can have an alkyl group with a carbon number between 1 and 4 or a halogen atom as substituent group. Examples of cycloalkane vinyl compounds include cyclopentane vinyl compounds such as 2-vinyl cyclopentane, 2-methyl-4-vinyl pentane, 3-vinyl cyclopentane and 3-t-butyl-4-vinyl pentane; cyclohexane vinyl compounds such as 4-vinyl cyclohexane, 4-isopropenyl vinyl cyclohexane, 1-methyl-4-vinyl cyclohexane, 1-methyl-4-isopropenyl vinyl cyclohexane, 2-methyl-4-vinylcyclohexane, 2-methyl-4-isopropenyl vinyl cyclohexane; cycloheptane vinyl compounds such as 2-vinyl cycloheptane, 3-vinyl cycloheptane, 4-vinyl cycloheptane, 3-methyl-6-vinyl cycloheptane, 4-ethyl-6-vinyl cycloheptane and 3-t-butyl-5-vinyl cycloheptane; cyclooctane vinyl compounds typically having a saturated aliphatic ring with a carbon number between 5 and 8 such as 2-vinyl cyclooctane, 3-vinyl cyclooctane, 4-vinyl cyclooctane, 2-methyl-5-vinyl cyclooctane, 4-ethyl-6-vinyl cyclooctane and 3-t-butyl-7-vinyl cyclooctane and cycloalkane vinyl ether compounds such as 1,4-cyclohexane dimethanol divinyl ether, cyclopentane vinyl ether, cyclohexane vinyl ether, cycloheptane vinyl ether, cyclooxane vinyl ether, 4-methyl cyclohexyl vinyl ether and cyclohexyl methyl vinyl ether. The cycloalkene vinyl compounds having a (meth) acryloyl group for a vinyl bond can be used for the present invention.

(d) Initiator

A paint and an adhesive composition according to the present invention require (d) an initiator as indispensable component.

Since the oligomer component (e.g., a vinyl ester resin or unsaturated polyester resin (a)) of a paint and an adhesive composition according to the present invention has a double bond such as (meth) acryloyl group, they can be cured with ease in a short period of time by heating, adding a thermal polymerization initiator, or by UV radiation or electron beam radiation using an UV fluorescent lamp or a high-pressure mercury lamp, adding a photopolymerization initiator. The use of UV radiation is preferable if heating an adherend and an adhesive composition is desirably to be avoided.

When a paint and an adhesive composition according to the present invention are cured by heating, they can be cured by heating them at temperature between room temperature and about 90° C. Examples of thermal polymerization initiators that can be used for the present invention include benzoyl peroxide, lauryoyl peroxide, succinic peroxide, methylethylketone peroxide, 2,5-dimethyl-2,5-di(tert-butylperoxy) hexane and cyclohexanone peroxide. If the half life temperatures (1 mm.) of peroxides are between 100° C. and 180° C., a satisfactory degree of hardness can be achieved by 80° C.×10 minutes to 160° C.×5 minutes.

Examples of photopolymerization initiators that can be used for the present invention include benzophenone, 2,4-dihydroxy benzophenone, 2-hydroxy-4-methoxy benzophenone, acetophenone, benzoin, benzoinethyl ether, benzoin-n-propyl ether, benzoin isopropyl ether, benzoin-n-butyl ether, benzoin isobutyl ether, benzyl-1-(4-isopropylphenyl)-2-hydroxy-2-methylpropane-1-on, 2-hydroxy-2-methyl 1-phenylpropane-1-on, benzyl sulfide, thioxanthone, bis(2, 4,6-trimethylbenzoyl)-phenylphosphine oxide and 2-chloro thioxanthone.

(Compounding Ratio of Paint and that of Adhesive Composition)

In a paint and an adhesive composition according to the present invention, the component (a) is compounded by 20 to 40 mass % with the other components from the viewpoint of adhesiveness, flexibility and shock resistance. More preferably, the component (a) is compounded by 25 to 35 mass % from the viewpoint of easily workable viscosity. The adhesiveness of a paint and an adhesive composition according to the present invention is degraded and the workability thereof falls due to an increased viscosity when the compounding ratio of the component (a) exceeds 40 mass %. On the other hand, when the compounding ratio of the component (a) is not more than 20 mass %, is degraded the adhesiveness, flexibility and shock resistance thereof relative to a layer of soft or hard vinyl chloride resin; polystyrene; polycarbonate; glass; aluminum; steel plate; concrete; wood panel; stone; artificial marble; polyolefin resin or copolymer of polyolefin resin modified by a polar group-containing compound or olefin and a polar group-containing compound; magnesium; acrylonitrile-butadiene-styrene copolymer; polyester-based resin; polyurethane-based resin; epoxy-based resin or acryl-based resin.

In a paint and an adhesive composition according to the present invention, the component (b) is compounded by 0.1 to 50 mass % with the other components from the viewpoint of adhesiveness and flexibility. The component (b) is compounded more preferably by 10 to 30 mass % and most preferably by 10 to 25 mass % from the viewpoint of adhesiveness, toughness (shock resistance) and bleed resistance. The bleed resistance of a paint and an adhesive composition according to the present invention is degraded to by turn reduce the toughness (shock resistance) and the adhesive force thereof when the compounding ratio of the component (b) exceeds 50 mass %. On the other hand, the adhesiveness, the flexibility and the shock resistance falls when the compounding ratio thereof is less than 0.1 mass %.

In a paint and an adhesive composition according to the present invention, the component (c) is compounded by 30 to 70 mass % with the other components from the viewpoint of adhesiveness, flexibility and shock resistance. The component (c) is compounded more preferably by 40 to 65 mass % from the viewpoint of workable viscosity. The adhesiveness, the flexibility and the shock resistance of a paint and an adhesive composition according to the present invention falls when the compounding ratio of the component (c) exceeds 70 mass %. On the other hand, the adhesiveness, the flexibility and the shock resistance thereof are degraded and the workability thereof falls due to an increased viscosity when the compounding ratio of the component (c) is less than 30 mass %.

In a paint and an adhesive composition according to the present invention, the component (d) is compounded by 0.1 to 15 parts by mass with a total of 100 parts by mass of the components (a) through (c) from the viewpoint of practical photocuring time (not longer than 10 seconds with a radiation intensity of 500 mJ/cm$^2$). The component (d) is compounded more preferably by 1 to 10 parts by mass, most preferably by 2 to 5 parts by mass, from the viewpoint of practical photocuring time (not longer than 3 seconds with a radiation intensity of 500 mJ/cm$^2$).

The flexibility, the adhesiveness and the shock resistance of a paint and an adhesive composition according to the present invention falls when the compounding ratio of the component (d) exceeds 15 parts by mass. On the other hand, the adhesiveness thereof is unsatisfactory because of an insufficient degree of photocuring when the compounding ratio of the component (d) is less than 0.1 parts by mass. When the photopolymerization initiator is used, the amount thereof to be compounded with may be the same as described above.

If necessary, a functional filler or the like as filler that is popularly being used can be added and compounded to a paint and an adhesive composition according to the present invention to such an extent that it does not adversely affect achieving the object of the present invention.

Examples of materials that can be used for the purpose of imparting rigidity include talc and mica, which may be used alone or in combination.

Examples of materials that can be used for the purpose of imparting thermal conductivity include barium sulfide and magnesium oxide, any one of which may be used alone or any two or more of which may be used in combination.

Examples of materials that can be used for the purpose of imparting thermal expandability include thermally expandable microcapsules. Examples of materials that can be used for the purpose of imparting a leveling effect include silicone-based leveling agents.

The recommended viscosity at 25° C. of a paint and an adhesive composition according to the present invention is not more than 3,000 mPa·s, more preferably between 100 and 2,000 mPa·s, although the viscosity is by no means limited by such values. No component separation will take place with time and a reliable storage stability and a surface smoothness that is practically free from air bubbles can be obtained when the viscosity is found within the above range. The viscosity can be observed by means of a B-type viscometer.

At least one item selected from a group of metal oxides, metal salts, surface active agents and ionic liquids can be compounded as antistatic material with a paint according to the present invention. Examples of metal oxides and metal salts that can be used for this purpose include at least one item selected from a group of zinc oxide, aluminum doped zinc oxide, gallium doped zinc oxide, ATO, ITO, tin oxide, antimony pentoxide, zirconium oxide, titanium oxide and aluminum oxide.

An ionic liquid (e) is a salt in the liquid state that contains cations and anions. Examples of ionic liquids (e) that can be used for the present invention include at least one item containing of cation and selected from a group of imidazolium, pyridinium, pyrrolidinium, phosphonium, ammonium and sulfonium. Examples of cations are listed below.

[chemical formula 4]

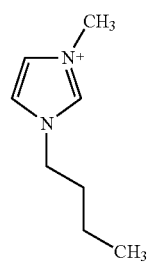

(1-1)

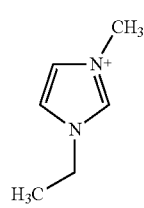

(1-2)

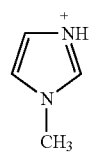

(1-3)

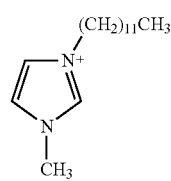

(1-4)

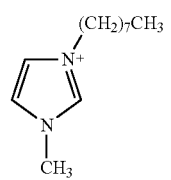

(1-5)

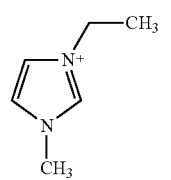

(1-6)

[chemical formula 5]

(2-4)
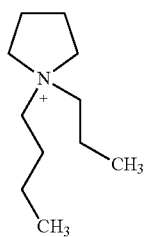
[chemical formula 6]
(3-1)
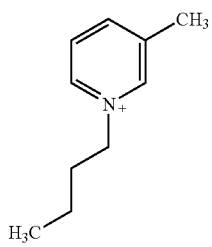
(3-2)
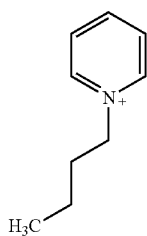
(3-3)
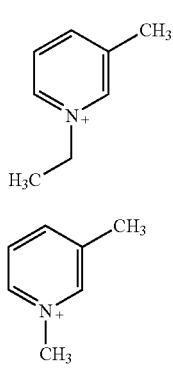
(3-4)
(3-5)
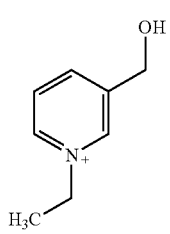
(3-6)
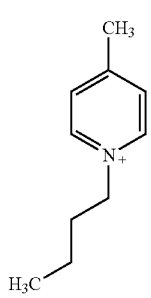
(3-7)
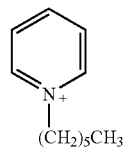
(3-8)
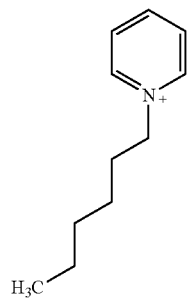
[chemical formula 7]
(4-1)
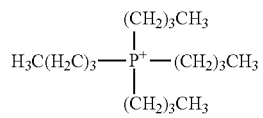
(4-2)
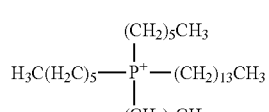
(4-3)
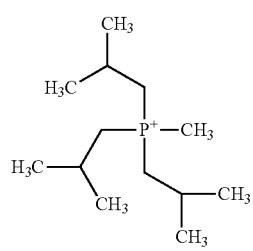
(4-4)
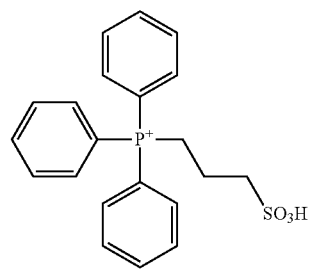
[chemical formula 8]
(5-1)
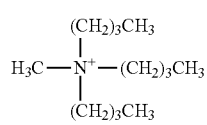
(5-2)
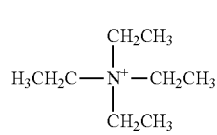

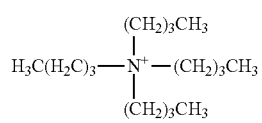 (5-3)

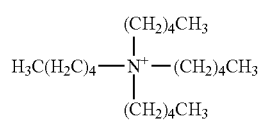 (5-4)

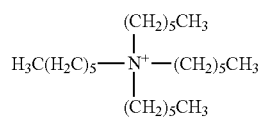 (5-5)

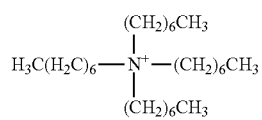 (5-6)

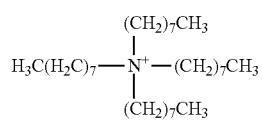 (5-7)

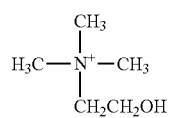 (5-8)

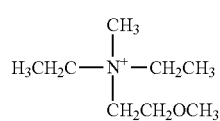 (5-9)

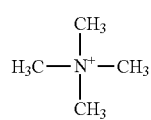 (5-10)

[chemical formula 9]

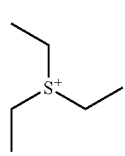 (6-1)

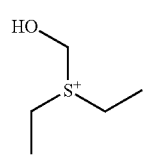 (6-2)

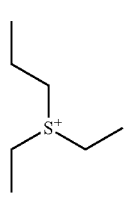 (6-3)

(6-4)

Ionic liquids (e) that can be used for the present invention preferably contain anions selected from a group of halogens, carboxylates, sulfates, sulfonates, thiocyanates, aluminates, borates, phosphates, phosphinates, amides, antimonates, imides and methides. Examples of anions are listed below.

[chemical formula 10]

$F^-$ (7-1)

$Cl^-$ (7-2)

$Br^-$ (7-3)

$I^-$ (7-4)

(7-5) acetate (7-6) decanoate $^-OOC(CH_2)_8CH_3$ (7-7) benzoate (7-8) 2-mercaptobenzoate (7-9) 4-methylbenzoate (7-10)

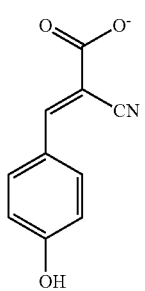

(7-11)

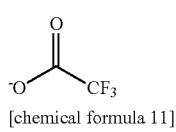

[chemical formula 11]

(8-1)

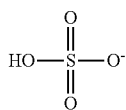

(8-2)

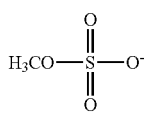

(8-3)

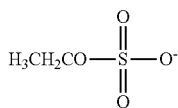

(8-4)

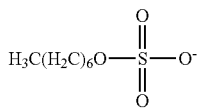

(8-5)

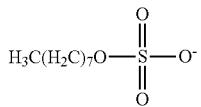

(8-6)

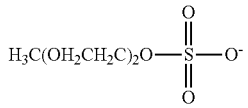

[chemical formula 12]

(9-1)

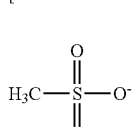

(9-2)

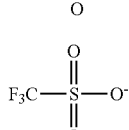

(9-3)

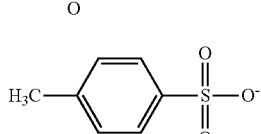

[chemical formula 13]

(10-1)

SCN⁻

(10-2)

AlCl₄⁻

(10-3)

PF₆⁻

(10-4)

BF₄⁻

(10-5)

NO₃⁻

(10-6)

SbF₆⁻

(10-7)

HSO₄⁻

[chemical formula 14]

(11-1)

$$\text{N}(\text{CN})_2^-$$

(11-2)

$$F_3C-\underset{\underset{O}{\|}}{\overset{\overset{O}{\|}}{S}}-N^--\underset{\underset{O}{\|}}{\overset{\overset{O}{\|}}{S}}-CF_3$$

(11-3)

$$F_3CF_2C-\underset{\underset{O}{\|}}{\overset{\overset{O}{\|}}{S}}-N^--\underset{\underset{O}{\|}}{\overset{\overset{O}{\|}}{S}}-CF_2CF_3$$

(11-4)

$$\begin{array}{c}\text{structure (11-4)}\end{array}$$

[chemical formula 15]

(12-1)

$$\text{structure (12-1)}$$

(12-2)

$$\text{structure (12-2)}$$

(12-3)

$$\text{structure (12-3)}$$

(12-4)

$$\text{structure (12-4)}$$

(12-5)

$$\text{structure (12-5)}$$

(12-6)

$$\text{structure (12-6)}$$

The ionic liquids that can be used for the present invention are preferably water soluble.

Examples of preferable ionic liquids that can be used for the purpose of the present invention include those having an ion pair selected from (1-1) and (10-1), (1-1) and (10-4), (1-1) and (11-1), (1-2) and (8-3), (1-2) and (10-1), (1-2) and (10-2), (1-2) and (10-4), (1-2) and (11-1), (1-6) and (7-11), (1-6) and (8-3), (1-6) and (8-5), (1-6) and (8-6), (1-6) and (9-1), (1-6) and (9-2), (1-6) and (9-3), (1-6) and (10-1), (1-6) and (10-4), (1-6) and (10-7), (1-6) and (11-1), (1-6) and (12-5), (1-6) and (12-6), (1-8) and (8-2), (1-8) and (8-5), (1-8) and (8-6), (1-8) and (9-1), (1-8) and (10-4), (1-12) and (10-4), (1-13) and (10-4), (1-17) and (10-4), (2-1) and (9-1), (2-1) and (9-2), (3-1) and (8-2), (3-1) and (8-3), (3-1) and (11-1), (3-5) and (8-3), (3-6) and (10-4), (3-8) and (9-2), (5-8) and (12-5) and (5-9) and (10-4) as combination of cation and anion, of which ionic liquids having an ion pair selected from (1-2) and (8-3), (1-2) and (10-1) and (1-2) and (10-2) are more preferable from the viewpoint of the advantage of the present invention (of providing both a strong adhesiveness and an excellent antistatic effect relative to a substrate (B)). Particularly, an ionic liquid having an ion pair of (1-2) and (8-3) is preferable in terms of strong adhesiveness and excellent antistatic effect relative to a substrate (B).

Any types of surface active agents including anionic, nonionic, cationic and amphoteric surface-active agents can non-limitatively be used for the present invention. Typical examples of anionic surface active agents include alkylaryl sulfonates, soaps such as sodium salts, potassium salts and triethanolamine salts of various fatty acids, salts and esters of sulfuric acid such as alkyl sulfate salts and alkylpolyoxyalkyleneether sulfate salts, phosphate such as alkyl phosphate, alkylaryl phosphate, alkylarylpolyoxyalkyleneether phosphate and alkylarylpolyoxyalkyleneether phosphate and polysoaps such as polystyrene sulfonate salts and sodiumpolyacrylate, anyone of which may be used alone or any two or more of which may be used in combination.

Typical examples of nonionic surface active agents include fatty acid esters such as sorbitan-fatty acid esters, polyoxy ethylene sorbitan-fatty acid esters, glycerin-fatty acid esters, diglycerin-fatty acid esters, triglycerin-fatty acid esters, tetraglycerin-fatty acid esters, pentaglycerin-fatty acid esters, hexaglycerin-fatty acid esters, ethylene glycol-fatty acid esters, polyoxy ethylene glycol-fatty acid esters, sucrose-fatty acid esters and di(glycerin) borate-fatty acid esters, polyethers such as alkyl polyoxy alkylene ether, alkyl aryl polyoxy alkylene ether, polyoxy ethylene glycol.polyoxy propylene glycol block copolymers, tertiarization amines such as N,N-di(polyoxyalkylene)alkyl amines, N,N, N',N'-tetra (polyoxyalkylene) ethylene diamines and amides such as fatty acid monoalkylol amides and fatty acid dialkylol amides, any one of which may be used alone or any two or more of which may be used in combination.

Typical examples of cationic surface active agents include quaternary ammonium salts such as tetraalkyl ammonium salts, trialkyl (β-hydroxyalkyl) ammonium salts and dialkyl di(polyoxyalkylene) ammonium salts, any one of which may be used alone or any two or more of which may be used in combination. Typically examples of amphoteric surface-active agents include betaines such as trialkyl betaines and alkylimidazoline betaines and phospholipids such as lecithin, any one of which may be used alone or any two or more of which may be used in combination.

One or more desired functionalities can be imparted to a paint and an adhesive composition according to the present invention by compounding one or more functional materials with the remaining components. In such an instance, a paint and an adhesive composition according to the present invention operate as binder or vehicle for making the functional materials exert the intended effects. Examples of functional materials that can be used for the present invention include IR absorbing materials, UV absorbing materials, antistatic materials and electromagnetic shielding materials.

Examples of IR absorbing materials include carbon nanotubes, zinc oxide, aluminum doped zinc oxide, gallium doped zinc oxide, cesium-containing tungsten oxide, ATO (antimony tin complex oxide or antimony doped tin oxide) and ITO (indium tin complex oxide). The compounding ratio of an IR absorbing material can be determined by referring to the desired IR absorbability but may typically be within a range between 0.1 and 30 mass % of a paint and an adhesive composition according to the present invention. Examples of UV absorbing materials include salicylate-based, benzophenone-based, benzotriazole-based, substituted acrylonitrile-based, and triazine-based organic compounds and inorganic compounds such as hybrid inorganic particles obtained by way of a complexing process of treating any of carbon nanotubes, zinc oxide, aluminum doped zinc oxide, gallium doped zinc oxide, titanium dioxide, cerium oxde and titanium dioxide microparticles with iron oxide, and hybrid inorganic particles obtained by coating the surfaces of cerium oxide microparticles with amorphous silica. The compounding ratio of an UV absorbing material can be determined by referring to the desired UV absorbability but may typically be within a range between 0.1 and 30 mass % of a paint and an adhesive composition according to the present invention.

Antistatic materials that can be used for the present invention include metal oxides and metal salts. Examples of metal oxides include zinc oxide, aluminum doped zinc oxide, gallium doped zinc oxide, ATO, ITO, tin oxide, antimony pentoxide, zirconium oxide, titanium oxide, aluminum oxide, which are listed earlier. Carbon nanotubes, which are also described earlier, can also be utilized as antistatic material. While the compounding ratio of the antistatic material may be determined appropriately from the viewpoint of the desired antistatic effect, it is typically between 0.1 and 30 mass % in a paint and in an adhesive composition according to the present invention.

Electromagnetic shielding materials that can be used for the present invention include electroconductive particles. Examples of electro-conductive particles include (1) carbon particles and carbon powder, (2) particles and powders of metals or alloys, such as nickel, indium, chromium, gold, vanadium, tin, cadmium, silver, platinum, aluminum, copper, titanium, cobalt and lead, alloys of any of them and electroconductive oxides of any of them, (3) surface of plastic particles such as polystyrene and polyethylene that are coated on the surfaces thereof selected from the electroconductive materials listed in (1) and (2) above. While the compounding ratio of the electromagnetic shielding material may be determined appropriately from the viewpoint of the desired electromagnetic shielding, it is typically between 60 and 90 mass % in a paint and an adhesive composition according to the present invention.

(f) White Coloring Agents

A composition according to the present invention may contain (f) a white coloring agent.

Examples of component (f) that can be used for the present invention include lead basic carbonate, lead basic sulfate, lead basic silicate, zinc oxide (specific gravity: 5.47 to 5.61), zinc sulfide (specific gravity: 4.1), lithopone, antimony trioxide (specific gravity: 5.5 to 5.6), titanium dioxide (specific gravity: 4.2) and graphite (specific gravity: 3.3), any one of which may be used alone or any two or more of which may be used in combination.

The component (f) contains preferably titanium oxide or zinc sulfide, more preferably titanium oxide, as main ingredient. Crystals of titanium oxide can be classified into two types, the tetragonal type and the orthorhombic type, due to the difference of crystal lattice. The anatase type (low temperature type) and the rutile type (high temperature type) are known for the tetragonal type while the Brookite type is known for the orthorhombic type. For the purpose of the present invention, titanium dioxide of the rutile type that is inactivated by the effect of a photocatalyst is preferably used.

As for the shape of the component (f), it may be that of a spheroidal structure, although it may alternatively be that of an elliptical structure, a needle-shaped structure, a polygonal structure or an amorphous structure.

The particle size of the component (f) is not subjected to any particular limitations so long as it is smaller than the thickness of the applied paint when the paint is cured. However, the adhesiveness of a paint according to the present invention relative to an adherend can be maintained in an excellent state by making the particle size of the paint between about 0.01 and 3.0 μm when the thickness of the applied paint is between about 10 and 30 μm.

If necessary, any of various additives can be compounded with the other components of a composition according to the present invention. Above all, a flame retardant agent is a preferable voluntary component.

Examples of flame retardant agents that can be used for the present invention include phosphor-based flame retardant agents, boron-based flame retardant agents and chlorine-based flame retardant agents as well as aluminum hydroxide and zinc borate.

When a flame retardant agent is employed, the ratio to which it is added is 50 to 160 parts by mass, preferably 80 to 140 parts by mass, relative to the total of 100 parts by mass of the components (a) through (c).

Preferable examples of silicone compounds that operate as antifouling-property imparting materials include polyether modified silicone compound, polyester modified silicone compound, polyether modified and/or polyester modified silicone compounds such as polyether modified and polyester modified silicone compounds.

Examples of polyether modified and/or polyester modified silicone compounds include compounds obtained by introducing one or more polyether chains and/or one or more polyester chains to all or some of the terminal and/or side chains of polysiloxanes, although co-modified silicone compounds obtained by introducing one or more organic groups such as epoxy groups and/or amino groups in addition to polyether chains and/or polyester chains may also be used for the present invention. Additionally, compounds of the above-identified types preferably have one or more (meth) acryloyl groups in a molecule because a satisfactory cross-linking density can be achieved after curing by irradiation of active energy lines with such groups.

Examples of polyether modified silicone compounds include KF-351, KF-352, KF-353, KF-354L, KF-355A, KF-615A, KF-945, KF-618, KF-6011, KF-6015, KF-6004, X-22-4272, X-22-4952, X-22-6266, X-22-3667, X-22-4741, X-22-3939A, X-22-3908A (trade names, available from Shin Etsu Chemical Co., Ltd.), BYK-300, BYK-302, BYK-306, BYK-310, BYK-320, BYK-325, BYK-330, BYK-331, BYK-333, BYK-337, BYK-344, BYK-375, BYK-377, BYK-UV3510, BYK-301, BYK-307, BYK-325, BYK-341, BYK-345, BYK-346, BYK-347, BYK-348 (trade names, available from BYK Chemie Gmbh), SILWET L-77, SILWET L-720, SILWET L-7001, SILWET L-7002, SILWET Y-7604, SILWET Y-7006, SILWET FZ-2101, SILWET-FZ-2104, FZ-2105, SILWET FZ-2110, SILWET FZ-2118, SILWET FZ-2120, SILWET FZ-2122, SILWET FZ-2123, SILWET FZ-2130, SILWET FZ-2154, SILWET FZ-2161, SILWET FZ-2162, SILWET FZ-2163, SILWET FZ-2164, SILWET FZ-2166, SILWET FZ-2191, SILWET FZ-2203, SILWET FZ-2207, SILWET FZ-2208, SILWET FZ-3736, SILWET Y-7499, SILWET FZ-3789, SF8472, BY16-004, SF8428, SH3771, SH3746, BY16-036, SH3749, SH3748, SH8400 and SF8410 (trade names, available from Toray-Dow Corning Silicone, Co., Ltd.), L032, L051, L066 (trade names, available from WACKER ASAHIKASEI SILICONE, CO., LTD.). In particular, examples of polyether modified silicone compounds include polydimethyl siloxane compounds, more specifically polydimethyl siloxane compounds having one or more (meth)acryloyl groups in a molecule such as BYK-UV3500, BYK-UV3570 and BYK-UV3530 (trade names, available from BYK-Chemie Gmbh).

Examples of the polyester modified silicone compounds include BYK-310, BYK-315 and BYK-370. In particular, examples of polyester modified silicone compounds having one or more (meth) acryloyl groups in a molecule include BYK-UV3500 (trade name, available from BYK-Chemie Gmbh). Any of the above-listed polyether modified and polyester modified silicone compounds (S) may be used alone or any two or more of them may be used in combination.

Examples of the scratch resistance enhancing materials include microparticles of inorganic oxides, more specifically, organosilica compounds and alumina ceramic compounds.

Microparticles of inorganic oxides that can be used for the present invention may have a spheroidal, hollow, porous, rod-like, fibrous or tabular shape or amorphous, of which a spheroidal shape is preferable. The primary particle size of metal oxides is preferably between 1 and 100 nm. The mechanical characteristics can hardly be enhanced when the primary particle size is less than 1 nm, whereas secondary agglomeration can easily take place to lose transparency and other characteristics when the primary particle size is more than 100 nm.

Microparticles of the inorganic oxides as listed above are available in a state of dry powder or in a state of being dissolved or dispersed in water or in an organic solvent. For realizing an excellently dispersed condition, the use of a sol obtained by dissolving or dispersing any of the above-listed compounds in water or in an organic solvent is preferable. To be more specific, the use of an aqueous organosilica sol or an organosilica sol obtained by dissolving or dispersing inorganic microparticles in an organic solvent having an OH group or in a polar solvent having a ketone group as main ingredient is most preferable. Typical examples of aqueous silica sols that can be used for the present invention include ST-20 (trade name, basic aqueous silica sol, available from Nissan Chemical Industries, Ltd.), ST-0 (trade name, acidic aqueous silica sol, available from Nissan Chemical Industries, Ltd.), ST-AK (trade name, weakly acidic aqueous silica sol, available from Nissan Chemical Industries, Ltd.) and lithium silicate (basic silica.lithium oxide sol, available from Nissan Chemical Industries, Ltd.). Typical examples of organosilica sols that can be used for the present invention include IPA-ST (trade name, organosilica sol dispersed in isopropanol (IPA), available from Nissan Chemical Industries, Ltd.), MEK-ST (trade name, organosilica sol dispersed in methyl ethyl ketone (MEK), available from Nissan Chemical Industries, Ltd.) and sols obtained by solvent substitution by means of an organic solvent having an OH group, using either of them as starting material (e.g., organosilica sols dispersed in PGM).

The solid content ratio in the dispersion liquid is typically between 5 and 50 wt %, preferably between 10 and 40 wt %, because sols showing such a solid content ratio provide easy handling and are easily available.

For the purpose of the present invention such inorganic microparticles are added in the form of dispersion where inorganic particles are uniformly dispersed in a diluent. One of the advantages of adding inorganic microparticles in the form of dispersion liquid is that, as a result, secondary agglomeration of inorganic microparticles can be suppressed and inorganic microparticles can be uniformly dispersed in a resin composition. Diluents such as organic solvents and photopolymerizable monomers can non-limitatively be used for the present invention so long as they can uniformly disperse silica and alumina. Specific examples of organic solvents and photopolymerizable monomers include trimethylol propane tri(meth)acrylate, pentaerythritol tri(meth) acrylate, ethylene glycol di(meth)acrylate, tetraethylene glycol di(meth)acrylate, polyethylene glycol di(meth)acrylate, 1,4-butane diol di(meth)acrylate, neopentyl glycol di(meth) acrylate, trimethylol propane trioxyethyl (meth)acrylate, tricyclodecane dimethanol di(meth)acrylate, dipropylene glycol diacrylate (PDGDA), PO modified neopentyl glycol diacrylate and modified bisphenol A diacrylate in addition to PMA, TPGDA and HDDA, which will be described below.

Known dispersions of the above-described category can be used for the present invention. Examples include NANOBYK-3650 (trade name) available from BYK Chemie Gmbh that contains silica microparticles dispersed in methoxy propyl acetate (PMA), tripropylene diacrylate (TPGDA), hexane diol diacrylate (HDDA), or NANOBYK-3601, 3602, 3610 (trade names) that contain alumina microparticles dispersed in PMA and NANOCRYL C145, C146, C350, C140, C150 (trade names) available from Hanse-Chemie Gmbh that contain silica microparticles dispersed in a photopolymerizable monomer. Any one of the above-listed may be used alone or any two or more of them can be used in combination. Of the above-listed, NANOBYK-3650 and NANOBYK-3610 prepared by dispersing microparticles that are surface-treated with silicone or a derivative thereof are preferably employed.

Any core-shell polymer particles can be employed as shock resistance enhancing material so long as they are provided as graft copolymer. Specific examples include Kane Ace B-564 (trade name) available from KANEKA CORPORATION and Paraloid BPM-500 and Paraloid 20784 (trade names) available from Rohm and Haas Company.

Of core-shell-type graft copolymers, the core particle size is preferably between 0.05 and 0.8 µm, more preferably between 0.1 and 0.6 µm, most preferably between 0.1 and 0.5 µm in terms of weight average particle size. Excellent shock resistance can be achieved when the core particle size is within a range between 0.05 and 0.8 µm. The graft copolymer to be used for a shock resistance enhancing material preferably contains the rubber component by not less than 40%, more preferably not less than 60%.

Materials that can be used as rubber component for the present invention include butadiene rubber, butadiene-acryl composite rubber, acryl rubber, acryl-silicone composite rubber, isobutylene-silicone composite rubber, isoprene rubber, styrene-butadiene rubber, chloroprene rubber, ethylene-propylene rubber, nitrile rubber, ethylene-acryl rubber, silicone rubber, epichlorohydrorin rubber, fluorine rubber and rubbers obtained by adding hydrogen to any of the unsaturated bonds of such robbers, although the use of a rubber component that does not contain any halogen atom is preferable in terms of environmental load because the use of a rubber component containing an halogen atom gives rise to an apprehension of generating toxic substances when incinerated.

The glass transition temperature of the rubber component is preferably not higher than −10° C., more preferably not higher than −30° C. Of the candidate rubber components, the use of butadiene rubber, butadiene-acryl composite rubber, acryl rubber or acryl-silicone composite rubber is preferable. Composite rubber refers to copolymerized rubber of two rubber components or rubber obtained by polymerization so as to show an IPN structure where two rubber components inter-penetrate (are inter-tangled).

Examples of aromatic vinyl compounds that can be used for copolymerization into a rubber component for the purpose of the present invention include styrene, α-methyl styrene, p-methyl styrene, alkoxy styrene and halogenated styrene, of which styrene is preferable in particular. Examples of acrylic esters that can be used for copolymerization include methyl acrylate, butyl acrylate, cyclohexyl acrylate and octyl acrylate. Examples of methacrylic esters that can be used for copolymerization include methyl methacrylate, ethyl methacrylate, butyl methacrylate, cyclohexyl methacrylate and octyl methacrylate, of which methyl methacrylate is preferable. Particularly, the rubber components that can be used for the present invention preferably contain a methacrylic acid ester such as methyl methacrylate as indispensable ingredient. More specifically, a methacrylic ester is contained in 100 wt % of the graft component (100 wt % of the shell in the case of a core-shell type polymer) preferably by not less than 10 wt %, more preferably by not less than 15 wt %.

Any graft copolymers containing a rubber component having a glass transition temperature not higher than 10° C. that is to be used for the present invention may be manufactured by way of a polymerization process selected from block polymerization, solution polymerization, suspension polymerization and emulsion polymerization. The copolymerization system to be used for the present invention may be that of one-step grafting or that of multi-step graft. A mixture of only the graft component that is produced as by product through the manufacturing process and the copolymer may be used. Processes that can be used for polymerization include soap free polymerization designed to use potassium persulfate as initiator, seed polymerization and two-step swelling polymerization in addition to popular emulsion polymerization. When suspension polymerization is employed, a method of holding the aqueous phase and the monomer phase separately, accurately supplying them into a continuous-type disperser and controlling the particle size by way of the number of revolutions of the disperser may be used for it. When such a continuous manufacturing process is employed, the particle size can be controlled by a method of supplying the monomer phase into an aqueous liquid having a dispersion power by way of an orifice of a diameter between several and several tens µm or a porous filter. In the case of core-shell-type graft polymerization, the reaction may be of one-step or of multi-step for both cores and shells.

A paint and an adhesive composition according to the present invention show a particularly excellent adhesion property relative to a layer of soft or hard vinyl chloride resin; polystyrene; polycarbonate; glass; aluminum; steel plate; concrete; wood panel; stone; artificial marble; polyolefin resin or copolymer of polyolefin resin modified by a polar group-containing compound or olefin and a polar group-containing compound; magnesium; acrylonitrile-butadiene-styrene copolymer; polyester-based resin; polyurethane-based resin; epoxy-based resin; or acryl-based resin (to be referred to as specific adherend layer (B1) or specific adherend layer (B2) hereinafter). The conventional art does not disclose any adhesive composition showing an excellent adhesion property to such adherends. Additionally, an adhesive composition according to the present invention shows an extremely excellent adhesion property (between dissimilar materials) when dissimilar materials are employed for adherend B1 and adherend 32.

Specific examples of "between dissimilar materials" include between hard vinyl chloride resin and glass, between soft vinyl chloride resin and glass, between polystyrene-based resin and aluminum, between polycarbonate resin and aluminum, between polystyrene-based resin and glass, between polycarbonate resin and glass, between acrylonitrile-butadiene-styrene copolymer (ABS) and glass, between glass and aluminum, between magnesium and polycarbonate resin, between a steel plate and acrylic resin (e.g., polymethyl methacrylate (PMMA)), between polyester (e.g., polyethylene terephtharate) and acrylonitrile-butadiene-styrene copolymer (ABS) and between acrylic resin (e.g., polymethyl methacrylate (PMMA) and acrylonitrile-butadiene-styrene copolymer (ABS)). Polyolefin resins modified by a polar group containing compound are olefins into which a polar group such as —OH, —$NO_2$, —CO, —$NH_2$, —NH, —$OCH_3$, —$SO_3$ or the like. Examples of such olefins include polyolefin resins that are grafted with at least either maleic anhydride or glycidyl methacrylate. Specific examples include polyethylene and polypropylene that are grafted with maleic anhydride and polyethylene and polypropylene that are grafted with glycidyl methacrylate. Examples of copolymers of olefin and a polar group containing compound include a copolymer (EVA) of ethylene and vinyl acetate, copolymers (EAA, EMA, etc.,) of ethylene and (meth) acrylic acid and a copolymer (EEA) of ethylene and a (meth) acrylic ester.

A paint according to the present invention can be applied onto a substrate and cured. Application techniques that can be used for a paint according to the present invention include spin coating, (doctor), knife coating, micro gravure coating, direct gravure coating, offset gravure coating, reverse gravure coating, reverse roll coating, (Mayer) bar coating, dye coating, spray coating and dip coating (examples of apparatus for spin coating include ASS-301 Type (trade name) Manual Spinner, available from ABLE JAPAN Co., Ltd.). When a UV reaction initiator or an electron beam reaction initiator is employed for the component (d), the paint can be cured by irradiating UV rays or an electron beam. For irradiation conditions, an irradiation intensity between 150 and 1,000 mJ/cm$^2$ and an irradiation time between 1 and 60 seconds may be adopted when UV rays are used. When an organic peroxide is employed for the component (d), the paint can be cured by heating it at 100 to 150° C.

The recommended thickness of a layer formed by applying a paint according to the present invention is between 2 and 200 μm, preferably between 5 and 150 μm, more preferably between 10 and 100 μm from the viewpoint of cost and performance.

A layer (A) of a paint according to the present invention can be formed and cured on a substrate (B) with excellent adhesiveness relative to the latter and without using any primer, if the substrate is selected from various substrates, to which any ordinary paint has hitherto been unable to adhere and become cured without using a special primer, including, for example, those of soft or hard vinyl chloride resin; polystyrene; polycarbonate; glass; aluminum; steel plate; concrete; wood panel; stone; artificial marble; polyolefin resin or copolymer of polyolefin resin modified by a polar group-containing compound or olefin and a polar group-containing compound; magnesium; acrylonitrile-butadiene-styrene copolymer; polyester-based resin (e.g., polyethylene terephthalate PET); polyurethane-based resin; epoxy-based resin; or acryl-based resin (e.g., polymethyl methacrylate PMMA). (If allowable from the viewpoint of cost and other factors, even stronger adhesiveness can be obtained by using a primer on the substrate.)

(Bonding Method According to the Present Invention)

A bonding method according to the present invention comprises Step I of mixing the components (a) through (d) and, if necessary one or more filling materials in an voluntary order act the above-defined compounding ratio to prepare a paint and an adhesive composition according to the present invention, Step II of laminating the adhesive composition on a layer (B1) of a specific adherend to form a layer (A) of the adhesive composition and Step III of further laminating the layer (A) of the adhesive composition and another layer (B2) of a specific adherend. With the bonding method according to the present invention the three layers (B1)-(A)-(B2) will be firmly bonded.

The thickness of the layer (A) of an adhesive composition (cured coating film) is non-limitatively between 2 μm and 50 μm, preferably between 5 μm and 30 μm, more preferably between 8 μm and 20 μm. (When a paint and an adhesive composition according to the present invention are prepared by solventless (volatile), the thickness of the applied paint or composition and the thickness of the cured paint or composition, do not show a significant difference because the applied paint or composition does not contract significantly in the curing process.) The coating film shows an excellent degree of transparency while the curving, if any, of the formed resin body due to curing and contraction can be alleviated and the degradation of the surface hardness due to the uncured binder resin component can be prevented from taking place by adjusting the thickness of the coating film. Application techniques that can be applied to a paint and an adhesive composition according to the present invention include spin coating, (doctor) knife coating, micro gravure coating, direct gravure coating, offset gravure coating, reverse gravure coating, reverse roll coating, (Mayer) bar coating, dye coating, spray coating and dip coating. Examples of apparatus for spin coating include ASS-301 Type (trade name) Manual Spinner, available from ABLE JAPAN Co., Ltd.

With a method of preparing an adhesive composition according to the present invention, the component (b) and the component (c) are added respectively as reactive diluent and as modifier to the component (a) in a vessel equipped with an agitator. Thereafter, the component (d) is added and agitated sufficiently until no unmolten residue is left. When one or more components are to be added, they are added finally and agitated thoroughly. The adhesive composition that is obtained by agitation needs to be quickly worked or stored in a cold and dark storage facility.

(Laminate According to the Present Invention)

A laminate according to the present invention comprises (B1)-(A) and is obtained by preparing a paint and an adhesive composition according to the present invention in a manner as described above and applying the adhesive composition to a layer (B1) of a specific adherend to form a layer (A) of the adhesive composition. In a different mode of carrying out the invention, a laminate according to the present invention comprises (B1)-(A)-(B2) and is obtained by laminating the adhesive composition onto a layer (B1) of a specific adherend to form a layer (A) of the adhesive composition and additionally laminating a layer (B2) of a specific adherend on the layer (A).

A laminate according to the present invention provides excellent adhesiveness between the layers (B1) and (B2) of the specific adherends and the layer (A) of the adhesive composition and shows transparency, surface smoothness, flexibility and shock resistance in a well-balanced manner.

In a laminate according to the present invention and comprising (B1)-(A), the layer (A) of the adhesive composition operates advantageously as primer layer for (B1). Such a primer layer can typically take a role of enhancing the adhesiveness relative to the paint and the adhesive composition applied onto it depending on the application of the laminate. Note, however, that a layer of the specific adherend and a layer of the adhesive composition can be laminated alternately for a plural times and the product of such an operation is also within the scope of a laminate according to the present invention.

(Applications)

Exemplar applications of a paint and an adhesive composition according to the present invention are listed below.

1. Antifouling-Property Imparting Materials:
   antifouling protective walls (glass substituting members and protective walls for highways, sports arenas, bridges and so on) and display coatings for television sets, mobile phones and game machines
2. Scratch Resistance Enhancing Materials:
   glass substituting members, protective walls for highways, sports arenas and bridges and display hard coatings for television sets, mobile phones and game machines
3. Shock Resistance Enhancing Materials:
   automobile interior and exterior decorating members, floors, walls, protective walls for highways, sports arenas and bridges and display coatings for television sets, mobile phones and game machines
4. IR Absorbing Materials:
   automobile interior and exterior decorating members, floors, walls, roofs, protective walls for highways and bridges and heat shield coatings for television sets, mobile phones and game machines
5. UV Absorbing Materials:
   automobile interior and exterior decorating members, floors, walls, anti-yellowing coatings for boats and canoes and UV degradation prevention coatings
6. IR Reflecting Materials (White Light Reflecting Materials) Titanium Oxide:
   solar cell backsheets and coatings for walls and roofs
7. Electromagnetic Shielding Materials:
   automobile interior and exterior decorating members and coatings for floors, walls and roofs
8. Electroconductive Revealing Materials:
   automobile interior and exterior decorating members, walls, electrode coatings
9. Antistatic Materials:
   floors, walls, electric appliance housings, display coatings for television sets, mobile phones and game machines
10. Flame Retardancy Imparting Materials:
    walls, floors, electric appliance housings, connectors, electric wire coatings.
11. For Electroacoustic Transducers
12. For Coatings Steel Structures

EXAMPLES

Now, the present invention will be described further by way of examples and comparative examples, although the present invention is by no means limited by the examples that are described below.

The materials used in Examples and Comparative Examples are listed below.

Component (a-1) Vinyl Ester Resin
(i) Urethane Acrylate
  CN963B80: urethane acrylate (HDDA blend), type=polyester, 60° C. viscosity=1,100, number of functional groups=2, available from Sartomer Company
(ii) Polyester Acrylate
  CN292: polyester acrylate, type=aliphatic polyester, 25° C. viscosity=630, number of functional groups=4, available from Sartomer Company
(iii) Epoxy Acrylate
  CNUVE151: epoxy acrylate, type=polyester, 25° C. viscosity=150,000, number of functional groups=2, available from Sartomer Company
(iv) Aliphatic Urethane Acrylate
  CN966J75: aliphatic urethane acrylate (IBOA blend), type=polyester, 60° C. viscosity=4,240, 20° C. viscosity=105,000, number of functional groups=2, available from Sartomer Company Component (a-2) Unsaturated Polyester Resin
  RIGOLAC21E-A-2 (tradename): available from Showa High polymer Co., Ltd.

Component (a-3) Vinyl Ester Resin
  RIPDXY VR-77 (trade name): available from Showa Highpolymer Co., Ltd.
    viscosity: 1,000 (dPa·s/25° C.)
    molecular weight: 510

Component (c) compound having a ring structure and an ethylenically unsaturated group
(i) N-vinyl pyrrolidone: available from Nippon Shokubai Co., Ltd.
    molecular weight: 111.14
    boiling point: 219° C.
    vapor pressure (24° C.): 0.10 mm Hg
    flash point: 98° C.
    viscosity (25° C.): 2 cps
    melting point: 13° C.
(ii) N-vinyl caprolactam: available from BASF
    boiling point: 117° C. (10 mm, Hg)
    vapor pressure<0.1 mm Hg (20° C.)
    flash point: 110° C.
    melting point: 35° C.
    viscosity (40° C.): 3.5 cps Dipropylene glycol diacrylate DPGDA: available from Shin-Nakamura Chemical Co., Ltd.
    specific gravity: 1.05 (25° C.)
    viscosity: 8 (mPa·s/25° C.)
    refractive index: 1.449)

Tripropylene glycol diacrylate TPGDA: available from Shin-Nakamura Chemical Co., Ltd.
    specific gravity: 1.039 (25° C.)
    viscosity: 12 (mPa·s/25° C.)
    refractive index: 1.449

Dipentaerythritol polyacrylate A-9550: available from Shin-Nakamura Chemical Co., Ltd.
    specific gravity: 1.89 (25° C.)
    viscosity: 6500 (mPa·s/25° C.)
    refractive index: 1.489

Acryloyl morphorine (ACMO): available from KOHJIN Film and Chemicals Co., Ltd.
    molecular weight: 141.17
    specific gravity: 1.122

Component (b) modifier
(b-1-2) Polybutadiene-Based Polyol
Poly bd R-151-IT: available from Idemitsu Co., Ltd.,
    viscosity: 1.5 Pa·s/30° C.

hydroxyl value: 102.7 mgKOH/g
(b-1-1-1) Aromatic Castor Oil-Based Polyol
URIC (trade name) AC-006, (polyol derived from castor oil and expressed by the formula (4) above): available from Itoh Oil Chemicals Co., Ltd.
  viscosity: 0.7 to 1.5 Pa·s/25° C.
  hydroxyl value: 194 to 214 mgKOH/g
(b-1-3) Polyisoprene-Based Polyol
Poly ip (trade name), polyisoprene-type liquid polymer having highly reactive hydroxyl groups at molecular terminals: available from Idemitsu Co., Ltd.
  hydroxyl value: 46.6 mgKOH/mg
  number average molecular weight Mn: 2,500
(b-2-1) Castor Oil-Based Polyol
URIC H-1262: available from Itoh Oil Chemicals Co., Ltd. polyol containing a castor oil based polyol and an alkyl acid phosphate having a total number of carbon atoms of not less than 12, viscosity: 3,500 to 8,500 Pa·s/25° C., acidvalue: 4 to 15 mgKOH/g, hydroxyl value: 240 to 290 (unit: mgKOH/g)
(b-2-1) Castor Oil Based Polyol
URIC H-2151U, available from Itoh Oil Chemicals Co., Ltd. polyol containing a castor oil-based polyol, a phosphoric acid ester compound having a total number of carbon atoms of not less than 12 viscosity: 3,500 to 8,500 mPa·s/25° C.
  acid value: 4 to 15 (unit: mgKOH/g)
  hydroxyl value: 240 to 290 (unit: mgKOH/g)
(b-1-3) Hydrogen Adduct of Polyisoprene-Based Polyol
EPOL (trade name): available from Idemitsu Co., Ltd., liquid polyolefin with hydroxyl terminal groups
  viscosity: 75 Pa·s/30° C.
  hydroxyl value: 50.5 mgKOH/g
  number average molecular weight: 2,500
(b-3-1) Maleated Polyisoprene
LIR-420 (trade name): available from Kuraray
  acid value: 40 mgKOH/g
(b-3-2) Maleic Acid Modified Polybutadiene
Ricon 130MA8: available from Sartomer Company
  Viscosity: 6.5 Pa·s/30° C.
  acid value: 46 mgKOH/mg
  number average molecular weight: 2,700
(b-3-2) Maleic Acid Modified Polybutadiene
POLYVEST (trade name) OC 800S: available from Evonik Degussa Corporation (in polybutadiene, 1,4-cis double bonds: 75%, 1,4-trans double bonds: 24%, vinyl bonds: 1%, maleation ratio: 7.5%, number average molecular weight: 3,300 (GPC), weight average molecular weight: 13,600 (GPC), viscosity (20° C.): 6 to 9 Pa·s (as measured according to DIN 53214), acid value: 70 to 90 mgKOH/g, iodine value; 380 to 420 g/100 g, (polymerized with Ziegler Natta catalyst)
(b-1-4) Epoxy Polyol Resin
EPICLON (trade name) U-125-60BT: available from DIC Co., Ltd.
  Viscosity: 70 Pa·s/30° C.
  hydroxyl value: 120 mgKOH/g
(b-4-1) Polyepoxy Compound Having Epoxy Equivalent of 150 to 250 g/mol
Adeka Resin EP-4100E (available from ASAHI DENKA KOGYO KK, bisphenol A diglycidyl ether, epoxy equivalent: 190).
(b-4-2) Polymer Having Saturated Skeleton Having Epoxy Equivalent of 500 to 700 g/mol
L-207 (KRATON LIQUID (trade name) also named as L-207 POLYMER), available from Kuraray (polymer having an epoxy equivalent of 590 g/mol, a hydroxyl equivalent of 7,000 g/mol, a glass transition temperature of −53° C. with a completely saturated skeleton (epoxidized ethylene.propylene-ethylene.butylene.OH structure))
(b-5-1)
Lumiflon LF-200, trade name, (Asahi Glass Co., Ltd., fluoroolefin.vinylether copolymer, hydroxyl value: 52 mgKOH/g, glass transition temperature: 35° C., melting point: 148° C., xylene: 40%, effective components: 40%)
Since this material contains solvent, an amount obtained by reducing the effective components to 100% was used.
(b-5-2)
Lumiflon LF-302, trade name, (Asahi Glass Co., Ltd., fluoroolefin.vinylether copolymer, hydroxyl value: 47 mgKOH/g, xylene: 50%, effective components: 50%)
Since this material contains solvent, an amount obtained by reducing the effective components to 100% was used.
The characteristics of each polyol were observed in the following manner.
Viscosity Measurement Method
A single cylinder-type rotational viscometer (B type TVC-5) was employed as viscometer according to JIS K7117-1.
1. A 500 ml beaker (standard) was used as measuring instrument.
2. As standard rotors, two rotors were selected from M1 to M4 rotors for low to medium viscosities and H1 to H7 rotors for medium to high viscosities.
Hydroxyl Value Measurement Method
The hydroxyl value is the milligrams of potassium hydroxide required for acetylation of the OH groups contained in 1 g of a sample. The OH groups in each sample were acetylated by means of acetic anhydride according to JIS K 1557-1 and the unconsumed acetic acid was titrated by means of potassium hydroxide solution.

$$\text{hydroxyl value} = \frac{(A+B) \times f \times 28.05}{\text{sample(g)}} + \text{acid value} \qquad \text{[formula 1]}$$

A: the quantity of 0.5 mol/l potassium hydroxide ethanol solution (ml) consumed in a blank test
B: the quantity of 0.5 mol/l potassium hydroxide ethanol solution (ml) consumed for titration
f: factor
Acid Value Measurement Method
The acid value is the milligrams of potassium hydroxide required to neutralization of the acidic components contained in 1 g of a sample. According to JIS K 1557-5,
(1) Measurement of End Point pH
10 mL of buffer storage solution B was taken into a 200 mL beaker, to which 100 mL of a titration solvent was added, and electrodes were dipped into it. The pH that changed within 0.1 pH in 30 seconds was determined as buffer end point.
(2) Measurement of Acid Value
1. 20 g of a sample was accurately measured and taken into a 200 mL beaker.
2. 125 mL of toluene.2-propanol.purewater mixture solvent was added and titrated with titration solution of 0.1 mol/L potassium hydroxide.
As a result of (1), 11.72 pH was selected as end point and the acid value was determined by means of the formula shown below. The same procedures were followed for a blank.
Acid value (mgKOH/g)=(D−B)×K×F×M/S
D: titration value (mL)
B: blank (0.085 mL)

K: KOH molecular weight (56.1)
F: factor of titration solution (1.000)
M: molar concentration of titration solution (0.1 mol/L)
S: quantity of extracted sample (g)
Component (e) Initiator
(i) Photopolymerization Initiator
IRGACURE (trade name) 819: available from CIBA Corporation bis(2,4,6-trimethyl benzoyl)-phenylphosphine oxide
(ii) Thermal Polymerization Initiator
PERHEXA 25B: available from NOF Corporation (1 minute half life temperature: 179° C.), 2,5-dimethyl-2,5-di(tert-butylperoxy) hexane
[Description of Functional Materials]
Antifouling-property imparting material: (polydimethyl siloxane compounds having one or more polyether modified acryloyl groups) BYK-UV3500 (trade name), available from BYK-Chemie Gmbh.
Scratch resistance enhancing material: (organosilica sol MEK-ST (trade name)), available from Nissan Chemical Industries, Ltd.
Scratch resistance enhancing material: (alumina ceramic NANOBYK-3602), available from BYK-Chemie Gmbh, alumina 30%/tripropylene glycol diacrylate, alumina particle size=40 nm. Shock resistance enhancing material: (PARALOID BPM-500) (available from Dow Chemical Company): acryl-based shock resistance improving material, specific gravity=1.10
IR absorbing material: (SUNCOLLOID IR-40K) available from Nissan Chemical Industries, Ltd., 33% antimony double oxide/4% amorphous silica/1% tin oxide/58% methyl ethyl ketone/3% propyl alcohol/1% additive
UV absorbing material: (UV absorbing agent TINUVIN 326) available from BASF
2-tert-butyl-6-(5-chlorobenzotriazol-2-yl)-4-methylphenol
IR reflecting material (white light reflecting material) (titanium oxide, available from ISHIHARA SANGYO KAISHA Ltd., CR-90 (trade name))
Electromagnetic shielding material: zinc oxide 23-K (trade name), electroconductive zinc oxide—available from Hakusuitech Ltd., primary particle size 120 to 150 μm
Electroconductive revealing material: carbon nanotubes VGCF-S, available from SHOWA DENKO K.K., fiber diameter 80 nm, fiber length 10 μm
Antistatic material: (CELNAX CX-Z603M-F2) 60% antimony double oxide/40% methyl alcohol, available from Nissan Chemical Industries, Ltd.
Antistatic material: (ionic liquid, available from Signa Aldrich Co., Ltd.) BASIONIC LQ 01: 1-ethyl-3-methylimidazolium ethyl sulfate, specific gravity=1.239
Antistatic material: (available from LION AKZO Co., Ltd., TMAC-100 (tetramethyl ammonium chloride (ionic liquid having ion pair of (5-10) and (7-2))
[Organic Solvents]
N-methylpyrroridone (NMP)
ethylene carbonate (EC)
propylene carbonate (PC)
dimethyl carbonate (DMC)
methyl ethyl ketone (MEK)
methyl isobutyl ketone (MIBK)
propylene glycol monomethyl ether (PGM)
cyclohexane (anon)

Examples 1 to 38, Comparative Examples 1 to 8

Using the compounding ratios (parts by mass) listed in Table 1 through 8 shown below, the component (a) was put into a vessel equipped with an agitator and then the component (c) was added thereto and agitated sufficiently at ambient temperature. Thereafter, the component (b) was added and agitated. When the liquid temperature got to the ambient temperature, the component (d) was added and agitated sufficiently until no unmolten residue was found to obtain an adhesive composition. The viscosity (mPa·s) at 25° C. of the obtained adhesive composition was observed. The viscosity at 25° C. was observed by means of a handy-type digital viscometer, TVC-7 type Viscometer (available from TOKI SANGYO Co., Ltd.) and a rotor (Type 0 to Type 5) that matches the different the viscosity. Tables 1 through 8 also show the obtained results.

Then, the adhesive composition was applied onto each of the specific adherends (B1) (dimensions: 150 mm×25 mm×thickness 1 mm) shown in Tables 1 through 8 by spin coating (the thickness of the applied adhesive composition: 15 to 20 μm) and cured in air by irradiating UV rays at an energy level of 500 mJ/cm$^2$ to prepare a laminate.

When the adhesive composition is made to contain an organic solvent for application, the applied adhesive composition was dried in an oven having a dark room in the inside at 100° C. for 5 minutes and subsequently cured by irradiating UV rays in a manner as described above to prepare a laminate.

When a thermal polymerization initiator was used and if necessary, 6% naphthene cobalt was added to the composition by 0 to 0.5 parts by mass and heat treated at 100° C. for 30 minutes to cure the composition and prepare a laminate.

Example 24 is an instance that differs from Example 2 only in that (ii) thermal polymerization initiator was employed as component (d).

The adhesive composition was applied onto each of the specific adherends (B1) (dimensions: 150 mm×25 mm×thickness 1 mm) shown in Tables 1 through 8 by spin coating (the thickness of the applied adhesive composition: 15 to 20 μm) and cured by means of a heat treatment conducted at 100° C. for 10 minutes to prepare a laminate.

The used specific adherends (B1) are listed below.
hard vinyl chloride resin PVC (available from RIKEN TECHNOS CORP, Riken PVC Compound RE-3844 (trade name))
soft vinyl chloride resin PVC (available from RIKEN TECHNOS CORP, Leony BZL6060N (trade name))
polystyrene PS (available from TOYO STYRENE Co., Ltd., TOYO STYROL GP G100C (trade name))
polycarbonate PC (available from TEIJIN CHEMICALS Ltd., PANLIGHT L-1225L (trade name))
acrylonitrile-butadiene-styrene copolymer ABS (available from UMG ABS Ltd., UMG ABS EX114 (trade name))
glass (microscope slide glass for prepared specimen)
aluminum (H5052, Al—Mg based)
magnesium (available from Osaka Fuji Kogyo Co., Ltd., AZ31B, Mg content not less than 91%)
steel plate (SPCC: cold stretched steel plate)
PET: available from UNITIKA Ltd., UNITIKA polyester resin MA-2103
PMMA: available from Mitsubishi Rayon Co., Ltd., Acrypet VH
[Description of Substrates]
Concrete: commercially available ordinary concrete (mixture of cement, aggregate, water and (chemical) admixture)
Wood panel: commercially available solid wood (black pine, red pine, Japanese larch, Yezo spruce, hinoki cypress, etc.)
Stone: commercially available stone (natural granite, natural marble (limestone), natural sandstone, etc.)

Artificial marble: commercially available artificial marble (polyester based, acryl based, etc.)
PP: NOVATEC BC8, MFR=1.8 g/10 min, available from Japan Polypropylene Corporation
HDPE: NOVATEC HJ360, MFR=5.5 g/10 min, available from Japan Polyethylene Corporation
Maleic modified PE: AMPLIFY GR209, available from Dow Chemical Company, specific gravity=0.8985, hardness=96A
Thermoplastic polyurethane elastomer (T-1180, DIC Bayer Polymer Ltd.), ester type (adipate), hardness 80A
2-part liquid polyurethane resin: FLONE 22 A liquid (main agent) and B liquid (curing agent) were mixed at ratio of 1:1 and subsequently the mixture was applied onto a 130 mm×130 mm×1 mm polycarbonate plate to a thickness of about 2 mm by means of a roller. The applied mixture was left uncared for not less than 7 days for curing (available from Higashi Nippon Paint Co., Ltd.). A liquid: viscosity 4,500 mPa·s, B liquid: viscosity 18,000 mPa·s, viscosity immediately after mixing A and B 5,200 mPa·s.
2-part liquid epoxy resin: FLONE EPOROLER A liquid (main agent) and B liquid (curing agent) were mixed at ratio of 6:1 and subsequently the mixture was applied onto a 130 mm×130 mm×1 mm polycarbonate plate to a thickness of about 2 mm by means of a roller. The applied mixture was left uncared for not less than 7 days for curing (available from Higashi Nippon Paint Co., Ltd.). A liquid: viscosity 2,800 mPa·s, B liquid: viscosity 800 mPa·s, viscosity immediately after mixing A and B 1,200 mPa·s.

Each of the obtained laminates was subjected to the following tests.
[Test Methods]
(Adhesion Test: Cross-Cut Tape Test)
An adhesion test was conducted to observe the adhesion relative to each substrate by means of a test conforming to the cross cut tape test method defined in JIS K 5400.

Cross-cut tape test (application thickness 15 to 20 μm (spin coating)): 1×1 mm square scars were formed by cross cutting using a box cutter on the test surface (layer (A) side of composition). A box cutter guide was employed. The number of square cross cuts was longitudinal 10×transversal 10=100. A cellophane tape was pressed hard against and made adhering to the areas of square cross cuts and the tape was pulled off rapidly at the end at an angle of 45° to observe the condition of each of the square cross cuts (and find out the number of square cross cuts that were left unpeeled).
(Water Resistance Test)
Each sample on the corresponding laminate was immersed in boiled water (pure water) for an hour and dried naturally. The dried sample was visually observed for deterioration of appearance of the hard coat layer.
○: Neither paint peeling nor paint cracking was observed (after 1 hour immersion).
x: Paint peeling and paint cracking were observed (after 1 hour immersion).

Test on Adhesiveness Relative to Dissimilar Materials
For each sample, a test on adhesiveness relative to dissimilar materials was conducted by way of a shear adhesion measurement as shown below. Tables 1 through 8 show the obtained results.

The above adhesive composition was applied onto each of the specific adherends (B1) having dimensions of 150 mm×1 mm thickness×25 mm width by spin coating (to an application thickness of 15 to 20 μm) to form a layer (A) of the adhesive composition and one the specific adherend (B2) having dimensions same as those of the specific adherends (B1) shown in Tables 1 to 8 was bonded to it under pressure. Then, the adhesive composition was cured by irradiating UV rays (wavelength; 325 nm, integrated radiation intensity: 50 mJ/cm$^2$) from the side of the transparent layer for UV curing to prepare a laminate. Subsequently, the specific adherend (B2) was pulled in a direction parallel to the bonding surface of the layer (A) of the adhesive composition to observe the tensile strength at break (MPa/25 mm). Tables 1 through 8 show the obtained results. Note that, in Tables 1 through 8, each laminate comprising the (B1)-(A)-(B2) was expressed as (B1) vs (B2). If, for example, (B1) is hard PVC and (B2) is glass, an expression of "hard PVC vs glass" was used.
(Weather Resistance Test)
Each laminate was exposed to cycles of 12-minute rain fall and after exposure 48-minute drying for 500 and 1,000 hours at black panel temperature of 63° C. by means of a sunshine weather meter and the appearance was observed.
○: no appearance change observed
x: bleaching, yellowing, peeling observed
(Flame Retardancy Test)
A combustion test was conducted according to the Safety Standard UL94 (○: combustion time not more than 10 seconds, Δ: combustion time not less than 10 seconds, x: entirely combusted) of UNDERWRITERS LABORATORIES INC.
(Surface Resistance Test)
As for the surface resistance of each of the examples and the comparative examples, an adhesive composition according to the present invention was applied onto a glass substrate (dimensions: 150 mm×25 mm×thickness 1 mm) by spin coating (the thickness of the applied adhesive composition: 10 μm) and the surface resistivity (Ω/sq.) was observed by means of a HIRESTER UP (MCP-HT450), a high resisitvity meter available from Mitsubishi Chemical Corporation, applying a voltage of 500 V according to ASTMD257. The average value (n=5) of the resistivities of five samples was used as the resistivity of the example or comparative example.
(Various Transmittance Tests)
As for the visible light transmittance of each of the examples and the comparative examples, the spectral transmittance curve was obtained by means of a U-4000 type automatic recording spectrophotometer (available from Hitachi Ltd.) according to JIS R-3106 and the average transmittance in the wavelength range between 380 and 780 nm was determined for a D light source.

As for the UV transmittance of each of the examples and the comparative examples, the average transmittance in the wavelength range between 300 and 380 nm was determined by using a similar means according to ISO/DIS 13837.

As for the IR transmittance of each of the examples and the comparative examples, the average transmittance in the wavelength range between 780 and 2,000 nm was determined by using a similar means according to ISO/DIS 138378.

Shock Resistance Test
test method: An adhesive composition was applied onto a 25 mm-wide and 1 mm-thick steel plate to a thickness of 15 to 20 μm by spin coatings and, after curing, a spherical weight of 1 kgw was dropped from a height of 1 meter onto the sample. The shock resistance of the sample was evaluated according to the rating system shown below.
○: no peeling
Δ: partly peeled and cracked
x: totally peeled and cracked
Flexibility
test method: An adhesive composition was applied onto a 25 mm-wide and 1 mm-thick substrate to a thickness of 15 to 20 μm by spin coatings and, after curing, a 90° bending test was conducted by applying the sample to an iron rod having a diameter of 10 mm. The flexibility of the sample was evaluated according to the rating system shown below.
∘: no peeling
Δ: partly peeled and cracked
x: totally peeled and cracked
Transparency Test To evaluate the transparency of each sample, the haze of the molded body (glass substrate) of each of the examples and the comparative examples based on JIS-K 7136: 2000 was observed by means of a haze meter (NDH2000: available from NIPPON DENSHOKU INDUSTRIES Co., Ltd.). The samples that showed a measurement value of less than 1.0% were rated as "⊚", the samples that showed a measurement value of not less than 1.0% and less than 2.0% were rated as "∘" and the samples that showed a measurement value of not less than 2.0% were rated as "x". The measurement surface were conducted at the film coated surface of each sample.

Slip Resistance Coefficient (when Used for a Floor)
test method: An adhesive composition according to the present invention was applied onto a 25 mm-wide and 1 mm-thick PC substrate to a thickness of 15 to 20 μm by spin coatings and, after curing, the coefficient of slip resistance (C.S.R) of the sample was observed according to JIS A 1509-2008 and evaluated according to the rating system shown below. When the sample piece was small, a plurality of samples were laid on a floor for the test.
not more than 0.4: x slippery and hazardous
0.4 to 0.5: Δ hardly slippery on a flat floor and hence safe not less than 0.5: ∘ hardly slippery on an inclined floor and hence safe
(Measurement of Haze Value and Total Light Transmittance)

Each of the coated glass substrate samples was observed for haze value and total light transmittance by means of an instrument ("COH-300A": trade name) available from NIPPON DENSHOKU INDUSTRIES Co., Ltd.
(Measurement of Pencil Hardness)

Each of the coated glass substrate samples was observed for pencil hardness according to the pencil hardness test method described in JIS K 5400.

Each sample was judged for the presence or absence of scratches by means of the naked eyes of the observer described in JIS K 5400. However, if the scratches were delicate, the depth of each of the scratches (recessed parts) was measured by a commercially available stylus type surface roughness tester and, "an occurrence of scratches" was determined when the average depth of the five different scratches was not less than 0.2 μm.
(Measurement of Taber Abrasion)

Each of the coated PC (polycarbonate) substrate samples was subjected to a Taber abrasion test (CS-10 abrasion paper, 500 g, 20 times) and subsequently the sample was evaluated for Taber abrasion by seeing of the difference (ΔH) of the haze value of the film coat before and after the abrasion as determined by means of the formula shown below.

$$haze (\%) = (diffuse\ transmittance/total\ light\ transmittance) \times 100$$

Speaker Durability Evaluation

A coating was applied to each sample cone paper-made 016 mm circular dome type vibration plate having a tangential edge to a film thickness of about 10 μm. Then, a micro speaker unit comprising a voice coil, a magnet, a frame and a damper was prepared by using the vibration plate. The obtained micro speaker was connected to the terminal of a durability tester (ST-2000B: trade name, available from SIGMA Electronics Co., Ltd.) and subjected to load level shifts, using three levels 0.3 W (1.55 V), 0.7 W (2.34 V) and 1.0 W (2.83 V), of white noise per EIA mode and the condition of the vibration plate was evaluated according to the rating system shown below (number of samples for evaluation: 5 sets).

(∘): The vibration plate showed neither cracks not breakdown in not less than 4 sets after a continuous input of 100 hours.

(Δ): The vibration plate showed neither cracks not breakdown in not less than 2 sets after an input is not less than 10 hours and is less than 100 hours.

(x): The vibration plate showed both cracks and breakdown in not less than 1 sets after an input is less than 10 hours.
Antirust Effect An adhesive composition according to the present invention was applied onto sample SUS substrates to a film thickness of 10 μm.

A composite cycle test lasting a total of 8 hours was conducted on each of the samples. In a cycle, salts spray test (CASS) was conducted at 35° C. for 4 hours, subsequently the film coat was dried in a hot and humid condition at 60° C. and 50% RH for 2 hours and then an humidity durability test was conducted at 50° C. and 95% RH.

The salts spray test (CASS) was conducted by means of the salt spray test method conforming to JIS Z 2371 but the test liquid was changed from salt water to CASS test solution. CASS test solution is an aqueous solution containing sodium chloride by 40 g/L and copper (II) chloride by 0.205 g/L and whose pH value was adjusted to 3.0 by means of acetic acid.

A composite cycle test was repeated for 200 times on each sample and the sample was evaluated according to the rating system shown below (number of evaluated samples: 2 sets).
(∘): Neither rust nor swells were observed in 2 sets.
(Δ): Rust and swells were observed in 1 set.
(x): Rust and swells were observed in 2 sets.

TABLE 1

| | Component | | Exam. 1 | Exam. 2 | Exam. 3 | Exam. 4 | Exam. 5 |
|---|---|---|---|---|---|---|---|
| (a-1) (i) | CN975 urethane acrylate available from Sartomer Co. | 20 to 40 | | | | | 30 |
| (a-1) (ii) | CN292 polyester acrylate available from Sartomer Co. | 20 to 40 | | | | | |
| (a-1) (iii) | CNUVE151 epoxy acrylate available from Sartomer Co. | 20 to 40 | 30 | 30 | 30 | 30 | |
| (a-1) (iv) | CN963B80 urethane acrylate available from Sartomer Co. | 20 to 40 | | | | | |

TABLE 1-continued

| | Component | | Exam. 1 | Exam. 2 | Exam. 3 | Exam. 4 | Exam. 5 |
|---|---|---|---|---|---|---|---|
| (a-2) | LIGOLAC21E-A-2 available from Showa Highpolymer Co. | 20 to 40 | | | | | |
| (b-1-2) | polybutadiene polyol Poly bd R-15HT | 50 | | | | | |
| (b-1-1-1) | aromatic castor oil-based polyol URIC AC-006 | 50 | 10 | 10 | 10 | 10 | 10 |
| (b-1-3) | polyisoprene-based polyol Poly ip | 50 | | | | | |
| (b-2-1) | castor oil-based polyol URIC H-1262 | 50 | | | | | |
| (b-2-1) | castor oil-based polyol URIC H-2151U | 50 | | | | | |
| (b-1-3) | hydroxy-terminated liquid polyolefin EpoI | 50 | | | | | |
| (b-3-1) | maleated polyisoprene LIR-420 | 50 | | | | | |
| (b-3-2) | Ricon130MA8 | 50 | | | | | |
| (b-3-2) | maleic acid modified poly-butadiene POLYVEST OC 800 S | 0.1 to 50 | | | | | |
| (b-1-4) | epoxy polyol EPICLON U-125-60BT | 50 | | | | | |
| (b-4-1) | polyepoxy compound ADEKA RESIN EP-4100E | 50 | | | | | |
| (b-4-2) | L-207 | 50 | | | | | |
| (b-5-1) | Lumiflon LF-200 | 50 | | | | | |
| (b-5-2) | Lumiflon LF-302 | 50 | | | | | |
| (c-1) (i) | N-vinyl caprolactam | 30 to 70 | 60 | 40 | 40 | 20 | 60 |
| (c-2) (i) | dipropylene glycol diacrylate (DPGDA) | 30 to 70 | | 20 | | 40 | |
| (c-2) (ii) | tripropylene glycol diacrylate (TPGDA) | 30 to 70 | | | 20 | | |
| (c-2) (iii) | dipentaerythritol polyacrylate | 30 to 70 | | | | | |
| (c-1) (ii) | acryloil morphorine (ACMO) | 30 to 70 | | | | | |
| (d) (i) | IRGACURE 819 | 15 | 5 | 5 | 5 | 5 | 5 |
| (d) (ii) | PERHEXA 25B | 15 | | | | | |
| | Total (parts by mass) | | 105 | 105 | 105 | 105 | 105 |
| | antifouling-property imparting material (BYK-UV3500) ST) | | | | | | |
| | scratch resistance enhancing material (NANOBYK-3602) | | | | | | |
| | shock resistance enhancing material (PARALOID BPM-500) | | | | | | |
| | IR absorbing material (IR-40K) | | | | | | |
| | UV absorbing material (TINUVIN326) | | | | | | |
| | IR reflecting material (TiO2 CR-90) | | | | | | |
| | electromagnetic shielding material (23-K) S) | | | | | | |
| | antistatic material (CX-Z603M-F2) | | | | | | |
| | antistatic material (LQ-01) | | | | | | |
| | antistatic material (TMAC-100) | | | | | | |
| | flame retardant imparting material (P type flame retardant PX-200) | | | | | | |
| Evaluation result | viscosity mPa · s (25° C.) | | 1300 | 1600 | 1600 | 1000 | 1050 |
| | haze value % (glass coat) | | 1.2 | 1 | 1.3 | 0.9 | 1.3 |
| | total light transmittance % (glass coat) | | 85 | 84 | 85 | 86 | 86 |
| | pencil hardness (glass coat) | | HB | HB | HB | HB | HB |
| | taber abrasion (ΔH) % (PC coat) | | 7.9 | 7.5 | 8.7 | 6.7 | 9.1 |
| | weather resistance test (1000 hr) | | X | X | X | X | X |
| | weather resistance test (500 hr) | | ○ | ○ | ○ | ○ | ○ |
| | surface resistance test (Ω/sq.) | | $10^{15}$ | $10^{15}$ | $10^{15}$ | $10^{15}$ | $10^{15}$ |
| | IR transmittance (%) at 780 nm~2000 nm | | 80 to 85 | 80 to 85 | 80 to 85 | 80 to 85 | 80 to 85 |
| | UV transmittance (%) at 300~380 nm | | 50 to 55 | 50 to 55 | 50 to 55 | 50 to 55 | 50 to 55 |
| | visible light transmittance (%) at 380~780 nm | | 90 to 95 | 90 to 95 | 90 to 95 | 90 to 95 | 90 to 95 |
| | flame retardancy | | X | X | X | X | X |
| | skid resistance coefficient | | Δ | Δ | Δ | Δ | Δ |
| | adhesion test | | | | | | |
| | hard vinyl chloride resin | | 100 | 100 | 100 | 100 | 100 |
| | soft vinyl chloride resin | | 100 | 100 | 100 | 100 | 100 |
| | PS | | 100 | 100 | 100 | 100 | 100 |
| | PC | | 100 | 100 | 100 | 100 | 100 |
| | glass | | 100 | 100 | 100 | 100 | 100 |
| | aluminum | | 100 | 100 | 100 | 100 | 100 |
| | steel plate | | 100 | 100 | 100 | 100 | 100 |
| | concrete | | 100 | 100 | 100 | 100 | 100 |
| | wood | | 100 | 100 | 100 | 100 | 100 |
| | stone | | 100 | 100 | 100 | 100 | 100 |
| | artificial marble | | 100 | 100 | 100 | 100 | 100 |
| | PP | | 0 | 0 | 0 | 0 | 0 |
| | HDPE | | 0 | 0 | 0 | 0 | 0 |
| | MAH-PE | | 100 | 100 | 100 | 100 | 100 |
| | magnesium | | 85 | 80 | 80 | 80 | 85 |
| | ABS | | 100 | 100 | 100 | 100 | 100 |
| | PET | | 100 | 100 | 100 | 100 | 100 |
| | thermoplastic polyurethane elastomer | | 100 | 100 | 100 | 100 | 100 |
| | 2-part liquid polyurethane | | 100 | 100 | 100 | 100 | 100 |

TABLE 1-continued

| Component | Exam. 1 | Exam. 2 | Exam. 3 | Exam. 4 | Exam. 5 |
|---|---|---|---|---|---|
| 2-part liquid epoxy | 100 | 100 | 100 | 100 | 100 |
| PMMA | 100 | 100 | 100 | 100 | 100 |
| Water resistance test | | | | | |
| hard vinyl chloride resin | ○ | ○ | ○ | ○ | ○ |
| soft vinyl chloride resin | ○ | ○ | ○ | ○ | ○ |
| PS | ○ | ○ | ○ | ○ | ○ |
| PC | ○ | ○ | ○ | ○ | ○ |
| glass | ○ | ○ | ○ | ○ | ○ |
| aluminum | ○ | ○ | ○ | ○ | ○ |
| steel plate | ○ | ○ | ○ | ○ | ○ |
| concrete | ○ | ○ | ○ | ○ | ○ |
| wood | ○ | ○ | ○ | ○ | ○ |
| stone | ○ | ○ | ○ | ○ | ○ |
| artificial marble | ○ | ○ | ○ | ○ | ○ |
| PP | — | — | — | — | — |
| HDPE | — | — | — | — | — |
| MAH-PE | ○ | ○ | ○ | ○ | ○ |
| magnesium | ○ | ○ | ○ | ○ | ○ |
| ABS | ○ | ○ | ○ | ○ | ○ |
| PET | ○ | ○ | ○ | ○ | ○ |
| thermoplastic polyurethane elastomer | ○ | ○ | ○ | ○ | ○ |
| 2-part liquid polyurethane | ○ | ○ | ○ | ○ | ○ |
| 2-part liquid epoxy | ○ | ○ | ○ | ○ | ○ |
| PMMA | ○ | ○ | ○ | ○ | ○ |
| Shock resistance test | | | | | |
| hard vinyl chloride resin | ○ | ○ | ○ | ○ | ○ |
| soft vinyl chloride resin | ○ | ○ | ○ | ○ | ○ |
| PS | ○ | ○ | ○ | ○ | ○ |
| PC | ○ | ○ | ○ | ○ | ○ |
| glass | ○ | ○ | ○ | ○ | ○ |
| aluminum | ○ | ○ | ○ | ○ | ○ |
| steel plate | ○ | ○ | ○ | ○ | ○ |
| concrete | ○ | ○ | ○ | ○ | ○ |
| wood | ○ | ○ | ○ | ○ | ○ |
| stone | ○ | ○ | ○ | ○ | ○ |
| artificial marble | ○ | ○ | ○ | ○ | ○ |
| PP | — | — | — | — | — |
| HDPE | — | — | — | — | — |
| MAH-PE | ○ | ○ | ○ | ○ | ○ |
| magnesium | ○ | ○ | ○ | ○ | ○ |
| ABS | ○ | ○ | ○ | ○ | ○ |
| PET | ○ | ○ | ○ | ○ | ○ |
| thermoplastic polyurethane elastomer | ○ | ○ | ○ | ○ | ○ |
| 2-part liquid polyurethane | ○ | ○ | ○ | ○ | ○ |
| 2-part liquid epoxy | ○ | ○ | ○ | ○ | ○ |
| PMMA | ○ | ○ | ○ | ○ | ○ |
| flexibility test | | | | | |
| hard vinyl chloride resin | ○ | ○ | ○ | ○ | ○ |
| soft vinyl chloride resin | ○ | ○ | ○ | ○ | ○ |
| PS | ○ | ○ | ○ | ○ | ○ |
| PC | ○ | ○ | ○ | ○ | ○ |
| glass | Δ | Δ | Δ | Δ | Δ |
| aluminum | ○ | ○ | ○ | ○ | ○ |
| steel plate | ○ | ○ | ○ | ○ | ○ |
| concrete | ○ | ○ | ○ | ○ | ○ |
| wood | ○ | ○ | ○ | ○ | ○ |
| stone | ○ | ○ | ○ | ○ | ○ |
| artificial marble | Δ | Δ | Δ | Δ | Δ |
| PP | — | — | — | — | — |
| HDPE | — | — | — | — | — |
| MAH-PE | ○ | ○ | ○ | ○ | ○ |
| magnesium | ○ | ○ | ○ | ○ | ○ |
| ABS | ○ | ○ | ○ | ○ | ○ |
| PET | ○ | ○ | ○ | ○ | ○ |
| thermoplastic polyurethane elastomer | ○ | ○ | ○ | ○ | ○ |
| 2-part liquid polyurethane | ○ | ○ | ○ | ○ | ○ |
| 2-part liquid epoxy | ○ | ○ | ○ | ○ | ○ |
| PMMA | Δ | Δ | Δ | Δ | Δ |
| test on adhesiveness relative to dissimilar materials (B1)-(A)-(B2) MPa | | | | | |
| hard PVC vs glass | 7.3 | 7.2 | 7.7 | 7.5 | 8 |
| soft PVC vs glass | 7.7 | 7.9 | 7.6 | 7.8 | 7.8 |
| PS vs aluminum | 8.9 | 8.2 | 8.7 | 8.2 | 8.3 |

TABLE 1-continued

| Component | Exam. 1 | Exam. 2 | Exam. 3 | Exam. 4 | Exam. 5 |
|---|---|---|---|---|---|
| PC vs alminum | 8.1 | 8 | 8.5 | 8.9 | 8.6 |
| PS vs glass | 7.6 | 7.5 | 7.7 | 7.2 | 7.7 |
| PC vs glass | 7.8 | 7.5 | 7 | 7.8 | 7.2 |
| ABS vs glass | 7.1 | 7.3 | 7.5 | 7.6 | 7.9 |
| glass vs alminum | 8 | 8.7 | 8.2 | 8.4 | 8.6 |
| magnesium vs PC | 7.5 | 7.8 | 7 | 7.6 | 7.4 |
| steel plate vs PMMA | 8.9 | 8.8 | 8.1 | 8.7 | 8 |
| PET vs ABS | 8.5 | 8.9 | 8.3 | 8.8 | 8.6 |
| PMMA vs ABS | 8.1 | 8 | 8.8 | 8.6 | 8.9 |
| speaker durability evaluation | ○ | ○ | ○ | ○ | ○ |
| antirust effect | ○ | ○ | ○ | ○ | ○ |

TABLE 2

| | Component | | Exam. 6 | Exam. 7 | Exam. 8 | Exam. 9 |
|---|---|---|---|---|---|---|
| (a-1) (i) | Co. | 20 to 40 | | | | |
| (a-1) (ii) | Co. | 20 to 40 | | | | |
| (a-1) (iii) | Co. | 20 to 40 | | | | |
| (a-1) (iv) | CN963B80 urethane acrylate available from Sartomer Co. | 20 to 40 | 30 | 30 | 30 | 30 |
| (a-2) | Co. | 20 to 40 | | | | |
| (b-1-2) | polybutadiene polyol Poly bd R-15HT | 50 | | | | |
| (b-1-1-1) | aromatic castor oil-based polyol URIC AC-006 | 50 | 10 | 10 | 10 | 10 |
| (b-1-3) | polyisoprene-based polyol Poly ip | 50 | | | | |
| (b-2-1) | castor oil-based polyol URIC H-1262 | 50 | | | | |
| (b-2-1) | castor oil-based polyol URIC H-2151U | 50 | | | | |
| (b-1-3) | hydroxy-terminated liquid polyolefin EpoI | 50 | | | | |
| (b-3-1) | maleated polyisoprene LIR-420 | 50 | | | | |
| (b-3-2) | maleic acid modified poly-butadiene Ricon130MA8 | 50 | | | | |
| (b-3-2) | maleic acid modified poly-butadiene POLYVEST OC 800 S | 0.1 to 50 | | | | |
| (b-1-4) | epoxy polyol EPICLON U-125-60BT | 50 | | | | |
| (b-4-1) | polyepoxy compound ADEKA RESIN EP-4100E | 50 | | | | |
| (b-4-2) | L-207 | 50 | | | | |
| (b-5-1) | Lumiflon LF-200 | 50 | | | | |
| (b-5-2) | Lumiflon LF-302 | 50 | | | | |
| (c-1) (i) | N-vinyl caprolactam | 30 to 70 | 30 | 30 | 30 | 30 |
| (c-2) (i) | dipropylene glycol diacrylate (DPGDA) | 30 to 70 | 30 | | | |
| (c-2) (ii) | tripropylene glycol diacrylate (TPGDA) | 30 to 70 | | 30 | | |
| (c-2) (iii) | dipentaerythritol polyacrylate | 30 to 70 | | | 30 | |
| (c-1) (ii) | acryloil morphorine (ACMO) | 30 to 70 | | | | 30 |
| (d) (i) | IRGACURE 819 | 0.1 to 15 | 5 | 5 | 5 | 5 |
| (d) (ii) | PERHEXA 25B | 0.1 to 15 | | | | |
| | Total (parts by mass) | | 105 | 105 | 105 | 105 |
| | UV3500) | | | | | |
| | scratch resistance enhancing material (MEK-ST) | | | | | |
| | scratch resistance enhancing material (NANOBYK-3602) | | | | | |
| | shock resistance enhancing material (PARALOID BPM-500) | | | | | |
| | IR absorbing material (IR-40K) | | | | | |
| | UV absorbing material (TINUVIN326) | | | | | |
| | IR reflecting material (TiO2 CR-90) | | | | | |
| | electromagnetic shielding material (23-K) | | | | | |
| | electroconductive expressing material (VGCF-S) | | | | | |
| | antistatic material (CX-Z603M-F2) | | | | | |
| | antistatic material (LQ-01) | | | | | |
| | antistatic material (TMAC-100) | | | | | |
| | flame retardant imparting material (P type flame retardant PX-200) | | | | | |
| Evaluation result | viscosity mPa · s (25° C.) | | 1000 | 1000 | 1000 | 1000 |
| | haze value % (glass coat) | | 1 | 1 | 1 | 1 |
| | total light transmittance % (glass coat) | | 88 | 88 | 88 | 88 |
| | pencil hardness (glass coat) | | F | F | H | H |
| | taber abrasion (ΔH) % (PC coat) | | 6.1 | 6.1 | 5.4 | 5.4 |
| | weather resistance test (1000 hr) | | X | X | X | X |
| | weather resistance test (500 hr) | | ○ | ○ | ○ | ○ |
| | surface resistance test (Ω/sq.) | | $10^{15}$ | $10^{15}$ | $10^{15}$ | $10^{15}$ |
| | IR transmittance (%) at 780 nm~2000 nm | | 80 to 85 | 80 to 85 | 80 to 85 | 80 to 85 |
| | UV transmittance (%) at 300~380 nm | | 50 to 55 | 50 to 55 | 50 to 55 | 50 to 55 |
| | visible light transmittance (%) at 380~780 nm | | 90 to 95 | 90 to 95 | 90 to 95 | 90 to 95 |

TABLE 2-continued

| Component | Exam. 6 | Exam. 7 | Exam. 8 | Exam. 9 |
|---|---|---|---|---|
| flame retardancy | X | X | X | X |
| skid resistance coefficient | Δ | Δ | Δ | Δ |
| adhesion test | | | | |
| hard vinyl chloride resin | 100 | 100 | 100 | 100 |
| soft vinyl chloride resin | 100 | 100 | 100 | 100 |
| PS | 100 | 100 | 100 | 100 |
| PC | 100 | 100 | 100 | 100 |
| glass | 100 | 100 | 100 | 100 |
| aluminum | 100 | 100 | 100 | 100 |
| steel plate | 100 | 100 | 100 | 100 |
| concrete | 100 | 100 | 100 | 100 |
| wood | 100 | 100 | 100 | 100 |
| stone | 100 | 100 | 100 | 100 |
| artificial marble | 100 | 100 | 100 | 100 |
| PP | 0 | 0 | 0 | 0 |
| HDPE | 0 | 0 | 0 | 0 |
| MAH-PE | 100 | 100 | 100 | 100 |
| magnesium | 80 | 80 | 70 | 70 |
| ABS | 100 | 100 | 100 | 100 |
| PET | 100 | 100 | 100 | 100 |
| thermoplastic polyurethane elastomer | 100 | 100 | 100 | 100 |
| 2-part liquid polyurethane | 100 | 100 | 100 | 100 |
| 2-part liquid epoxy | 100 | 100 | 100 | 100 |
| PMMA | 100 | 100 | 100 | 100 |
| Water resistance test | | | | |
| hard vinyl chloride resin | ○ | ○ | ○ | ○ |
| soft vinyl chloride resin | ○ | ○ | ○ | ○ |
| PS | ○ | ○ | ○ | ○ |
| PC | ○ | ○ | ○ | ○ |
| glass | ○ | ○ | ○ | ○ |
| aluminum | ○ | ○ | ○ | ○ |
| steel plate | ○ | ○ | ○ | ○ |
| concrete | ○ | ○ | ○ | ○ |
| wood | ○ | ○ | ○ | ○ |
| stone | ○ | ○ | ○ | ○ |
| artificial marble | ○ | ○ | ○ | ○ |
| PP | — | — | — | — |
| HDPE | — | — | — | — |
| MAH-PE | ○ | ○ | ○ | ○ |
| magnesium | ○ | ○ | ○ | ○ |
| ABS | ○ | ○ | ○ | ○ |
| PET | ○ | ○ | ○ | ○ |
| thermoplastic polyurethane elastomer | ○ | ○ | ○ | ○ |
| 2-part liquid polyurethane | ○ | ○ | ○ | ○ |
| 2-part liquid epoxy | ○ | ○ | ○ | ○ |
| PMMA | ○ | ○ | ○ | ○ |
| Shock resistance test | | | | |
| hard vinyl chloride resin | ○ | ○ | ○ | ○ |
| soft vinyl chloride resin | ○ | ○ | ○ | ○ |
| PS | ○ | ○ | ○ | ○ |
| PC | ○ | ○ | ○ | ○ |
| glass | ○ | ○ | ○ | ○ |
| aluminum | ○ | ○ | ○ | ○ |
| steel plate | ○ | ○ | ○ | ○ |
| concrete | ○ | ○ | ○ | ○ |
| wood | ○ | ○ | ○ | ○ |
| stone | ○ | ○ | ○ | ○ |
| artificial marble | ○ | ○ | ○ | ○ |
| PP | — | — | — | — |
| HDPE | — | — | — | — |
| MAH-PE | ○ | ○ | ○ | ○ |
| magnesium | ○ | ○ | ○ | ○ |
| ABS | ○ | ○ | ○ | ○ |
| PET | ○ | ○ | ○ | ○ |
| thermoplastic polyurethane elastomer | ○ | ○ | ○ | ○ |
| 2-part liquid polyurethane | ○ | ○ | ○ | ○ |
| 2-part liquid epoxy | ○ | ○ | ○ | ○ |
| PMMA | ○ | ○ | ○ | ○ |
| flexibility test | | | | |
| hard vinyl chloride resin | ○ | ○ | ○ | ○ |
| soft vinyl chloride resin | ○ | ○ | ○ | ○ |
| PS | ○ | ○ | ○ | ○ |
| PC | ○ | ○ | ○ | ○ |

TABLE 2-continued

| Component | Exam. 6 | Exam. 7 | Exam. 8 | Exam. 9 |
|---|---|---|---|---|
| glass | Δ | Δ | Δ | ○ |
| aluminum | ○ | ○ | ○ | ○ |
| steel plate | ○ | ○ | ○ | ○ |
| concrete | ○ | ○ | ○ | ○ |
| wood | ○ | ○ | ○ | ○ |
| stone | ○ | ○ | ○ | ○ |
| artificial marble | Δ | Δ | Δ | ○ |
| PP | — | — | — | — |
| HDPE | — | — | — | — |
| MAH-PE | ○ | ○ | ○ | ○ |
| magnesium | ○ | ○ | ○ | ○ |
| ABS | ○ | ○ | ○ | ○ |
| PET | ○ | ○ | ○ | ○ |
| thermoplastic polyurethane elastomer | ○ | ○ | ○ | ○ |
| 2-part liquid polyurethane | ○ | ○ | ○ | ○ |
| 2-part liquid epoxy | ○ | ○ | ○ | ○ |
| PMMA | Δ | Δ | Δ | ○ |
| test on adhesiveness relative to dissimilar materials (B1)-(A)-(B2) MPa | | | | |
| hard PVC vs glass | 9 | 8.6 | 8.7 | 13.9 |
| soft PVC vs glass | 8.8 | 8.9 | 8.6 | 12.1 |
| PS vs aluminum | 8.5 | 8.7 | 8.4 | 8.9 |
| PC vs alminum | 8 | 8.2 | 8.4 | 8.2 |
| PS vs glass | 8.7 | 8.3 | 8.1 | 12.3 |
| PC vs glass | 8.8 | 8.2 | 8.3 | 12 |
| ABS vs glass | 8.7 | 8.6 | 8.6 | 13.4 |
| glass vs alminum | 8.6 | 8.6 | 8.9 | 8 |
| magnesium vs PC | 7.6 | 7 | 7.6 | 7.7 |
| steel plate vs PMMA | 8.4 | 8 | 8.1 | 8 |
| PET vs ABS | 8.6 | 8.3 | 8.1 | 8.2 |
| PMMA vs ABS | 8.1 | 8.4 | 8.8 | 8.2 |
| speaker durability evaluation | ○ | ○ | ○ | ○ |
| antirust effect | ○ | ○ | ○ | ○ |

TABLE 3

| | Component | | Exam. 10 | Exam. 11 | Exam. 12 | Exam. 13 | Exam. 14 |
|---|---|---|---|---|---|---|---|
| (a-1) (i) | CN975 urethane acrylate available from Sartomer Co. | 20 to 40 | | | | | |
| (a-1) (ii) | CN292 polyester acrylate available from Sartomer Co. | 20 to 40 | 30 | | | | |
| (a-1) (iii) | CNUVE151 epoxy acrylate available from Sartomer Co. | 20 to 40 | | | 30 | 30 | 30 |
| (a-1) (iv) | CN963B80 urethane acrylate available from Sartomer Co. | 20 to 40 | | 30 | | | |
| (a-2) | LIGOLAC21E-A-2 available from Showa Highpolymer Co. | 20 to 40 | | | | | |
| (b-1-2) | polybutadiene polyol Poly bd R-15HT | 50 | | | | | |
| (b-1-1-1) | aromatic castor oil-based polyol URIC AC-006 | 50 | 10 | 10 | | | |
| (b-1-3) | polyisoprene-based polyol Poly ip | 50 | | | 10 | | |
| (b-2-1) | castor oil-based polyol URIC H-1262 | 50 | | | | 10 | |
| (b-2-1) | castor oil-based polyol URIC H-2151U | 50 | | | | | 10 |
| (b-1-3) | hydroxy-terminated liquid polyolefin EpoI | 50 | | | | | |
| (b-3-1) | maleated polyisoprene LIR-420 | 50 | | | | | |
| (b-3-2) | Ricon130MA8 | 50 | | | | | |
| (b-3-2) | POLYVEST OC 800 S | 50 | | | | | |
| (b-1-4) | epoxy polyol EPICLON U-125-60BT | 50 | | | | | |
| (b-4-1) | polyepoxy compound ADEKA RESIN EP-4100E | 50 | | | | | |
| (b-4-2) | L-207 | 50 | | | | | |
| (b-5-1) | Lumiflon LF-200 | 50 | | | | | |
| (b-5-2) | Lumiflon LF-302 | 50 | | | | | |

TABLE 3-continued

| Component | | | | Exam. 10 | Exam. 11 | Exam. 12 | Exam. 13 | Exam. 14 |
|---|---|---|---|---|---|---|---|---|
| (c-1) (i) | N-vinyl caprolactam | | 30 to 70 | 60 | 60 | 60 | 60 | 60 |
| (c-2) (i) | dipropylene glycol diacrylate (DPGDA) | | 30 to 70 | | | | | |
| (c-2) (ii) | tripropylene glycol diacrylate (TPGDA) | | 30 to 70 | | | | | |
| (c-2) (iii) | dipentaerythritol polyacrylate | | 30 to 70 | | | | | |
| (c-1) (ii) | acryloil morphorine(ACMO) | | 30 to 70 | | | | | |
| (d) (i) | IRGACURE 819 | | 0.1 to 15 | 5 | 5 | 5 | 5 | 5 |
| (d) (ii) | PERHEXA 25B | | 0.1 to 15 | | | | | |
| | Total (parts by mass) | | | 105 | 105 | 105 | 105 | 105 |
| | antifouling-property imparting material (BYK-UV3500) | | | | | | | |
| | scratch resistance enhancing material (MEK-ST) | | | | | | | |
| | scratch resistance enhancing material (NANOBYK-3602) | | | | | | | |
| | shock resistance enhancing material (PARALOID BPM-500) | | | | | | | |
| | IR absorbing material (IR-40K) | | | | | | | |
| | UV absorbing material (TINUVIN326) | | | | | | | |
| | IR reflecting material (TiO2 CR-90) | | | | | | | |
| | electromagnetic shielding material (23-K S) | | | | | | | |
| | antistatic material (CX-Z603M-F2) | | | | | | | |
| | antistatic material (LQ-01) | | | | | | | |
| | antistatic material (TMAC-100) | | | | | | | |
| | flame retardant imparting material (P type flame retardant PX-200) | | | | | | | |
| Evaluation result | viscosity mPa · s (25° C.) | | | 340 | 1350 | 1350 | 1400 | 1380 |
| | haze value % (glass coat) | | | 1.2 | 1.2 | 1 | 1.1 | 0.9 |
| | total light transmittance % (glass coat) | | | 85 | 86 | 87 | 87 | 86 |
| | pencil hardness (glass coat) | | | HB | HB | HB | HB | HB |
| | taber abrasion (ΔH) % (PC coat) | | | 8.1 | 8.9 | 7.9 | 8.4 | 6.6 |
| | weather resistance test (1000 hr) | | | X | X | X | X | X |
| | weather resistance test (500 hr) | | | ○ | ○ | ○ | ○ | ○ |
| | surface resistance test (Ω/sq.) | | | $10^{15}$ | $10^{15}$ | $10^{15}$ | $10^{15}$ | $10^{15}$ |
| | IR transmittance (%) at 780 nm~2000 nm | | | 80 to 85 | 80 to 85 | 80 to 85 | 80 to 85 | 80 to 85 |
| | UV transmittance (%) at 300~380 nm | | | 50 to 55 | 50 to 55 | 50 to 55 | 50 to 55 | 50 to 55 |
| | visible light transmittance (%) at 380~780 nm | | | 90 to 95 | 90 to 95 | 90 to 95 | 90 to 95 | 90 to 95 |
| | flame retardancy | | | X | X | X | X | X |
| | skid resistance coefficient | | | Δ | Δ | Δ | Δ | Δ |
| | adhesion test | | | | | | | |
| | hard vinyl chloride resin | | | 100 | 100 | 100 | 100 | 100 |
| | soft vinyl chloride resin | | | 100 | 100 | 100 | 100 | 100 |
| | PS | | | 100 | 100 | 100 | 100 | 100 |
| | PC | | | 100 | 100 | 100 | 100 | 100 |
| | glass | | | 100 | 100 | 100 | 100 | 100 |
| | aluminum | | | 100 | 100 | 100 | 100 | 100 |
| | steel plate | | | 100 | 100 | 100 | 100 | 100 |
| | concrete | | | 100 | 100 | 100 | 100 | 100 |
| | wood | | | 100 | 100 | 100 | 100 | 100 |
| | stone | | | 100 | 100 | 100 | 100 | 100 |
| | artificial marble | | | 100 | 100 | 100 | 100 | 100 |
| | PP | | | 60 | 60 | 60 | 60 | 60 |
| | HDPE | | | 0 | 0 | 0 | 0 | 0 |
| | MAH-PE | | | 100 | 100 | 100 | 100 | 100 |
| | magnesium | | | 90 | 90 | 90 | 90 | 90 |
| | ABS | | | 100 | 100 | 100 | 100 | 100 |
| | PET | | | 100 | 100 | 100 | 100 | 100 |
| | thermoplastic polyurethane elastomer | | | 100 | 100 | 100 | 100 | 100 |
| | 2-part liquid polyurethane | | | 100 | 100 | 100 | 100 | 100 |
| | 2-part liquid epoxy | | | 100 | 100 | 100 | 100 | 100 |
| | PMMA | | | 100 | 100 | 100 | 100 | 100 |
| | Water resistance test | | | | | | | |
| | hard vinyl chloride resin | | | ○ | ○ | ○ | ○ | ○ |
| | soft vinyl chloride resin | | | ○ | ○ | ○ | ○ | ○ |
| | PS | | | ○ | ○ | ○ | ○ | ○ |
| | PC | | | ○ | ○ | ○ | ○ | ○ |
| | glass | | | ○ | ○ | ○ | ○ | ○ |
| | aluminum | | | ○ | ○ | ○ | ○ | ○ |
| | steel plate | | | ○ | ○ | ○ | ○ | ○ |
| | concrete | | | ○ | ○ | ○ | ○ | ○ |
| | wood | | | ○ | ○ | ○ | ○ | ○ |
| | stone | | | ○ | ○ | ○ | ○ | ○ |
| | artificial marble | | | ○ | ○ | ○ | ○ | ○ |
| | PP | | | X | X | X | X | X |

TABLE 3-continued

| Component | Exam. 10 | Exam. 11 | Exam. 12 | Exam. 13 | Exam. 14 |
|---|---|---|---|---|---|
| HDPE | — | — | — | — | — |
| MAH-PE | ○ | ○ | ○ | ○ | ○ |
| magnesium | ○ | ○ | ○ | ○ | ○ |
| ABS | ○ | ○ | ○ | ○ | ○ |
| PET | ○ | ○ | ○ | ○ | ○ |
| thermoplastic polyurethane elastomer | ○ | ○ | ○ | ○ | ○ |
| 2-part liquid polyurethane | ○ | ○ | ○ | ○ | ○ |
| 2-part liquid epoxy | ○ | ○ | ○ | ○ | ○ |
| PMMA | ○ | ○ | ○ | ○ | ○ |
| Shock resistance test | | | | | |
| hard vinyl chloride resin | ○ | ○ | ○ | ○ | ○ |
| soft vinyl chloride resin | ○ | ○ | ○ | ○ | ○ |
| PS | ○ | ○ | ○ | ○ | ○ |
| PC | ○ | ○ | ○ | ○ | ○ |
| glass | Δ | Δ | Δ | Δ | Δ |
| aluminum | ○ | ○ | ○ | ○ | ○ |
| steel plate | ○ | ○ | ○ | ○ | ○ |
| concrete | ○ | ○ | ○ | ○ | ○ |
| wood | ○ | ○ | ○ | ○ | ○ |
| stone | ○ | ○ | ○ | ○ | ○ |
| artificial marble | Δ | Δ | Δ | Δ | Δ |
| PP | X | X | X | X | X |
| HDPE | — | — | — | — | — |
| MAH-PE | ○ | ○ | ○ | ○ | ○ |
| magnesium | ○ | ○ | ○ | ○ | ○ |
| ABS | ○ | ○ | ○ | ○ | ○ |
| PET | ○ | ○ | ○ | ○ | ○ |
| thermoplastic polyurethane elastomer | ○ | ○ | ○ | ○ | ○ |
| 2-part liquid polyurethane | ○ | ○ | ○ | ○ | ○ |
| 2-part liquid epoxy | ○ | ○ | ○ | ○ | ○ |
| PMMA | Δ | Δ | Δ | Δ | Δ |
| flexibility test | | | | | |
| hard vinyl chloride resin | ○ | ○ | ○ | ○ | ○ |
| soft vinyl chloride resin | ○ | ○ | ○ | ○ | ○ |
| PS | ○ | ○ | ○ | ○ | ○ |
| PC | ○ | ○ | ○ | ○ | ○ |
| glass | ○ | ○ | ○ | ○ | ○ |
| aluminum | ○ | ○ | ○ | ○ | ○ |
| steel plate | ○ | ○ | ○ | ○ | ○ |
| concrete | ○ | ○ | ○ | ○ | ○ |
| wood | ○ | ○ | ○ | ○ | ○ |
| stone | ○ | ○ | ○ | ○ | ○ |
| artificial marble | ○ | ○ | ○ | ○ | ○ |
| PP | ○ | ○ | ○ | ○ | ○ |
| HDPE | ○ | ○ | ○ | ○ | ○ |
| MAH-PE | ○ | ○ | ○ | ○ | ○ |
| magnesium | ○ | ○ | ○ | ○ | ○ |
| ABS | ○ | ○ | ○ | ○ | ○ |
| PET | ○ | ○ | ○ | ○ | ○ |
| thermoplastic polyurethane elastomer | ○ | ○ | ○ | ○ | ○ |
| 2-part liquid polyurethane | ○ | ○ | ○ | ○ | ○ |
| 2-part liquid epoxy | ○ | ○ | ○ | ○ | ○ |
| PMMA | ○ | ○ | ○ | ○ | ○ |
| test on adhesiveness relative to dissimilar materials (B1)-(A)-(B2) MPa | | | | | |
| hard PVC vs glass | 8.5 | 8.8 | 8.1 | 8.3 | 8 |
| soft PVC vs glass | 8.1 | 8.6 | 8.8 | 9 | 8.7 |
| PS vs aluminum | 8.2 | 8.9 | 8.5 | 8.2 | 8.5 |
| PC vs alminum | 8.6 | 8.1 | 9 | 8.5 | 8.1 |
| PS vs glass | 8.2 | 8.7 | 8 | 8.5 | 8.3 |
| PC vs glass | 8.2 | 8.4 | 8.4 | 8.9 | 8.3 |
| ABS vs glass | 8.2 | 8.6 | 8.5 | 8.6 | 8 |
| glass vs alminum | 8.7 | 9 | 8.4 | 8.1 | 8.7 |
| magnesium vs PC | 7.8 | 7.8 | 7.5 | 7.5 | 7.6 |
| steel plate vs PMMA | 8.9 | 8.9 | 8.4 | 8.9 | 8.4 |
| PET vs ABS | 8.6 | 8.6 | 8.1 | 8.5 | 8.9 |
| PMMA vs ABS | 8.2 | 8 | 9 | 8.5 | 8.6 |
| speaker durability evaluation | ○ | ○ | ○ | ○ | ○ |
| antirust effect | ○ | ○ | ○ | ○ | ○ |

TABLE 4

| Component | | | Exam. 15 | Exam. 16 | Exam. 17 | Exam. 18 | Exam. 19 |
|---|---|---|---|---|---|---|---|
| (a-1) (i) | CN975 urethane acrylate available from Sartomer Co. | 20 to 40 | | | | | |
| (a-1) (ii) | CN292 polyester acrylate available from Sartomer Co. | 20 to 40 | | | | | |
| (a-1) (iii) | CNUVE151 epoxy acrylate available from Sartomer Co. | 20 to 40 | 30 | 30 | 30 | 30 | 30 |
| (a-1) (iv) | CN963B80 urethane acrylate available from Sartomer Co. | 20 to 40 | | | | | |
| (a-2) | LIGOLAC21E-A-2 available from Showa Highpolymer Co. | 20 to 40 | | | | | |
| (b-1-2) | polybutadiene polyol Poly bd R-15HT | 50 | | | | | |
| (b-1-1-1) | aromatic castor oil-based polyol URIC AC-006 | 50 | | | | | |
| (b-1-3) | polyisoprene-based polyol Poly ip | 50 | | | | | |
| (b-2-1) | castor oil-based polyol URIC H-1262 | 50 | | | | | |
| (b-2-1) | castor oil-based polyol URIC H-2151U | 50 | | | | | |
| (b-1-3) | hydroxy-terminated liquid polyolefin EpoI | 50 | 10 | | | | |
| (b-3-1) | maleated polyisoprene LIR-420 | 50 | | 10 | | | |
| (b-3-2) | Ricon130MA8 | 50 | | | 10 | | |
| (b-3-2) | maleic acid modified poly-butadiene POLYVEST OC 800 S | 0.1 to 50 | | | | 10 | |
| (b-1-4) | epoxy polyol EPICLON U-125-60BT | 50 | | | | | 10 |
| (b-4-1) | polyepoxy compound ADEKA RESIN EP-4100E | 50 | | | | | |
| (b-4-2) | L-207 | 50 | | | | | |
| (b-5-1) | Lumiflon LF-200 | 50 | | | | | |
| (b-5-2) | Lumiflon LF-302 | 50 | | | | | |
| (c-1) (i) | N-vinyl caprolactam | 30 to 70 | 60 | 60 | 60 | 60 | 60 |
| (c-2) (i) | dipropylene glycol diacrylate (DPGDA) | 30 to 70 | | | | | |
| (c-2) (ii) | tripropylene glycol diacrylate (TPGDA) | 30 to 70 | | | | | |
| (c-2) (iii) | dipentaerythritol polyacrylate | 30 to 70 | | | | | |
| (c-1) (ii) | acryloil morphorine (ACMO) | 30 to 70 | | | | | |
| (d) (i) | IRGACURE 819 | 0.1 to 15 | 5 | 5 | 5 | 5 | 5 |
| (d) (ii) | PERHEXA 25B | 0.1 to 15 | | | | | |
| | Total (parts by mass) | | 105 | 105 | 105 | 105 | 105 |
| | antifouling-property imparting material (BYK-UV3500) | | | | | | |
| | ST) | | | | | | |
| | scratch resistance enhancing material (NANOBYK-3602) | | | | | | |
| | shock resistance enhancing material (PARALOID BPM-500) | | | | | | |
| | IR absorbing material (IR-40K) | | | | | | |
| | UV absorbing material (TINUVIN326) | | | | | | |
| | IR reflecting material (TiO2 CR-90) | | | | | | |
| | electromagnetic shielding material (23-K S) | | | | | | |
| | antistatic material (CX-Z603M-F2) | | | | | | |
| | antistatic material (LQ-01) | | | | | | |
| | antistatic material (TMAC-100) | | | | | | |
| | flame retardant imparting material (P type flame retardant PX-200) | | | | | | |
| Evaluation result | viscosity mPa·s (25° C.) | | 1350 | 1350 | 1400 | 1350 | 1350 |
| | haze value % (glass coat) | | 1.2 | 0.9 | 1 | 1.2 | 1 |
| | total light transmittance % (glass coat) | | 85 | 86 | 86 | 85 | 86 |
| | pencil hardness (glass coat) | | HB | HB | HB | HB | HB |
| | taber abrasion (ΔH) % (PC coat) | | 8.1 | 6.6 | 7.1 | 8.1 | 7.1 |
| | weather resistance test (1000 hr) | | X | X | X | X | X |
| | weather resistance test (500 hr) | | ○ | ○ | ○ | ○ | ○ |
| | surface resistance test (Ω/sq.) | | $10^{15}$ | $10^{15}$ | $10^{15}$ | $10^{15}$ | $10^{15}$ |
| | IR transmittance (%) at 780 nm~2000 nm | | 80 to 85 | 80 to 85 | 80 to 85 | 80 to 85 | 80 to 85 |
| | UV transmittance (%) at 300~380 nm | | 50 to 55 | 50 to 55 | 50 to 55 | 50 to 55 | 50 to 55 |
| | visible light transmittance (%) at 380~780 nm | | 90 to 95 | 90 to 95 | 90 to 95 | 90 to 95 | 90 to 95 |
| | flame retardancy | | X | X | X | X | X |
| | skid resistance coefficient | | Δ | Δ | Δ | Δ | Δ |
| | adhesion test | | | | | | |
| | hard vinyl chloride resin | | 100 | 100 | 100 | 100 | 100 |
| | soft vinyl chloride resin | | 100 | 100 | 100 | 100 | 100 |
| | PS | | 100 | 100 | 100 | 100 | 100 |
| | PC | | 100 | 100 | 100 | 100 | 100 |
| | glass | | 100 | 100 | 100 | 100 | 100 |
| | aluminum | | 100 | 100 | 100 | 100 | 100 |
| | steel plate | | 100 | 100 | 100 | 100 | 100 |
| | concrete | | 100 | 100 | 100 | 100 | 100 |
| | wood | | 100 | 100 | 100 | 100 | 100 |
| | stone | | 100 | 100 | 100 | 100 | 100 |
| | artificial marble | | 100 | 100 | 100 | 100 | 100 |

TABLE 4-continued

| Component | Exam. 15 | Exam. 16 | Exam. 17 | Exam. 18 | Exam. 19 |
|---|---|---|---|---|---|
| PP | 100 | 60 | 90 | 90 | 60 |
| HDPE | 100 | 0 | 80 | 80 | 0 |
| MAH-PE | 100 | 100 | 100 | 100 | 100 |
| magnesium | 90 | 90 | 90 | 100 | 90 |
| ABS | 100 | 100 | 100 | 100 | 100 |
| PET | 100 | 100 | 100 | 100 | 100 |
| thermoplastic polyurethane elastomer | 100 | 100 | 100 | 100 | 100 |
| 2-part liquid polyurethane | 100 | 100 | 100 | 100 | 100 |
| 2-part liquid epoxy | 100 | 100 | 100 | 100 | 100 |
| PMMA | 100 | 100 | 100 | 100 | 100 |
| Water resistance test | | | | | |
| hard vinyl chloride resin | ◯ | ◯ | ◯ | ◯ | ◯ |
| soft vinyl chloride resin | ◯ | ◯ | ◯ | ◯ | ◯ |
| PS | ◯ | ◯ | ◯ | ◯ | ◯ |
| PC | ◯ | ◯ | ◯ | ◯ | ◯ |
| glass | Δ | Δ | Δ | Δ | Δ |
| aluminum | ◯ | ◯ | ◯ | ◯ | ◯ |
| steel plate | ◯ | ◯ | ◯ | ◯ | ◯ |
| concrete | ◯ | ◯ | ◯ | ◯ | ◯ |
| wood | ◯ | ◯ | ◯ | ◯ | ◯ |
| stone | ◯ | ◯ | ◯ | ◯ | ◯ |
| artificial marble | Δ | Δ | Δ | Δ | Δ |
| PP | ◯ | X | ◯ | ◯ | X |
| HDPE | ◯ | — | ◯ | ◯ | — |
| MAH-PE | ◯ | ◯ | ◯ | ◯ | ◯ |
| magnesium | ◯ | ◯ | ◯ | ◯ | ◯ |
| ABS | ◯ | ◯ | ◯ | ◯ | ◯ |
| PET | ◯ | ◯ | ◯ | ◯ | ◯ |
| thermoplastic polyurethane elastomer | ◯ | ◯ | ◯ | ◯ | ◯ |
| 2-part liquid polyurethane | ◯ | ◯ | ◯ | ◯ | ◯ |
| 2-part liquid epoxy | ◯ | ◯ | ◯ | ◯ | ◯ |
| PMMA | Δ | Δ | Δ | Δ | Δ |
| Shock resistance test | | | | | |
| hard vinyl chloride resin | ◯ | ◯ | ◯ | ◯ | ◯ |
| soft vinyl chloride resin | ◯ | ◯ | ◯ | ◯ | ◯ |
| PS | ◯ | ◯ | ◯ | ◯ | ◯ |
| PC | ◯ | ◯ | ◯ | ◯ | ◯ |
| glass | ◯ | ◯ | ◯ | ◯ | ◯ |
| aluminum | ◯ | ◯ | ◯ | ◯ | ◯ |
| steel plate | ◯ | ◯ | ◯ | ◯ | ◯ |
| concrete | ◯ | ◯ | ◯ | ◯ | ◯ |
| wood | ◯ | ◯ | ◯ | ◯ | ◯ |
| stone | ◯ | ◯ | ◯ | ◯ | ◯ |
| artificial marble | ◯ | ◯ | ◯ | ◯ | ◯ |
| PP | ◯ | X | ◯ | ◯ | X |
| HDPE | ◯ | — | ◯ | ◯ | — |
| MAH-PE | ◯ | ◯ | ◯ | ◯ | ◯ |
| magnesium | ◯ | ◯ | ◯ | ◯ | ◯ |
| ABS | ◯ | ◯ | ◯ | ◯ | ◯ |
| PET | ◯ | ◯ | ◯ | ◯ | ◯ |
| thermoplastic polyurethane elastomer | ◯ | ◯ | ◯ | ◯ | ◯ |
| 2-part liquid polyurethane | ◯ | ◯ | ◯ | ◯ | ◯ |
| 2-part liquid epoxy | ◯ | ◯ | ◯ | ◯ | ◯ |
| PMMA | ◯ | ◯ | ◯ | ◯ | ◯ |
| flexibility test | | | | | |
| hard vinyl chloride resin | ◯ | ◯ | ◯ | ◯ | ◯ |
| soft vinyl chloride resin | ◯ | ◯ | ◯ | ◯ | ◯ |
| PS | ◯ | ◯ | ◯ | ◯ | ◯ |
| PC | ◯ | ◯ | ◯ | ◯ | ◯ |
| glass | ◯ | ◯ | ◯ | ◯ | ◯ |
| aluminum | ◯ | ◯ | ◯ | ◯ | ◯ |
| steel plate | ◯ | ◯ | ◯ | ◯ | ◯ |
| concrete | ◯ | ◯ | ◯ | ◯ | ◯ |
| wood | ◯ | ◯ | ◯ | ◯ | ◯ |
| stone | ◯ | ◯ | ◯ | ◯ | ◯ |
| artificial marble | ◯ | ◯ | ◯ | ◯ | ◯ |
| PP | ◯ | X | ◯ | ◯ | X |
| HDPE | ◯ | — | ◯ | ◯ | — |
| MAH-PE | ◯ | ◯ | ◯ | ◯ | ◯ |
| magnesium | ◯ | ◯ | ◯ | ◯ | ◯ |
| ABS | ◯ | ◯ | ◯ | ◯ | ◯ |
| PET | ◯ | ◯ | ◯ | ◯ | ◯ |
| thermoplastic polyurethane elastomer | ◯ | ◯ | ◯ | ◯ | ◯ |
| 2-part liquid polyurethane | ◯ | ◯ | ◯ | ◯ | ◯ |

TABLE 4-continued

| Component | Exam. 15 | Exam. 16 | Exam. 17 | Exam. 18 | Exam. 19 |
|---|---|---|---|---|---|
| 2-part liquid epoxy | ○ | ○ | ○ | ○ | ○ |
| PMMA | ○ | ○ | ○ | ○ | ○ |
| test on adhesiveness relative to dissimilar materials (B1)-(A)-(B2) MPa | | | | | |
| hard PVC vs glass | 8 | 8.3 | 8.4 | 8.8 | 8.2 |
| soft PVC vs glass | 8 | 8.9 | 8.1 | 8.4 | 8.8 |
| PS vs aluminum | 8.4 | 8 | 8.7 | 8.1 | 8.9 |
| PC vs alminum | 8.6 | 8.1 | 8.7 | 8.3 | 8.2 |
| PS vs glass | 8.1 | 8.5 | 8.9 | 8.2 | 8.8 |
| PC vs glass | 8.6 | 8 | 8.1 | 9 | 9 |
| ABS vs glass | 8 | 8.8 | 8.5 | 9 | 8.4 |
| glass vs alminum | 8.9 | 8.9 | 8 | 8.2 | 8.1 |
| magnesium vs PC | 7.8 | 7.5 | 7.9 | 7.1 | 7.1 |
| steel plate vs PMMA | 8.5 | 8.8 | 8.9 | 8.6 | 8 |
| PET vs ABS | 8.8 | 8.7 | 8.8 | 8.2 | 8 |
| PMMA vs ABS | 8.5 | 8.7 | 8.4 | 8.6 | 8.4 |
| speaker durability evaluation | ○ | ○ | ○ | ○ | ○ |
| antirust effect | Δ | Δ | Δ | Δ | ○ |

TABLE 5

| | Component | | Exam. 20 | Exam. 21 | Exam. 22 | Exam. 23 | Exam. 24 | Exam. 25 |
|---|---|---|---|---|---|---|---|---|
| (a-1) (i) | CN975 urethane acrylate available from Sartomer Co. | 20 to 40 | | | | | | |
| (a-1) (ii) | CN292 polyester acrylate available from Sartomer Co. | 20 to 40 | | | | | | |
| (a-1) (iii) | CNUVE151 epoxy acrylate available from Sartomer Co. | 20 to 40 | 30 | 30 | 30 | 30 | 30 | |
| (a-1) (iv) | CN963B80 urethane acrylate available from Sartomer Co. | 20 to 40 | | | | | | |
| (a-2) | LIGOLAC21E-A-2 available from Showa Highpolymer Co. | 20 to 40 | | | | | | 30 |
| (b-1-2) | polybutadiene polyol Poly bd R-15HT | 50 | | | | | | |
| (b-1-1-1) | aromatic castor oil-based polyol URIC AC-006 | 50 | | | | | 10 | 10 |
| (b-1-3) | polyisoprene-based polyol Poly ip | 50 | | | | | | |
| (b-2-1) | castor oil-based polyol URIC H-1262 | 50 | | | | | | |
| (b-2-1) | castor oil-based polyol URIC H-2151U | 50 | | | | | | |
| (b-1-3) | hydroxy-terminated liquid polyolefin EpoI | 50 | | | | | | |
| (b-3-1) | maleated polyisoprene LIR-420 | 50 | | | | | | |
| (b-3-2) | Ricon130MA8 | 50 | | | | | | |
| (b-3-2) | maleic acid modified poly-butadiene POLYVEST OC 800 S | 0.1 to 50 | | | | | | |
| (b-1-4) | epoxy polyol EPICLON U-125-60BT | 50 | | | | | | |
| (b-4-1) | polyepoxy compound ADEKA RESIN EP-4100E | 50 | 10 | | | | | |
| (b-4-2) | L-207 | 50 | | 10 | | | | |
| (b-5-1) | 10) | 50 | | | 16.7 | | | |
| (b-5-2) | 10) | 50 | | | | 20 | | |
| (c-1) (i) | N-vinyl caprolactam | 30 to 70 | 60 | 60 | 60 | 60 | 60 | 60 |
| (c-2) (i) | dipropylene glycol diacrylate (DPGDA) | 30 to 70 | | | | | | |
| (c-2) (ii) | tripropylene glycol diacrylate (TPGDA) | 30 to 70 | | | | | | |
| (c-2) (iii) | dipentaerythritol polyacrylate | 30 to 70 | | | | | | |
| (c-1) (ii) | acryloil morphorine (ACMO) | 30 to 70 | | | | | | |
| (d) (i) | IRGACURE 819 | 0.1 to 15 | 5 | 5 | 5 | 5 | | 5 |
| (d) (ii) | PERHEXA 25B | 0.1 to 15 | | | | | 0.3 | |
| | Total (parts by mass) | | 105 | 105 | 111.7 | 115 | 100.3 | 105 |
| | antifouling-property imparting material (BYK-UV3500) ST) | | | | | | | |
| | scratch resistance enhancing material (NANOBYK-3602) | | | | | | | |
| | shock resistance enhancing material (PARALOID BPM-500) | | | | | | | |
| | IR absorbing material (IR-40K) | | | | | | | |
| | UV absorbing material (TINUVIN326) | | | | | | | |

TABLE 5-continued

| | Component | Exam. 20 | Exam. 21 | Exam. 22 | Exam. 23 | Exam. 24 | Exam. 25 |
|---|---|---|---|---|---|---|---|
| | IR reflecting material (TiO2 CR-90) | | | | | | |
| | electromagnetic shielding material (23-KS) | | | | | | |
| | antistatic material (CX-Z603M-F2) | | | | | | |
| | antistatic material (LQ-01) | | | | | | |
| | antistatic material (TMAC-100) | | | | | | |
| | flame retardant imparting material (P type flame retardant PX-200) | | | | | | |
| Evaluation result | viscosity mPa · s (25° C.) | 1300 | 1400 | 900 | 810 | 1250 | 1580 |
| | haze value % (glass coat) | 1 | 0.9 | 0.9 | 0.9 | 1.1 | 1.2 |
| | total light transmittance % (glass coat) | 86 | 86 | 86 | 86 | 86 | 84 |
| | pencil hardness (glass coat) | HB | HB | HB | HB | HB | HB |
| | taber abrasion (ΔH) % (PC coat) | 7.1 | 6.6 | 7.5 | 9.6 | 7.6 | 8.1 |
| | weather resistance test (1000 hr) | X | X | ○ | ○ | X | X |
| | weather resistance test (500 hr) | ○ | ○ | ○ | ○ | ○ | ○ |
| | surface resistance test (Ω/sq.) | $10^{15}$ | $10^{15}$ | $10^{15}$ | $10^{15}$ | $10^{15}$ | $10^{15}$ |
| | IR transmittance (%) at 780 nm~2000 nm | 80 to 85 | 80 to 85 | 80 to 85 | 80 to 85 | 80 to 85 | 80 to 85 |
| | UV transmittance (%) at 300~380 nm | 50 to 55 | 50 to 55 | 50 to 55 | 50 to 55 | 50 to 55 | 50 to 55 |
| | visible light transmittance (%) at 380~780 nm | 90 to 95 | 90 to 95 | 90 to 95 | 90 to 95 | 90 to 95 | 90 to 95 |
| | flame retardancy | X | X | X | X | X | X |
| | skid resistance coefficient | Δ | Δ | Δ | Δ | Δ | Δ |
| | adhesion test | | | | | | |
| | hard vinyl chloride resin | 100 | 100 | 100 | 100 | 100 | 100 |
| | soft vinyl chloride resin | 100 | 100 | 100 | 100 | 100 | 100 |
| | PS | 100 | 100 | 100 | 100 | 100 | 100 |
| | PC | 100 | 100 | 100 | 100 | 100 | 100 |
| | glass | 100 | 100 | 100 | 100 | 100 | 100 |
| | aluminum | 100 | 100 | 100 | 100 | 100 | 100 |
| | steel plate | 100 | 100 | 100 | 100 | 100 | 100 |
| | concrete | 100 | 100 | 100 | 100 | 100 | 100 |
| | wood | 100 | 100 | 100 | 100 | 100 | 100 |
| | stone | 100 | 100 | 100 | 100 | 100 | 100 |
| | artificial marble | 100 | 100 | 100 | 100 | 100 | 100 |
| | PP | 60 | 60 | 60 | 60 | 60 | 60 |
| | HDPE | 10 | 10 | 10 | 10 | 0 | 0 |
| | MAH-PE | 100 | 100 | 100 | 100 | 100 | 100 |
| | magnesium | 100 | 100 | 100 | 100 | 100 | 100 |
| | ABS | 100 | 100 | 100 | 100 | 100 | 100 |
| | PET | 100 | 100 | 100 | 100 | 100 | 100 |
| | thermoplastic polyurethane elastomer | 100 | 100 | 100 | 100 | 100 | 100 |
| | 2-part liquid polyurethane | 100 | 100 | 100 | 100 | 100 | 100 |
| | 2-part liquid epoxy | 100 | 100 | 100 | 100 | 100 | 100 |
| | PMMA | 100 | 100 | 100 | 100 | 100 | 100 |
| | Water resistance test | | | | | | |
| | hard vinyl chloride resin | ○ | ○ | ○ | ○ | ○ | ○ |
| | soft vinyl chloride resin | ○ | ○ | ○ | ○ | ○ | ○ |
| | PS | ○ | ○ | ○ | ○ | ○ | ○ |
| | PC | ○ | ○ | ○ | ○ | ○ | ○ |
| | glass | ○ | ○ | ○ | ○ | ○ | ○ |
| | aluminum | ○ | ○ | ○ | ○ | ○ | ○ |
| | steel plate | ○ | ○ | ○ | ○ | ○ | ○ |
| | concrete | ○ | ○ | ○ | ○ | ○ | ○ |
| | wood | ○ | ○ | ○ | ○ | ○ | ○ |
| | stone | ○ | ○ | ○ | ○ | ○ | ○ |
| | artificial marble | ○ | ○ | ○ | ○ | ○ | ○ |
| | PP | ○ | ○ | ○ | ○ | X | X |
| | HDPE | X | X | X | X | — | — |
| | MAH-PE | ○ | ○ | ○ | ○ | ○ | ○ |
| | magnesium | ○ | ○ | ○ | ○ | ○ | ○ |
| | ABS | ○ | ○ | ○ | ○ | ○ | ○ |
| | PET | ○ | ○ | ○ | ○ | ○ | ○ |
| | thermoplastic polyurethane elastomer | ○ | ○ | ○ | ○ | ○ | ○ |
| | 2-part liquid polyurethane | ○ | ○ | ○ | ○ | ○ | ○ |
| | 2-part liquid epoxy | ○ | ○ | ○ | ○ | ○ | ○ |
| | PMMA | ○ | ○ | ○ | ○ | ○ | ○ |
| | Shock resistance test | | | | | | |
| | hard vinyl chloride resin | ○ | ○ | ○ | ○ | ○ | ○ |
| | soft vinyl chloride resin | ○ | ○ | ○ | ○ | ○ | ○ |
| | PS | ○ | ○ | ○ | ○ | ○ | ○ |
| | PC | ○ | ○ | ○ | ○ | ○ | ○ |
| | glass | ○ | ○ | ○ | ○ | ○ | ○ |
| | aluminum | ○ | ○ | ○ | ○ | ○ | ○ |
| | steel plate | ○ | ○ | ○ | ○ | ○ | ○ |
| | concrete | ○ | ○ | ○ | ○ | ○ | ○ |

TABLE 5-continued

| Component | Exam. 20 | Exam. 21 | Exam. 22 | Exam. 23 | Exam. 24 | Exam. 25 |
|---|---|---|---|---|---|---|
| wood | ○ | ○ | ○ | ○ | ○ | ○ |
| stone | ○ | ○ | ○ | ○ | ○ | ○ |
| artificial marble | ○ | ○ | ○ | ○ | ○ | ○ |
| PP | ○ | ○ | ○ | ○ | X | X |
| HDPE | X | X | X | X | — | — |
| MAH-PE | ○ | ○ | ○ | ○ | ○ | ○ |
| magnesium | ○ | ○ | ○ | ○ | ○ | ○ |
| ABS | ○ | ○ | ○ | ○ | ○ | ○ |
| PET | ○ | ○ | ○ | ○ | ○ | ○ |
| thermoplastic polyurethane elastomer | ○ | ○ | ○ | ○ | ○ | ○ |
| 2-part liquid polyurethane | ○ | ○ | ○ | ○ | ○ | ○ |
| 2-part liquid epoxy | ○ | ○ | ○ | ○ | ○ | ○ |
| PMMA | ○ | ○ | ○ | ○ | ○ | ○ |
| flexibility test | | | | | | |
| hard vinyl chloride resin | ○ | ○ | ○ | ○ | ○ | ○ |
| soft vinyl chloride resin | ○ | ○ | ○ | ○ | ○ | ○ |
| PS | ○ | ○ | ○ | ○ | ○ | ○ |
| PC | ○ | ○ | ○ | ○ | ○ | ○ |
| glass | Δ | Δ | ○ | ○ | Δ | Δ |
| aluminum | ○ | ○ | ○ | ○ | ○ | ○ |
| steel plate | ○ | ○ | ○ | ○ | ○ | ○ |
| concrete | ○ | ○ | ○ | ○ | ○ | ○ |
| wood | ○ | ○ | ○ | ○ | ○ | ○ |
| stone | ○ | ○ | ○ | ○ | ○ | ○ |
| artificial marble | Δ | Δ | ○ | ○ | Δ | Δ |
| PP | ○ | ○ | ○ | ○ | X | X |
| HDPE | X | X | X | X | — | — |
| MAH-PE | ○ | ○ | ○ | ○ | ○ | ○ |
| magnesium | ○ | ○ | ○ | ○ | ○ | ○ |
| ABS | ○ | ○ | ○ | ○ | ○ | ○ |
| PET | ○ | ○ | ○ | ○ | ○ | ○ |
| thermoplastic polyurethane elastomer | ○ | ○ | ○ | ○ | ○ | ○ |
| 2-part liquid polyurethane | ○ | ○ | ○ | ○ | ○ | ○ |
| 2-part liquid epoxy | ○ | ○ | ○ | ○ | ○ | ○ |
| PMMA | Δ | Δ | ○ | ○ | Δ | Δ |
| test on adhesiveness relative to dissimilar materials (B1)-(A)-(B2) MPa | | | | | | |
| hard PVC vs glass | 8.3 | 9 | 8.7 | 8.7 | 8.2 | 8.8 |
| soft PVC vs glass | 8.8 | 9 | 8.3 | 8.3 | 8.7 | 8 |
| PS vs aluminum | 8.8 | 9 | 8.5 | 8.5 | 8.6 | 8.4 |
| PC vs alminum | 8.1 | 8.6 | 8.7 | 8.7 | 9 | 9 |
| PS vs glass | 8.5 | 8.6 | 8.1 | 8.1 | 8.8 | 8.9 |
| PC vs glass | 9 | 8.9 | 8.3 | 8.3 | 8.3 | 8 |
| ABS vs glass | 8.9 | 8.8 | 8.1 | 8.1 | 8.6 | 8.5 |
| glass vs alminum | 8.1 | 8.3 | 8.5 | 8.5 | 8.5 | 8.5 |
| magnesium vs PC | 7.9 | 7 | 7.6 | 7.6 | 7.5 | 7.8 |
| steel plate vs PMMA | 8.3 | 8.7 | 8.2 | 8.2 | 9 | 8.8 |
| PET vs ABS | 8.1 | 8.7 | 8.3 | 8.3 | 8 | 8.4 |
| PMMA vs ABS | 8.8 | 8.5 | 8.3 | 8.3 | 8.1 | 8 |
| speaker durability evaluation | ○ | ○ | ○ | ○ | ○ | ○ |
| antirust effect | ○ | ○ | ○ | ○ | ○ | ○ |

TABLE 6

| | Component | | Comp. Ex. 1 | Comp. Ex. 2 | Comp. Ex. 3 | Comp. Ex. 4 | Comp. Ex. 5 | Comp. Ex. 6 |
|---|---|---|---|---|---|---|---|---|
| (a-1) (i) | CN975 urethane acrylate available from Sartomer Co. | 20 to 40 | | | | | | |
| (a-1) (ii) | CN292 polyester acrylate available from Sartomer Co. | 20 to 40 | | | | | | |
| (a-1) (iii) | CNUVE151 epoxy acrylate available from Sartomer Co. | 20 to 40 | 15 | 45 | 65 | 20 | 35 | 25 |
| (a-1) (iv) | CN963B80 urethane acrylate available from Sartomer Co. | 20 to 40 | | | | | | |
| (a-2) | LIGOLAC21E-A-2 available from Showa Highpolymer Co. | 20 to 40 | | | | | | |
| (b-1-2) | polybutadiene polyol Poly bd R-15HT | 50 | | | | | | |
| (b-1-1-1) | aromatic castor oil-based polyol URIC AC-006 | 50 | 20 | 10 | 10 | 5 | | 55 |
| (b-1-3) | polyisoprene-based polyol Poly ip | 50 | | | | | | |
| (b-2-1) | castor oil-based polyol URIC H-1262 | 50 | | | | | | |

TABLE 6-continued

|  | Component |  | Comp. Ex. 1 | Comp. Ex. 2 | Comp. Ex. 3 | Comp. Ex. 4 | Comp. Ex. 5 | Comp. Ex. 6 |
|---|---|---|---|---|---|---|---|---|
| (b-2-1) | castor oil-based polyol URIC H-2151U | 50 | | | | | | |
| (b-1-3) | hydroxy-terminated liquid polyolefin Epol | 50 | | | | | | |
| (b-3-1) | maleated polyisoprene LIR-420 | 50 | | | | | | |
| (b-3-2) | Ricon130MA8 | 50 | | | | | | |
| (b-3-2) | POLYVEST OC 800 S | 50 | | | | | | |
| (b-1-4) | epoxy polyol EPICLON U-125-60BT | 50 | | | | | | |
| (b-4-1) | polyepoxy compound ADEKA RESIN EP-4100E | 50 | | | | | | |
| (b-4-2) | L-207 | 50 | | | | | | |
| (b-5-1) | Lumiflon LF-200 | 50 | | | | | | |
| (b-5-2) | Lumiflon LF-302 | 50 | | | | | | |
| (c-1) (i) | N-vinyl caprolactam | 30 to 70 | 65 | 45 | 25 | 75 | 65 | 40 |
| (c-2) (i) | dipropylene glycol diacrylate (DPGDA) | 30 to 70 | | | | | | |
| (c-2) (ii) | tripropylene glycol diacrylate (TPGDA) | 30 to 70 | | | | | | |
| (c-2) (iii) | dipentaerythritol polyacrylate | 30 to 70 | | | | | | |
| (c-1) (ii) | acryloil morphorine(ACMO) | 30 to 70 | | | | | | |
| (d) (i) | IRGACURE 819 | 0.1 to 15 | 5 | 5 | 5 | 5 | 5 | 5 |
| (d) (ii) | PERHEXA 25B | 0.1 to 15 | | | | | | |
| | Total (parts by mass) | | 105 | 105 | 105 | 105 | 105 | 125 |
| | UV3500) | | | | | | | |
| | ST) | | | | | | | |
| | scratch resistance enhancing material (NANOBYK-3602) | | | | | | | |
| | shock resistance enhancing material (PARALOID BPM-500) | | | | | | | |
| | IR absorbing material (IR-40K) | | | | | | | |
| | UV absorbing material (TINUVIN326) | | | | | | | |
| | IR reflecting material (TiO2 CR-90) | | | | | | | |
| | electromagnetic shielding material (23-K) S) | | | | | | | |
| | antistatic material (CX-Z603M-F2) | | | | | | | |
| | antistatic material (LQ-01) | | | | | | | |
| | antistatic material (TMAC-100) | | | | | | | |
| | flame retardant imparting material (P type flame retardant PX-200) | | | | | | | |
| Evaluation result | viscosity mPa · s (25° C.) | | 600 | 1500 | 600 | 1500 | 1050 | 1120 |
| | haze value % (glass coat) | | 1.1 | 0.8 | 1.1 | 0.8 | 0.8 | 1.1 |
| | total light transmittance % (glass coat) | | 86 | 87 | 86 | 87 | 87 | 80 |
| | pencil hardness (glass coat) | | HB | HB | HB | HB | HB | 2B |
| | taber abrasion (ΔH) % (PC coat) | | 17.8 | 9.3 | 17.8 | 9.3 | 9.2 | 7.6 |
| | weather resistance test (1000 hr) | | X | X | X | X | X | X |
| | weather resistance test (500 hr) | | ◯ | ◯ | ◯ | ◯ | ◯ | ◯ |
| | surface resistance test (Ω/sq.) | | $10^{15}$ | $10^{15}$ | $10^{15}$ | $10^{15}$ | $10^{15}$ | $10^{15}$ |
| | IR transmittance (%) at 780 nm~2000 nm | | 80 to 85 | 80 to 85 | 80 to 85 | 80 to 85 | 80 to 85 | 80 to 85 |
| | UV transmittance (%) at 300~380 nm | | 50 to 55 | 50 to 55 | 50 to 55 | 50 to 55 | 50 to 55 | 50 to 55 |
| | visible light transmittance (%) at 380~780 nm | | 90 to 95 | 90 to 95 | 90 to 95 | 90 to 95 | 90 to 95 | 90 to 95 |
| | flame retardancy | | X | X | X | X | X | X |
| | skid resistance coefficient | | Δ | X | X | X | X | ◯ |
| | adhesion test | | | | | | | |
| | hard vinyl chloride resin | | 56 | 56 | 56 | 56 | 56 | 56 |
| | soft vinyl chloride resin | | 56 | 56 | 56 | 56 | 56 | 56 |
| | PS | | 44 | 56 | 44 | 56 | 50 | 47 |
| | PC | | 56 | 56 | 56 | 56 | 56 | 56 |
| | glass | | 33 | 56 | 33 | 56 | 44 | 44 |
| | aluminum | | 43 | 45 | 43 | 45 | 42 | 40 |
| | steel plate | | 45 | 49 | 45 | 49 | 52 | 57 |
| | concrete | | 46 | 58 | 46 | 58 | 45 | 59 |
| | wood | | 66 | 71 | 66 | 71 | 66 | 65 |
| | stone | | 37 | 35 | 37 | 35 | 34 | 38 |
| | artificial marble | | 32 | 40 | 32 | 40 | 30 | 30 |
| | PP | | 0 | 0 | 0 | 0 | 0 | 0 |
| | HDPE | | 0 | 0 | 0 | 0 | 0 | 0 |
| | MAH-PE | | 75 | 65 | 75 | 65 | 70 | 73 |
| | magnesium | | 0 | 0 | 0 | 0 | 0 | 0 |
| | ABS | | 56 | 56 | 56 | 56 | 39 | 56 |
| | PET | | 56 | 56 | 56 | 56 | 56 | 56 |
| | thermoplastic polyurethane elastomer | | 65 | 70 | 65 | 70 | 70 | 73 |
| | 2-part liquid polyurethane | | 69 | 66 | 69 | 66 | 69 | 67 |
| | 2-part liquid epoxy | | 71 | 65 | 71 | 65 | 68 | 70 |
| | PMMA | | 39 | 56 | 39 | 56 | 33 | 50 |
| | Water resistance test | | | | | | | |
| | hard vinyl chloride resin | | X | Δ | X | Δ | Δ | X |
| | soft vinyl chloride resin | | X | Δ | X | Δ | Δ | X |
| | PS | | X | Δ | X | Δ | Δ | X |

TABLE 6-continued

| Component | Comp. Ex. 1 | Comp. Ex. 2 | Comp. Ex. 3 | Comp. Ex. 4 | Comp. Ex. 5 | Comp. Ex. 6 |
|---|---|---|---|---|---|---|
| PC | X | Δ | X | Δ | Δ | X |
| glass | X | Δ | X | Δ | Δ | X |
| aluminum | X | Δ | X | Δ | Δ | X |
| steel plate | X | Δ | X | Δ | Δ | X |
| concrete | X | Δ | X | Δ | Δ | X |
| wood | X | Δ | X | Δ | Δ | X |
| stone | X | Δ | X | Δ | Δ | X |
| artificial marble | X | Δ | X | Δ | Δ | X |
| PP | — | — | — | — | — | — |
| HDPE | — | — | — | — | — | — |
| MAH-PE | X | Δ | X | Δ | Δ | X |
| magnesium | — | — | — | — | — | — |
| ABS | X | Δ | X | Δ | Δ | X |
| PET | X | Δ | X | Δ | Δ | X |
| thermoplastic polyurethane elastomer | X | Δ | X | Δ | Δ | X |
| 2-part liquid polyurethane | X | Δ | X | Δ | Δ | X |
| 2-part liquid epoxy | X | Δ | X | Δ | Δ | X |
| PMMA | X | Δ | X | Δ | Δ | X |
| Shock resistance test | | | | | | |
| hard vinyl chloride resin | X | Δ | X | Δ | X | ○ |
| soft vinyl chloride resin | X | Δ | X | Δ | X | ○ |
| PS | X | Δ | X | Δ | X | ○ |
| PC | X | Δ | X | Δ | X | ○ |
| glass | X | Δ | X | Δ | X | ○ |
| aluminum | X | Δ | X | Δ | X | ○ |
| steel plate | X | Δ | X | Δ | X | ○ |
| concrete | X | Δ | X | Δ | X | ○ |
| wood | X | Δ | X | Δ | X | ○ |
| stone | X | Δ | X | Δ | X | ○ |
| artificial marble | X | Δ | X | Δ | X | ○ |
| PP | — | — | — | — | — | — |
| HDPE | — | — | — | — | — | — |
| MAH-PE | X | Δ | X | Δ | Δ | X |
| magnesium | — | — | — | — | — | — |
| ABS | X | Δ | X | Δ | X | ○ |
| PET | X | Δ | X | Δ | X | ○ |
| thermoplastic polyurethane elastomer | X | Δ | X | Δ | X | ○ |
| 2-part liquid polyurethane | X | Δ | X | Δ | X | ○ |
| 2-part liquid epoxy | X | Δ | X | Δ | X | ○ |
| PMMA | X | Δ | X | Δ | X | ○ |
| flexibility test | | | | | | |
| hard vinyl chloride resin | X | Δ | X | Δ | X | ○ |
| soft vinyl chloride resin | X | Δ | X | Δ | X | ○ |
| PS | X | Δ | X | Δ | X | ○ |
| PC | X | Δ | X | Δ | X | ○ |
| glass | X | X | X | X | X | ○ |
| aluminum | X | Δ | X | Δ | X | ○ |
| steel plate | X | Δ | X | Δ | X | ○ |
| concrete | X | Δ | X | Δ | X | ○ |
| wood | X | Δ | X | Δ | X | ○ |
| stone | X | Δ | X | Δ | X | ○ |
| artificial marble | X | X | X | X | X | ○ |
| PP | — | — | — | — | — | — |
| HDPE | — | — | — | — | — | — |
| MAH-PE | X | Δ | X | Δ | Δ | X |
| magnesium | — | — | — | — | — | — |
| ABS | X | Δ | X | Δ | X | ○ |
| PET | X | Δ | X | Δ | X | ○ |
| thermoplastic polyurethane elastomer | X | Δ | X | Δ | X | ○ |
| 2-part liquid polyurethane | X | Δ | X | Δ | X | ○ |
| 2-part liquid epoxy | X | Δ | X | Δ | X | ○ |
| PMMA | X | X | X | X | X | ○ |
| test on adhesiveness relative to dissimilar materials (B1)-(A)-(B2) MPa | | | | | | |
| hard PVC vs glass | 2.2 | 3.1 | 2.2 | 3.1 | 2.5 | 4.1 |
| soft PVC vs glass | 3 | 2.9 | 3 | 2.9 | 4.8 | 3.7 |
| PS vs aluminum | 2 | 2 | 2 | 2 | 3.6 | 2.4 |
| PC vs alminum | 3.2 | 4.1 | 3.2 | 4.1 | 4.6 | 3.3 |
| PS vs glass | 2.7 | 4 | 2.7 | 4 | 2.4 | 2.1 |
| PC vs glass | 3.9 | 3.8 | 3.9 | 3.8 | 5 | 4.3 |
| ABSvs glass | 4.9 | 4.6 | 4.9 | 4.6 | 3 | 3.3 |
| glass vs alminum | 2.2 | 3.4 | 2.2 | 3.4 | 2.9 | 2.5 |
| magnesium vs PC | 0 | 0 | 0 | 0 | 0 | 0 |

TABLE 6-continued

| Component | Comp. Ex. 1 | Comp. Ex. 2 | Comp. Ex. 3 | Comp. Ex. 4 | Comp. Ex. 5 | Comp. Ex. 6 |
| --- | --- | --- | --- | --- | --- | --- |
| steel plate vs PMMA | 5 | 2.7 | 5 | 2.7 | 2.6 | 2.4 |
| PET vs ABS | 2.6 | 2.8 | 2.6 | 2.8 | 2.2 | 3.2 |
| PMMA vs ABS | 2.9 | 2.6 | 2.9 | 2.6 | 4.7 | 4.6 |
| speaker durability evaluation | X | X | X | Δ | Δ | X |
| antirust effect | X | X | X | X | X | X |

TABLE 7

| | Component | | Comp. Ex. 7 | Comp. Ex. 8 |
| --- | --- | --- | --- | --- |
| | (a-1) (i) | CN975 urethane acrylate available from Sartomer Co. | 20 to 40 | |
| | (a-1) (ii) | CN292 polyester acrylate available fromSartomer Co. | 20 to 40 | |
| | (a-1) (iii) | CNUVE151 epoxy acrylate available from Sartomer Co. | 20 to 40 | 30 | 30 |
| | (a-1) (iv) | CN963B80 urethane acrylate available from Sartomer Co. | 20 to 40 | |
| | (a-2) | LIGOLAC21E-A-2 available from Showa Highpolymer Co. | 20 to 40 | |
| | (b-1-2) | polybutadiene polyol Poly bd R-15HT | 0.1 to 50 | |
| | (b-1-1-1) | aromatic castor oil-based polyol URIC AC-006 | 0.1 to 50 | 10 | 10 |
| | (b-1-3) | polyisoprene-based polyol Poly ip | 0.1 to 50 | |
| | (b-2-1) | castor oil-based polyol URIC H-1262 | 0.1 to 50 | |
| | (b-2-1) | castor oil-based polyol URIC H-2151U | 0.1 to 50 | |
| | (b-1-3) | hydroxy-terminated liquid polyolefin Epol | 0.1 to 50 | |
| | (b-3-1) | maleated polyisoprene LIR-420 | 0.1 to 50 | |
| | (b-3-2) | maleic acid modified poly-butadiene Ricon130MA8 | 0.1 to 50 | |
| | (b-3-2) | maleic acid modified poly-butadiene POLYVEST OC 800 S | 0.1 to 50 | |
| | (b-1-4) | epoxy polyol EPICLON U-125-60BT | 0.1 to 50 | |
| | (b-4-1) | polyepoxy compound ADEKA RESIN EP-4100E | 0.1 to 50 | |
| | (b-4-2) | L-207 | 0.1 to 50 | |
| | (b-5-1) | Lumiflon LF-200 | 0.1 to 50 | |
| | (b-5-2) | Lumiflon LF-302 | 0.1 to 50 | |
| | (c-1) (i) | N-vinyl caprolactam | 30 to 70 | 60 | 60 |
| | (c-2) (i) | dipropylene glycol diacrylate (DPGDA) | 30 to 70 | |
| | (c-2) (ii) | tripropylene glycol diacrylate (TPGDA) | 30 to 70 | |
| | (c-2) (iii) | dipentaerythritol polyacrylate | 30 to 70 | |
| | (c-1) (ii) | acryloil morphorine(ACMO) | 30 to 70 | |
| | (d) (i) | IRGACURE 819 | 0.1 to 15 | 0.05 | 20 |
| | (d) (ii) | PERHEXA 25B | 0.1 to 15 | |
| | | Total (parts by mass) | | 100.05 | 120 |
| | | antifouling-property imparting material (BYK-UV3500) | | | |
| | | scratch resistance enhancing material (MEK-ST) | | | |
| | | scratch resistance enhancing material (NANOBYK-3602) | | | |
| | | 500) | | | |
| | | IR absorbing material (IR-40K) | | | |
| | | UV absorbing material (TINUVIN326) | | | |
| | | IR reflecting material (TiO2 CR-90) | | | |
| | | electromagnetic shielding material (23-K) | | | |
| | | electroconductive expressing material (VGCF-S) | | | |
| | | antistatic material (CX-Z603M-F2) | | | |
| | | antistatic material (LQ-01) | | | |
| | | antistatic material (TMAC-100) | | | |
| | | flame retardant imparting material (P type flame retardant PX-200) | | | |
| Evaluation result | | viscosity mPa · s(25° C.) | | 1050 | 1050 |
| | | haze value % (glass coat) | | — | 0.8 |
| | | total light transmittance % (glass coat) | | — | 89 |
| | | pencil hardness (glass coat) | | — | HB |
| | | taber abrasion (ΔH) % (PC coat) | | — | 2.1 |
| | | weather resistance test (1000 hr) | | x | x |
| | | weather resistance test (500 hr) | | ○ | ○ |
| | | surface resistance test (Ω/sq.) | | $10^{15}$ | $10^{15}$ |
| | | IR transmittance(%) at 780 nm~2000 nm | | 80 to 85 | 80 to 85 |
| | | UV transmittance(%) at 300~380 nm | | 50 to 55 | 50 to 55 |
| | | visible light transmittance(%) at 380~780 nm | | 90 to 95 | 90 to 95 |
| | | flame retardancy | | x | x |
| | | skid resistance coefficient | | x | x |
| | | adhesion test | | uncured | |
| | | hard vinyl chloride resin | | — | 56 |
| | | soft vinyl chloride resin | | — | 56 |
| | | PS | | — | 50 |
| | | PC | | — | 56 |
| | | glass | | — | 47 |
| | | aluminum | | — | 37 |
| | | steel plate | | — | 55 |

TABLE 7-continued

| Component | Comp. Ex. 7 | Comp. Ex. 8 |
|---|---|---|
| concrete | — | 54 |
| wood | — | 75 |
| stone | — | 41 |
| artificial marble | — | 30 |
| PP | — | 0 |
| HDPE | — | 0 |
| MAH-PE | — | 66 |
| magnesium | — | 0 |
| ABS | — | 56 |
| PET | — | 56 |
| thermoplastic polyurethane elastomer | — | 74 |
| 2-part liquid polyurethane | — | 70 |
| 2-part liquid epoxy | — | 75 |
| PMMA | — | 47 |
| Water resistance test | | |
| hard vinyl chloride resin | — | x |
| soft vinyl chloride resin | — | x |
| PS | — | x |
| PC | — | x |
| glass | — | x |
| aluminum | — | x |
| steel plate | — | x |
| concrete | — | x |
| wood | — | x |
| stone | — | x |
| artificial marble | — | x |
| PP | — | x |
| HDPE | — | x |
| MAH-PE | — | x |
| magnesium | — | x |
| ABS | — | x |
| PET | — | x |
| thermoplastic polyurethane elastomer | — | x |
| 2-part liquid polyurethane | — | x |
| 2-part liquid epoxy | — | x |
| PMMA | — | x |
| Shock resistance test | | |
| hard vinyl chloride resin | — | x |
| soft vinyl chloride resin | — | x |
| PS | — | x |
| PC | — | x |
| glass | — | x |
| aluminum | — | x |
| steel plate | — | x |
| concrete | — | x |
| wood | — | x |
| stone | — | x |
| artificial marble | — | x |
| PP | — | x |
| HDPE | — | x |
| MAH-PE | — | x |
| magnesium | — | x |
| ABS | — | x |
| PET | — | x |
| thermoplastic polyurethane elastomer | — | x |
| 2-part liquid polyurethane | — | x |
| 2-part liquid epoxy | — | x |
| PMMA | — | x |
| flexibility test | | |
| hard vinyl chloride resin | — | x |
| soft vinyl chloride resin | — | x |
| PS | — | x |
| PC | — | x |
| glass | — | x |
| aluminum | — | x |
| steel plate | — | x |
| concrete | — | x |
| wood | — | x |
| stone | — | x |
| artificial marble | — | x |
| PP | — | x |
| HDPE | — | x |
| MAH-PE | — | x |
| magnesium | — | x |
| ABS | — | x |
| PET | — | x |
| thermoplastic polyurethane elastomer | — | x |

TABLE 7-continued

| Component | Comp. Ex. 7 | Comp. Ex. 8 |
|---|---|---|
| 2-part liquid polyurethane | — | x |
| 2-part liquid epoxy | — | x |
| PMMA | — | x |
| test on adhesiveness relative to dissimilar materials (B1)-(A)-(B2) MPa | | |
| hard PVC vs glass | — | 4.9 |
| soft PVC vs glass | — | 4.1 |
| PS vs aluminum | — | 2.5 |
| PC vs alminum | — | 3 |
| PS vs glass | — | 3.8 |
| PC vs glass | — | 2.2 |
| ABSvs glass | — | 2.3 |
| glass vs alminum | — | 3.8 |
| magnesium vs PC | — | 0 |
| steel plate vs PMMA | — | 3.2 |
| PET vs ABS | — | 4.1 |
| PMMA vs ABS | — | 4.7 |
| speaker durability evaluation | — | x |
| antirust effect | — | x |

TABLE 8

| Component | | | Exam 26 | Exam 27 | Exam 28 | Exam 29 | Exam 30 | Exam 31 | Exam 32 | Exam 33 | Exam 34 | Exam 35 | Exam 36 | Exam 37 | Exam 38 |
|---|---|---|---|---|---|---|---|---|---|---|---|---|---|---|---|
| (a-1) (i) | CN975 urethane acrylate available from Sartomer Co. | 20 to 40 | 30 | 30 | 30 | 30 | 30 | 30 | 30 | 30 | 30 | 30 | 30 | 30 | 30 |
| (a-1) (ii) | CN292 polyester acrylate available from Sartomer Co. | 20 to 40 | | | | | | | | | | | | | |
| (a-1) (iii) | CNUVE151 epoxy acrylate available from Sartomer Co. | 20 to 40 | | | | | | | | | | | | | |
| (a-1) (iv) | CN963B80 urethane acrylate available from Sartomer Co. | 20 to 40 | | | | | | | | | | | | | |
| (a-2) | LIGOLAC21E-A-2 available from Showa Highpolymer Co. | 20 to 40 | | | | | | | | | | | | | |
| (b-1-2) | polybutadiene polyol Poly bd R-15HT | 0.1 to 50 | | | | | | | | | | | | | |
| (b-1-1-1) | aromatic castor oil-based polyol URIC AC-006 | 0.1 to 50 | 10 | 10 | 10 | 10 | 10 | 10 | 10 | 10 | 10 | 10 | 10 | 10 | 10 |
| (b-1-3) | polyisoprene-based polyol Poly ip | 0.1 to 50 | | | | | | | | | | | | | |
| (b-2-1) | castor oil-based polyol URIC H-1262 | 0.1 to 50 | | | | | | | | | | | | | |
| (b-2-1) | castor oil-based polyol URIC H-2151U | 0.1 to 50 | | | | | | | | | | | | | |
| (b-1-3) | hydroxy-terminated liquid polyolefin Epol 420 | 50 | | | | | | | | | | | | | |
| (b-3-1) | maleic acid modified poly-butadiene Ricon130MA8 | 0.1 to 50 | | | | | | | | | | | | | |
| (b-3-2) | maleic acid modified poly-butadiene POLYVEST OC 800 S | 0.1 to 50 | | | | | | | | | | | | | |
| (b-1-4) | epoxy polyol EPICLON U-125-60BT | 0.1 to 50 | | | | | | | | | | | | | |
| (b-4-1) | polyepoxy compound ADEKA RESIN EP-4100E | 0.1 to 50 | | | | | | | | | | | | | |
| (b-4-2) | L-207 | 50 | | | | | | | | | | | | | |
| (b-5-1) | Lumiflon LF-200 | 50 | | | | | | | | | | | | | |
| (b-5-2) | Lumiflon LF-302 | 50 | | | | | | | | | | | | | |
| (c-1) (i) | N-vinyl caprolactam | 70 | 60 | 60 | 60 | 60 | 60 | 60 | 60 | 60 | 60 | 60 | 60 | 60 | 60 |
| (c-2) (i) | dipropylene glycol diacrylate (DPGDA) | 30 to 70 | | | | | | | | | | | | | |
| (c-2) (ii) | tripropylene glycol diacrylate (TPGDA) | 30 to 70 | | | | | | | | | | | | | |
| (c-2) (iii) | dipentaerythritol polyacrylate | 70 | | | | | | | | | | | | | |
| (c-1) (ii) | acryloil morphorine (ACMO) | 70 | | | | | | | | | | | | | |

TABLE 8-continued

| Component | | | Exam 26 | Exam 27 | Exam 28 | Exam 29 | Exam 30 | Exam 31 | Exam 32 | Exam 33 | Exam 34 | Exam 35 | Exam 36 | Exam 37 | Exam 38 |
|---|---|---|---|---|---|---|---|---|---|---|---|---|---|---|---|
| (d) (i) | IRGACURE 819 | 0.1 to 15 | 5 | 5 | 5 | 5 | 5 | 5 | 5 | 5 | 5 | 5 | 5 | 5 | 5 |
| (d) (ii) | PERHEXA 25B | 0.1 to 15 | | | | | | | | | | | | | |
| | Total (parts by mass) | | 105 | 105 | 105 | 105 | 105 | 105 | 105 | 105 | 105 | 105 | 105 | 105 | 105 |
| | antifouling-property imparting material (BYK-) | | 1 | | | | | | | | | | | | |
| | scratch resistance enhancing material (MEK-ST) | | | 30 | | | | | | | | | | | |
| | scratch resistance enhancing material (NANOBYK-3602) | | | | 10 | | | | | | | | | | |
| | shock resistance enhancing material (PARALOID BPM-500) | | | | | 5 | | | | | | | | | |
| | UV absorbing material (TINUVIN326) | | | | | | 15 | | | | | | | | |
| | IR reflecting material (TiO2 CR-90) | | | | | | | 5 | | | | | | | |
| | electromagnetic shielding material (23-K) | | | | | | | | 15 | | | | | | |
| | electroconductive expressing material (VGCF-S) | | | | | | | | | 60 | | | | | |
| | antistatic material (CX-Z603M-F2) | | | | | | | | | | 5 | | | | |
| | antistatic material (LQ-01) | | | | | | | | | | | 100 | | | |
| | antistatic material (TMAC-100) | | | | | | | | | | | | 5 | | |
| | flame retardant impartingmaterial (P type flame retardant PX-200) | | | | | | | | | | | | | 5 | |
| | flame retardant PX-200 | | | | | | | | | | | | | | 100 |
| Evaluation result | viscosity mPa·s (25° C.) | | 950 | 350 | 580 | 1250 | 400 | 1050 | 2800 | 4500 | 2300 | 520 | 1100 | 1200 | 5300 |
| | haze value % (glass coat) | | 1.3 | 1.3 | 1.3 | 1.5 | 1.6 | 1.3 | 48 | 28 | 55 | 1.5 | 1.3 | 2.1 | 1.3 |
| | total light transmittance % (glass coat) | | 86 | 86 | 86 | 83 | 83 | 86 | 28 | 55 | 25 | 86 | 86 | 83 | 63 |
| | pencil hardness (glass coat) | | HB | 2H | H | HB | H | HB | HB | H | HB | HB | HB | HB | F |
| | taber abrasion (ΔH) % (PC coat) | | 8.6 | 3.2 | 5.1 | 8.5 | 8.7 | 9.1 | 21 | 25 | 13.5 | 9.1 | 9.5 | 10.2 | 24.5 |
| | weather resistance test (1000 hr) | | X | X | X | ○ | X | ○ | ○ | ○ | ○ | X | X | X | X |
| | weather resistance test (500 hr) | | ○ | ○ | ○ | ○ | ○ | ○ | ○ | ○ | ○ | ○ | ○ | ○ | ○ |
| | surface resistance test (Ω/sq.) | | $10^{15}$ | $10^{15}$ | $10^{15}$ | $10^{15}$ | $10^{15}$ | $10^{15}$ | $10^{15}$ | $10^{8}$ | $10^{2}$ | $10^{8}$ | $10^{8}$ | $10^{11}$ | $10^{13}$ |
| | IR transmittance (%) at 780 nm–2000 nm | | 80 to 85 | 80 to 85 | 80 to 85 | 80 to 85 | 30 to 35 | 80 to 85 | <5 | 15 to 20 | 10 to 15 | 10 to 15 | 10 to 15 | 10 to 15 | <5 |
| | UV transmittance (%) at 300–380 nm | | 50 to 55 | 50 to 55 | 50 to 55 | 50 to 55 | <1 | 50 to 55 | <1 | <1 | <1 | <1 | 50 to 55 | 50 to 55 | <1 |
| | visible light transmittance (%) at 380–780 nm | | 90 to 95 | 90 to 95 | 90 to 95 | 90 to 95 | 80 to 85 | 90 to 95 | 30 to 35 | 20 to 25 | 25 to 30 | 30 to 35 | 30 to 35 | 30 to 35 | 20 to 25 |

TABLE 8-continued

| Component | | Exam 26 | Exam 27 | Exam 28 | Exam 29 | Exam 30 | Exam 31 | Exam 32 | Exam 33 | Exam 34 | Exam 35 | Exam 36 | Exam 37 | Exam 38 |
|---|---|---|---|---|---|---|---|---|---|---|---|---|---|---|
| | flame retardancy | X | X | X | X | X | X | X | △ | X | X | X | X | ○ |
| | skid resistance coefficient | X | X | X | ○ | △ | △ | △ | X | △ | △ | △ | △ | △ |
| adhesion test | hard vinyl chloride resin | 100 | 100 | 100 | 100 | 100 | 100 | 100 | 100 | 100 | 100 | 100 | 100 | 100 |
| | soft vinyl chloride resin | 100 | 100 | 100 | 100 | 100 | 100 | 100 | 100 | 100 | 100 | 100 | 100 | 100 |
| | PS | 100 | 100 | 100 | 100 | 100 | 100 | 100 | 100 | 100 | 100 | 100 | 100 | 100 |
| | PC | 100 | 100 | 100 | 100 | 100 | 100 | 100 | 100 | 100 | 100 | 100 | 100 | 100 |
| | glass | 100 | 100 | 100 | 100 | 100 | 100 | 100 | 100 | 100 | 100 | 100 | 100 | 100 |
| | aluminum | 100 | 100 | 100 | 100 | 100 | 100 | 100 | 100 | 100 | 100 | 100 | 100 | 100 |
| | steel plate | 100 | 100 | 100 | 100 | 100 | 100 | 100 | 100 | 100 | 100 | 100 | 100 | 100 |
| | concrete | 100 | 100 | 100 | 100 | 100 | 100 | 100 | 100 | 100 | 100 | 100 | 100 | 100 |
| | wood | 100 | 100 | 100 | 100 | 100 | 100 | 100 | 100 | 100 | 100 | 100 | 100 | 100 |
| | stone | 100 | 100 | 100 | 100 | 100 | 100 | 100 | 100 | 100 | 100 | 100 | 100 | 100 |
| | artificial marble | 100 | 100 | 100 | 100 | 100 | 100 | 100 | 100 | 100 | 100 | 100 | 100 | 100 |
| | PP | 0 | 0 | 0 | 0 | 0 | 0 | 0 | 0 | 0 | 0 | 0 | 0 | 0 |
| | HDPE | 0 | 0 | 0 | 0 | 0 | 0 | 0 | 0 | 0 | 0 | 0 | 0 | 0 |
| | MAH-PE | 100 | 100 | 100 | 100 | 100 | 100 | 100 | 100 | 100 | 100 | 100 | 100 | 100 |
| | magnesium | 80 | 85 | 85 | 90 | 85 | 85 | 85 | 85 | 85 | 85 | 85 | 85 | 85 |
| | ABS | 100 | 100 | 100 | 100 | 100 | 100 | 100 | 100 | 100 | 100 | 100 | 100 | 100 |
| | PET | 100 | 100 | 100 | 100 | 100 | 100 | 100 | 100 | 100 | 100 | 100 | 100 | 100 |
| | thermoplastic polyurethane elastomer | 100 | 100 | 100 | 100 | 100 | 100 | 100 | 100 | 100 | 100 | 100 | 100 | 100 |
| | 2-part liquid polyurethane | 100 | 100 | 100 | 100 | 100 | 100 | 100 | 100 | 100 | 100 | 100 | 100 | 100 |
| | 2-part liquid epoxy | 100 | 100 | 100 | 100 | 100 | 100 | 100 | 100 | 100 | 100 | 100 | 100 | 100 |
| | PMMA | 100 | 100 | 100 | 100 | 100 | 100 | 100 | 100 | 100 | 100 | 100 | 100 | 100 |
| Water resistance test | hard vinyl chloride resin | ○ | ○ | ○ | ○ | ○ | ○ | ○ | ○ | ○ | ○ | ○ | ○ | ○ |
| | soft vinyl chloride resin | ○ | ○ | ○ | ○ | ○ | ○ | ○ | ○ | ○ | ○ | ○ | ○ | ○ |
| | PS | ○ | ○ | ○ | ○ | ○ | ○ | ○ | ○ | ○ | ○ | ○ | ○ | ○ |
| | PC | ○ | ○ | ○ | ○ | ○ | ○ | ○ | ○ | ○ | ○ | ○ | ○ | ○ |
| | glass | ○ | ○ | ○ | ○ | ○ | ○ | ○ | ○ | ○ | ○ | ○ | ○ | ○ |
| | aluminum | ○ | ○ | ○ | ○ | ○ | ○ | ○ | ○ | ○ | ○ | ○ | ○ | ○ |
| | steel plate | ○ | ○ | ○ | ○ | ○ | ○ | ○ | ○ | ○ | ○ | ○ | ○ | ○ |
| | concrete | ○ | ○ | ○ | ○ | ○ | ○ | ○ | ○ | ○ | ○ | ○ | ○ | ○ |
| | wood | ○ | ○ | ○ | ○ | ○ | ○ | ○ | ○ | ○ | ○ | ○ | ○ | ○ |
| | stone | ○ | ○ | ○ | ○ | ○ | ○ | ○ | ○ | ○ | ○ | ○ | ○ | ○ |
| | artificial marble | ○ | ○ | ○ | ○ | ○ | ○ | ○ | ○ | ○ | ○ | ○ | ○ | ○ |
| | PP | — | — | — | — | — | — | — | — | — | — | — | — | — |
| | HDPE | — | — | — | — | — | — | — | — | — | — | — | — | — |
| | MAH-PE | ○ | ○ | ○ | ○ | ○ | ○ | ○ | ○ | ○ | ○ | ○ | ○ | ○ |
| | magnesium | ○ | ○ | ○ | ○ | ○ | ○ | ○ | ○ | ○ | ○ | ○ | ○ | ○ |
| | ABS | ○ | ○ | ○ | ○ | ○ | ○ | ○ | ○ | ○ | ○ | ○ | ○ | ○ |
| | PET | ○ | ○ | ○ | ○ | ○ | ○ | ○ | ○ | ○ | ○ | ○ | ○ | ○ |
| | thermoplastic polyurethane elastomer | ○ | ○ | ○ | ○ | ○ | ○ | ○ | ○ | ○ | ○ | ○ | ○ | ○ |
| | 2-part liquid polyurethane | ○ | ○ | ○ | ○ | ○ | ○ | ○ | ○ | ○ | ○ | ○ | ○ | ○ |
| | 2-part liquid epoxy | ○ | ○ | ○ | ○ | ○ | ○ | ○ | ○ | ○ | ○ | ○ | ○ | ○ |
| | PMMA | ○ | ○ | ○ | ○ | ○ | ○ | ○ | ○ | ○ | ○ | ○ | ○ | ○ |

TABLE 8-continued

| Component | | Exam 26 | Exam 27 | Exam 28 | Exam 29 | Exam 30 | Exam 31 | Exam 32 | Exam 33 | Exam 34 | Exam 35 | Exam 36 | Exam 37 | Exam 38 |
|---|---|---|---|---|---|---|---|---|---|---|---|---|---|---|
| Shock resistance test | | | | | | | | | | | | | | |
| | hard vinyl chloride resin | ○ | ○ | ○ | ○ | ○ | ○ | ○ | ○ | ○ | ○ | ○ | ○ | ○ |
| | soft vinyl chloride resin | ○ | ○ | ○ | ○ | ○ | ○ | ○ | ○ | ○ | ○ | ○ | ○ | ○ |
| | PS | ○ | ○ | ○ | ○ | ○ | ○ | ○ | ○ | ○ | ○ | ○ | ○ | ○ |
| | PC | ○ | ○ | ○ | ○ | ○ | ○ | ○ | ○ | ○ | ○ | ○ | ○ | ○ |
| | glass | ○ | ○ | ○ | ○ | ○ | ○ | ○ | ○ | ○ | ○ | ○ | ○ | ○ |
| | aluminum | ○ | ○ | ○ | ○ | ○ | ○ | ○ | ○ | ○ | ○ | ○ | ○ | ○ |
| | steel plate | ○ | ○ | ○ | ○ | ○ | ○ | ○ | ○ | ○ | ○ | ○ | ○ | ○ |
| | concrete | ○ | ○ | ○ | ○ | ○ | ○ | ○ | ○ | ○ | ○ | ○ | ○ | ○ |
| | wood | ○ | ○ | ○ | ○ | ○ | ○ | ○ | ○ | ○ | ○ | ○ | ○ | ○ |
| | stone | ○ | ○ | ○ | ○ | ○ | ○ | ○ | ○ | ○ | ○ | ○ | ○ | ○ |
| | artificial marble | — | — | — | — | — | — | — | — | — | — | — | — | — |
| | PP | — | — | — | — | — | — | — | — | — | — | — | — | — |
| | HDPE | ○ | ○ | ○ | ○ | ○ | ○ | ○ | ○ | ○ | ○ | ○ | ○ | ○ |
| | MAH-PE | ○ | ○ | ○ | ○ | ○ | ○ | ○ | ○ | ○ | ○ | ○ | ○ | ○ |
| | magnesium | ○ | ○ | ○ | ○ | ○ | ○ | ○ | ○ | ○ | ○ | ○ | ○ | ○ |
| | ABS | ○ | ○ | ○ | ○ | ○ | ○ | ○ | ○ | ○ | ○ | ○ | ○ | ○ |
| | PET | ○ | ○ | ○ | ○ | ○ | ○ | ○ | ○ | ○ | ○ | ○ | ○ | ○ |
| | thermoplastic polyurethane | ○ | ○ | ○ | ○ | ○ | ○ | ○ | ○ | ○ | ○ | ○ | ○ | ○ |
| | elastomer | ○ | ○ | ○ | ○ | ○ | ○ | ○ | ○ | ○ | ○ | ○ | ○ | ○ |
| | 2-part liquid polyurethane | ○ | ○ | ○ | ○ | ○ | ○ | ○ | ○ | ○ | ○ | ○ | ○ | ○ |
| | 2-part liquid epoxy | ○ | ○ | ○ | ○ | ○ | ○ | ○ | ○ | ○ | ○ | ○ | ○ | ○ |
| | PMMA | ○ | ○ | ○ | ○ | ○ | ○ | ○ | ○ | ○ | ○ | ○ | ○ | ○ |
| flexibility test | | | | | | | | | | | | | | |
| | hard vinyl chloride resin | ○ | ○ | ○ | ○ | ○ | ○ | ○ | ○ | ○ | ○ | ○ | ○ | ○ |
| | soft vinyl chloride resin | ○ | ○ | ○ | ○ | ○ | ○ | ○ | ○ | ○ | ○ | ○ | ○ | ○ |
| | PS | ○ | ○ | ○ | ○ | ○ | ○ | ○ | ○ | ○ | ○ | ○ | ○ | ○ |
| | PC | ○ | ○ | ○ | ○ | ○ | ○ | ○ | ○ | ○ | ○ | ○ | ○ | ○ |
| | glass | △ | △ | △ | △ | △ | △ | △ | △ | △ | △ | △ | △ | △ |
| | aluminum | ○ | ○ | ○ | ○ | ○ | ○ | ○ | ○ | ○ | ○ | ○ | ○ | ○ |
| | steel plate | ○ | ○ | ○ | ○ | ○ | ○ | ○ | ○ | ○ | ○ | ○ | ○ | ○ |
| | concrete | ○ | ○ | ○ | ○ | ○ | ○ | ○ | ○ | ○ | ○ | ○ | ○ | ○ |
| | wood | ○ | ○ | ○ | ○ | ○ | ○ | ○ | ○ | ○ | ○ | ○ | ○ | ○ |
| | stone | ○ | ○ | ○ | ○ | ○ | ○ | ○ | ○ | ○ | ○ | ○ | ○ | ○ |
| | artificial marble | △ | △ | △ | △ | △ | △ | △ | △ | △ | △ | △ | △ | △ |
| | PP | — | — | — | — | — | — | — | — | — | — | — | — | — |
| | HDPE | — | — | — | — | — | — | — | — | — | — | — | — | — |
| | MAH-PE | ○ | ○ | ○ | ○ | ○ | ○ | ○ | ○ | ○ | ○ | ○ | ○ | ○ |
| | magnesium | ○ | ○ | ○ | ○ | ○ | ○ | ○ | ○ | ○ | ○ | ○ | ○ | ○ |
| | ABS | ○ | ○ | ○ | ○ | ○ | ○ | ○ | ○ | ○ | ○ | ○ | ○ | ○ |
| | PET | ○ | ○ | ○ | ○ | ○ | ○ | ○ | ○ | ○ | ○ | ○ | ○ | ○ |
| | elastomer | ○ | ○ | ○ | ○ | ○ | ○ | ○ | ○ | ○ | ○ | ○ | ○ | ○ |
| | 2-part liquid polyurethane | ○ | ○ | ○ | ○ | ○ | ○ | ○ | ○ | ○ | ○ | ○ | ○ | ○ |

TABLE 8-continued

| Component | | Exam 26 | Exam 27 | Exam 28 | Exam 29 | Exam 30 | Exam 31 | Exam 32 | Exam 33 | Exam 34 | Exam 35 | Exam 36 | Exam 37 | Exam 38 |
|---|---|---|---|---|---|---|---|---|---|---|---|---|---|---|
| 2-part liquid epoxy | | ○ | ○ | ○ | ○ | ○ | ○ | ○ | ○ | ○ | ○ | ○ | ○ | ○ |
| PMMA | | △ | △ | △ | △ | △ | △ | △ | △ | △ | △ | △ | △ | △ |
| test on adhesiveness relative to dissimilar materials (B1)+(A)+(B2) MPa | | | | | | | | | | | | | | |
| | hard PVC vs glass | 7.9 | 8 | 7.6 | 7.9 | 7.3 | 7.8 | 7.4 | 8 | 7 | 7.4 | 7.4 | 7.5 | 7.8 |
| | soft PVC vs glass | 8.9 | 8.7 | 8.4 | 8.4 | 8.9 | 8 | 8.7 | 8.3 | 8.2 | 8.9 | 8.3 | 7.7 | 9 |
| | PS vs aluminum | 8.3 | 8 | 8.9 | 8.9 | 8.2 | 8.6 | 8.9 | 8.7 | 8.9 | 8 | 8.4 | 9.3 | 8.2 |
| | PC vs aluminum | 8.9 | 8.5 | 8.4 | 8.9 | 8.8 | 8 | 8.2 | 8.6 | 8.9 | 9 | 8.8 | 8.4 | 8.2 |
| | PS vs glass | 8.3 | 8.3 | 8.4 | 8.4 | 8.1 | 8.9 | 9 | 8.7 | 8.4 | 8.6 | 8 | 8.9 | 8.2 |
| | PC vs glass | 8.6 | 8.2 | 8.2 | 8 | 9 | 8.6 | 8.3 | 8.9 | 9 | 8.8 | 8.9 | 8.3 | 9 |
| | ABS vs glass | 8.4 | 8.3 | 8.5 | 8.7 | 8.8 | 8.3 | 8 | 8.8 | 8.1 | 8.2 | 9 | 8.3 | 8.8 |
| | glass vs aluminum | 8.6 | 8.4 | 8 | 8.3 | 8.6 | 8.2 | 8 | 8.7 | 8.5 | 8.8 | 8 | 8.4 | 8.5 |
| | magnesium vs PC | 7.6 | 7.6 | 6.7 | 7 | 7.9 | 7.2 | 7.8 | 7.7 | 7.7 | 7.5 | 7.4 | 7.3 | 7.4 |
| | steel plate vs PMMA | 8 | 8.6 | 8.7 | 8.8 | 8 | 8.2 | 8.6 | 8.3 | 8.9 | 8.9 | 9 | 9.6 | 8.7 |
| | PET vs ABS | 9 | 8.5 | 8.2 | 8 | 9 | 8.3 | 8 | 8.8 | 8.6 | 8 | 8.3 | 8.2 | 8.1 |
| | PMMA vs ABS | 8.3 | 8.1 | 8 | 8.6 | 8.2 | 8.7 | 8.6 | 8.8 | 8.6 | 8.3 | 8.7 | 8.8 | 8.3 |
| speaker durability evaluation | | ○ | ○ | ○ | ○ | ○ | ○ | △ | △ | ○ | ○ | ○ | ○ | △ |
| antirust effect | | ○ | ○ | ○ | ○ | ○ | ○ | ○ | ○ | ○ | ○ | ○ | ○ | ○ |

As apparent from the Tables, in Examples 1 through 38 where an adhesive composition according to the present invention was employed, the adhesive compositions used there showed an excellent adhesiveness to polar resin, ceramic, metal and so on because it contained the components (a), (b), (c) and (d) with a specific quantitative relationship.

On the other hand, in Comparative Examples 1 through 4 and 6 through 8, the adhesive compositions used there could not provide the advantages of the present invention because they did not satisfy the requirement of the range of compounding ratio specified according to the present invention. Additionally, the adhesive composition used in Comparative Example 5 also could not provide the advantages of the present invention because it did not contain the component (b).

INDUSTRIAL APPLICABILITY

A paint and an adhesive composition according to the present invention provide excellent adhesiveness to soft or hard vinyl chloride resins; polystyrenes; polycarbonates; glass; aluminum; steel plate; concrete; wood panel; stone; artificial marble; polyolefin resin or copolymers of polyolefin resin modified by a polar group-containing compound or olefin and a polar group-containing compound; magnesium; acrylonitrile-butadiene-styrene copolymers; polyester-based resins (e.g., polyethylene terephthalate PET); polyurethane-based resins; epoxy-based resins; or acryl-based resins (e.g., polymethyl methacrylate PMMA) and also furnish them with transparency, surface smoothness, flexibility and shock resistance in a well-balanced manner. Therefore, they are suitable for forming a transparent primer layer on the surface of any of the above-listed specific adherends and bonding any two of the specific adherends (particularly between dissimilar materials). Additionally, they are useful in the various fields of building materials, packaging materials, printing materials, display materials, electric and electronic part materials, optical part materials, liquid crystal panels and so on. Furthermore, since a paint and an adhesive composition according to the present invention excellently shows adhesiveness, hardness, water resistance, abrasion resistance, transparency, surface smoothness, flexibility, shock resistance and an antifouling property, they can advantageously furnish electroacoustic transducers such as loudspeakers, receivers and microphones with durability and steel frame building and steel frame bridges with antirust effect and durability.

The invention claimed is:

1. A paint and an adhesive composition characterized by comprising:
   (a) a urethane (meth)acrylate, by 20 to 40 mass %;
   (b) a modifying agent by 0.1 to 50 mass %, wherein the component (b) comprises (b-1) polyols having an hydroxyl value of 40 to 330 mgKOH/g, wherein the component (b-1) is at least one item selected from a group consisting of (b-1-1) castor oil-based polyols having a hydroxyl value of 40 to 330 mgKOH/g; (b-1-2) polybutadiene-based polyols having a hydroxyl value of 40 to 330 mgKOH/g; (b-1-3) polyisoprene-based polyols having a hydroxyl value of 40 to 330 mgKOH/g, and hydrogenated adducts of any of (b-1-1), (b-1-2), and (b-1-3);
   (c) a monomer, wherein the monomer is a ring structure and an ethylenically unsaturated group, by 30 to 70 mass %, provided that the total of the components (a), (b) and (c) is 100 mass %; and
   (d) an initiator by 0.1 to 15 parts by mass to a total of 100 parts by mass of the components (a), (b) and (c).

2. The paint and the adhesive composition according to claim 1, wherein the component (b-1-1) is an aromatic castor oil-based polyol (b-1-1-1) having a hydroxyl value of 40 to 330 mgKOH/g.

3. The paint and the adhesive composition according to claim 1, further comprising a functional material, wherein the functional material comprises antifouling-property imparting materials.

4. The paint and the adhesive composition according to claim 3, wherein the antifouling-property imparting materials are silicone compounds.

5. The paint and the adhesive composition according to claim 1, further comprising a functional material, wherein the functional material comprises scratch resistance enhancing materials, and wherein the scratch resistance enhancing materials are organosilica compounds.

6. The paint and the adhesive composition according to claim 1, further comprising a functional material, wherein the functional material comprises scratch resistance enhancing materials, and wherein the scratch resistance enhancing materials are alumina ceramic compounds.

7. The paint and the adhesive composition according to claim 1, further comprising a functional material, wherein the functional material comprises shock resistance enhancing materials, and wherein the shock resistance enhancing materials are core-shell polymer particles.

8. The paint and the adhesive composition according to claim 1, further comprising a functional material, wherein the functional material comprises IR absorbing materials, and wherein the IR absorbing materials are metal oxides.

9. The paint and the adhesive composition according to claim 1, further comprising a functional material, wherein the functional material comprises UV absorbing materials.

10. The paint and the adhesive composition according to claim 1, further comprising a functional material, wherein the functional material comprises IR reflective materials, and wherein the IR reflective materials are organic pigment components that are at least one item selected from the group consisting of basic lead carbonate, basic lead sulfate, basic lead silicate, zinc oxide with a specific gravity of 5.47 to 5.61, zinc sulfide with a specific gravity of 4.1, lithopone, antimony trioxide with a specific gravity of 5.5 to 5.6, titanium dioxide with a specific gravity of 4.2 and graphite with a specific gravity of 3.3.

11. The paint and the adhesive composition according to claim 1, further comprising a functional material, wherein the functional material comprises electromagnetic shielding materials, and wherein the electromagnetic shielding materials are electroconductive particles of at least one item selected from the group consisting of (1) carbon particles; (2) particles of any of metals of nickel, indium, chromium, gold, vanadium, tin, cadmium, silver, platinum, aluminum, copper, titanium, cobalt, lead, alloys thereof and electroconductive oxides thereof; and (3) polyester having a coating layer of any of electroconductive materials of (1) and (2) above formed on the surfaces thereof and polyethylene having a coating layer of any of electroconductive materials of (1) and (2) above formed on the surfaces thereof.

12. The paint and the adhesive composition according to claim 1, further comprising a functional material, wherein the functional material comprises electroconductive revealing materials, and wherein the electroconductive revealing materials are electroconductive particles of at least one item selected from the group consisting of electroconductive carbon black and carbon nanotubes.

13. The paint and the adhesive composition according to claim 1, further comprising a functional material, wherein the functional material comprises antistatic materials, and wherein the antistatic materials are at least one item selected from the group consisting of metal oxides, metal salts, surface active agents and ionic liquids.

14. The paint and the adhesive composition according to claim 13, wherein the metal oxides and the metal salts are at least one item selected from the group consisting of zinc oxide, aluminum doped zinc oxide, gallium doped zinc oxide, ATO, ITO, tin oxide, antimony pentoxide, zirconium oxide, titanium oxide and aluminum oxide.

15. The paint and the adhesive composition according to claim 13, wherein the surface active agents are at least one item selected from the group consisting of anionic, nonionic, cationic and amphoteric surface-active agents.

16. The paint and the adhesive composition according to claim 13, wherein the ionic liquids contain cations of at least one item selected from the group consisting of imidazolium, pyridinium, pyrrolidinium, phosphonium, ammonium and sulfonium.

17. The paint and the adhesive composition according to claim 13, wherein the ionic liquids contain anions of at least one item selected from the group consisting of halogen, carboxylates, sulfates, sulfonates, thiocyanates, aluminates, borates, phosphates, phosphinates, amides, antimonates, imides and methides.

18. The paint and the adhesive composition according to claim 1, further comprising a functional material, wherein the functional material comprises flame retardancy imparting materials, and wherein the flame retardancy imparting materials contain a flame retardant agent of at least one item selected from the group consisting of phosphor-based flame retardant agents, bromide-based flame retardant agents, chlorine-based flame retardant agents, aluminum hydroxide and zinc borate.

* * * * *